(12) United States Patent
Spicer et al.

(10) Patent No.: US 10,851,643 B2
(45) Date of Patent: *Dec. 1, 2020

(54) DETERMINING GEOMETRIES OF HYDRAULIC FRACTURES

(71) Applicant: REVEAL ENERGY SERVICES, INC., Houston, TX (US)

(72) Inventors: Sean Andrew Spicer, Houston, TX (US); Erica Wilhelmina Catharina Coenen, Spring, TX (US)

(73) Assignee: Reveal Energy Services, Inc., Houston, TX (US)

( * ) Notice: Subject to any disclaimer, the term of this patent is extended or adjusted under 35 U.S.C. 154(b) by 372 days.

This patent is subject to a terminal disclaimer.

(21) Appl. No.: 15/979,420

(22) Filed: May 14, 2018

(65) Prior Publication Data

US 2019/0128110 A1 May 2, 2019

Related U.S. Application Data

(60) Provisional application No. 62/580,657, filed on Nov. 2, 2017.

(51) Int. Cl.

| | |
|---|---|
| *E21B 47/06* | (2012.01) |
| *E21B 49/00* | (2006.01) |
| *E21B 43/26* | (2006.01) |
| *G01V 9/00* | (2006.01) |
| *E21B 43/12* | (2006.01) |

(52) U.S. Cl.
CPC ............ *E21B 47/06* (2013.01); *E21B 43/127* (2013.01); *E21B 43/26* (2013.01); *E21B 49/00* (2013.01); *G01V 9/00* (2013.01)

(58) Field of Classification Search
CPC .............................. E21C 47/06; E21C 43/127
USPC .......................................................... 702/11
See application file for complete search history.

(56) References Cited

U.S. PATENT DOCUMENTS

| | | |
|---|---|---|
| 5,431,227 A | 7/1995 | Montgomery et al. |
| 8,439,116 B2 | 5/2013 | East et al. |
| 9,187,992 B2 | 11/2015 | Cherian et al. |
| 9,988,895 B2 | 6/2018 | Roussel et al. |
| 9,988,900 B2 | 6/2018 | Kampfer et al. |

(Continued)

*Primary Examiner* — Eman A Alkafawi
(74) *Attorney, Agent, or Firm* — Fish & Richardson P.C.

(57) ABSTRACT

Techniques for determining geometries of hydraulic fractures include identifying a data structure that includes data associated with hydraulic fracture identifiers and observed fluid pressures, at least one of the hydraulic fracture identifiers representing a first hydraulic fracture formed from a monitor wellbore into a subsurface rock formation and at least another of the hydraulic fracture identifiers representing a second hydraulic fracture formed from a treatment wellbore into the subsurface rock formation, at least one of the observed fluid pressures includes a pressure change in a fluid in the first hydraulic fracture that is induced by formation of the second hydraulic fracture; performing a single- or multi-objective, non-linear constrained optimization analysis to minimize at least one objective function associated with the observed fluid pressures; and based on minimizing the at least one objective function, determining respective sets of hydraulic fracture geometries associated with at least one of the first hydraulic fracture or the second hydraulic fracture.

31 Claims, 31 Drawing Sheets

(56) References Cited

U.S. PATENT DOCUMENTS

| | | |
|---|---|---|
| 10,030,497 B2 | 7/2018 | Dawson et al. |
| 2008/0209997 A1* | 9/2008 | Bailey .................... E21B 43/26 73/152.02 |
| 2009/0145660 A1 | 6/2009 | Johnson et al. |
| 2009/0188665 A1 | 7/2009 | Tubel et al. |
| 2009/0281776 A1 | 11/2009 | Cheng et al. |
| 2010/0004906 A1 | 1/2010 | Searles et al. |
| 2012/0296619 A1 | 11/2012 | Maliassov et al. |
| 2013/0140031 A1 | 6/2013 | Cohen et al. |
| 2014/0067353 A1 | 3/2014 | Shelley et al. |
| 2015/0075777 A1 | 3/2015 | Walters et al. |
| 2015/0075779 A1 | 3/2015 | Walters et al. |
| 2015/0083398 A1 | 3/2015 | Dawson |
| 2015/0176394 A1 | 6/2015 | Roussel et al. |
| 2015/0241584 A1 | 8/2015 | Aarre |
| 2016/0061022 A1 | 3/2016 | McCoy |
| 2016/0177693 A1 | 6/2016 | Gomaa et al. |
| 2016/0237799 A1 | 8/2016 | Dawson |
| 2016/0333680 A1 | 11/2016 | Richter et al. |
| 2017/0002652 A1 | 1/2017 | Kampfer et al. |
| 2017/0122077 A1 | 5/2017 | Shahri et al. |
| 2017/0145793 A1 | 5/2017 | Ouenes |
| 2017/0247995 A1 | 8/2017 | Crews et al. |
| 2017/0370208 A1 | 12/2017 | Dawson |
| 2018/0003033 A1 | 1/2018 | Dawson |
| 2018/0120464 A1 | 5/2018 | Sun et al. |
| 2018/0135401 A1 | 5/2018 | Dykstra et al. |
| 2019/0128112 A1 | 5/2019 | Spicer |

\* cited by examiner

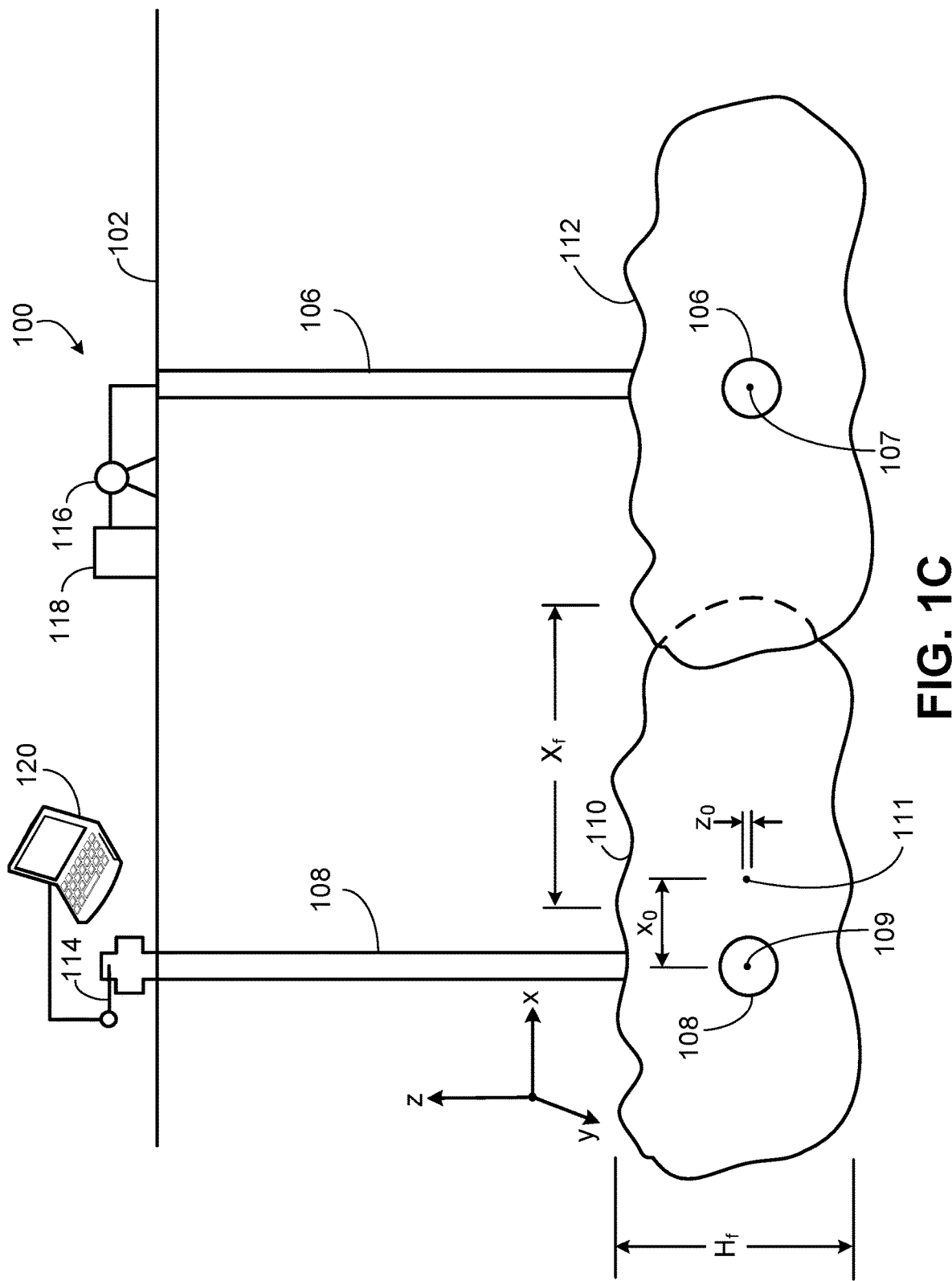

$$\overline{X}_i = \begin{bmatrix} X_f^{T_1} \\ \theta_f^{T_1} \\ X_f^{T_2} \\ \theta_f^{T_2} \\ X_f^{T_3} \\ \theta_f^{T_3} \\ X_f^{T_4} \\ \theta_f^{T_4} \\ X_f^{T_5} \\ \theta_f^{T_5} \\ X_f^{M_1} \\ \theta^M \\ X_f^{M_2} \\ \theta^{M_2} \end{bmatrix} = D_{ij} y_i = \begin{bmatrix} 1 & 0 & 0 & 0 & 0 & 0 \\ 0 & 0 & 0 & 0 & 0 & 1 \\ 1 & 0 & 0 & 0 & 0 & 0 \\ 0 & 0 & 0 & 0 & 0 & 1 \\ 0 & 0 & 1 & 0 & 0 & 0 \\ 0 & 0 & 0 & 0 & 0 & 1 \\ 0 & 1 & 0 & 0 & 0 & 0 \\ 0 & 0 & 0 & 0 & 0 & 1 \\ 0 & 1 & 0 & 0 & 0 & 0 \\ 0 & 0 & 0 & 0 & 0 & 1 \\ 0 & 0 & 0 & 1 & 0 & 0 \\ 0 & 0 & 0 & 0 & 0 & 1 \\ 0 & 0 & 0 & 0 & 1 & 0 \\ 0 & 0 & 0 & 0 & 0 & 1 \end{bmatrix} \begin{bmatrix} X_f^{G_1} \\ X_f^{G_2} \\ X_f^{G_3} \\ X_f^{G_4} \\ X_f^{G_5} \\ \theta^G \end{bmatrix}$$

Table 2. Solution Table for 7-Stage Model Problem

| Known Perf Location | | True Fracture Length | | | | | | True Fracture Height | | | | | | | 0=Toe |
|---|---|---|---|---|---|---|---|---|---|---|---|---|---|---|---|
| Monitor DoF | Treatment DoF | 850 | 825 | 800 | 830 | 825 | 800 | 830 | 150 | 150 | 150 | 150 | 150 | 150 | 100=Heel |
| Heel | Heel | 805 | 798 | 748 | 752 | 736 | 712 | 738 | 168 | 127 | 127 | 127 | 127 | 127 | 0 |
| Heel | Mid | 772 | 791 | 746 | 743 | 723 | 698 | 722 | 168 | 172 | 172 | 172 | 172 | 172 | 52 |
| Heel | Toe | 737 | 748 | 703 | 699 | 682 | 660 | 685 | 170 | 151 | 151 | 151 | 151 | 151 | 74 |
| Mid | Heel | 804 | 887 | 884 | 913 | 918 | 904 | 928 | 121 | 141 | 141 | 141 | 141 | 141 | 0 |
| Mid | Mid | 805 | 798 | 748 | 752 | 736 | 712 | 738 | 168 | 127 | 127 | 127 | 127 | 127 | 0 |
| Mid | Toe | 772 | 791 | 746 | 743 | 723 | 698 | 722 | 168 | 172 | 172 | 172 | 172 | 172 | 52 |
| Toe | Heel | 834 | 848 | 844 | 866 | 867 | 851 | 872 | 139 | 137 | 137 | 137 | 137 | 137 | 15 |
| Toe | Mid | 804 | 887 | 884 | 913 | 918 | 904 | 928 | 121 | 141 | 141 | 141 | 141 | 141 | 0 |
| Toe | Toe | 805 | 798 | 748 | 752 | 736 | 712 | 738 | 168 | 127 | 127 | 127 | 127 | 127 | 0 |
| | | Recovered Fracture Length | | | | | | | Recovered Fracture Height | | | | | | Recovered Perf Loc |

| Known Perf Location | | ABS(Recovered - Actual) | | | | | | | ABS(Recovered - Actual) | | | | | | |
|---|---|---|---|---|---|---|---|---|---|---|---|---|---|---|---|
| Monitor DoF | Treatment DoF | | | | | | | | | | | | | | |
| Heel | Heel | 45 | 27 | 52 | 78 | 89 | 88 | 92 | 18 | 23 | 23 | 23 | 23 | 23 | 23 |
| Heel | Mid | 78 | 34 | 54 | 87 | 102 | 102 | 108 | 18 | 22 | 22 | 22 | 22 | 22 | 22 |
| Heel | Toe | 113 | 77 | 97 | 131 | 143 | 140 | 145 | 20 | 1 | 1 | 1 | 1 | 1 | 1 |
| Mid | Heel | 46 | 62 | 84 | 83 | 93 | 104 | 98 | 29 | 9 | 9 | 9 | 9 | 9 | 9 |
| Mid | Mid | 45 | 27 | 52 | 78 | 89 | 88 | 92 | 18 | 23 | 23 | 23 | 23 | 23 | 23 |
| Mid | Toe | 78 | 34 | 54 | 87 | 102 | 102 | 108 | 18 | 22 | 22 | 22 | 22 | 22 | 22 |
| Toe | Heel | 16 | 23 | 44 | 36 | 42 | 51 | 42 | 11 | 13 | 13 | 13 | 13 | 13 | 13 |
| Toe | Mid | 46 | 62 | 84 | 83 | 93 | 104 | 98 | 29 | 9 | 9 | 9 | 9 | 9 | 9 |
| Toe | Toe | 45 | 27 | 52 | 78 | 89 | 88 | 92 | 18 | 23 | 23 | 23 | 23 | 23 | 23 |

| | | | | | | | | | | | | | | | |
|---|---|---|---|---|---|---|---|---|---|---|---|---|---|---|---|
| MAX Delta | | 113 | 77 | 97 | 131 | 143 | 140 | 145 | 29 | 23 | 23 | 23 | 23 | 23 | 23 |
| AVG Delta | | 57 | 41 | 64 | 82 | 94 | 96 | 97 | 20 | 16 | 16 | 16 | 16 | 16 | 16 |
| Max Percent of True | | 13% | 9% | 12% | 16% | 17% | 18% | 17% | 19% | 15% | 15% | 15% | 15% | 15% | 15% |
| Avg Percent of True | | 7% | 5% | 8% | 10% | 11% | 12% | 12% | 13% | 11% | 11% | 11% | 11% | 11% | 11% |

FIG. 23

| | Percent Difference from True Fracture Length | | Percent Difference from True Fracture Height | | Percent Difference from True Horizontal Asymmetry | | Percent Difference from True Vertical Asymmetry | |
|---|---|---|---|---|---|---|---|---|
| | Max | Average | Max | Average | Max | Average | Max | Average |
| 2 Well Pad, 1 Monitor, 3 Treatment, Asymmetric to Monitor | 22% | 11% | 21% | 13% | N/A | N/A | N/A | N/A |
| 2 Well Pad, 1 Monitor, 6 Treatment, Asymmetric to Monitor | 18% | 9% | 19% | 11% | N/A | N/A | N/A | N/A |
| 2 Well Pad, 1 Monitor, 6 Treatment, Symmetric to Monitor | 17% | 7% | 17% | 11% | N/A | N/A | N/A | N/A |
| 3 Well Pad, 1 Asymmetric Monitor on Center Well, 14 Treatment | 16% | 7% | 15% | 9% | 14% | 9% | N/A | N/A |
| 3 Well Pad, 8 Monitors, 88 Treatment, Stages, Stress Effects | 18% | 5% | 16% | 4% | 11% | 0.05 | N/A | N/A |
| 3 Well Pad, 1 Monitor, 14 Treatment, Wine-Rack | 16% | 7% | 19% | 5% | 1% | 1% | 1% | 1% |

FIG. 24

DETERMINING GEOMETRIES OF HYDRAULIC FRACTURES

CROSS-REFERENCE TO RELATED APPLICATION

This disclosure claims priority under 35 U.S.C. § 119 to U.S. Provisional Patent Application Ser. No. 62/580,657, filed on Nov. 2, 2017, and entitled "DETERMINING GEOMETRIES OF HYDRAULIC FRACTURES," the entire contents of which are hereby incorporated by reference.

TECHNICAL FIELD

This specification relates to systems and method for determining geometries of hydraulic fractures formed in one or more underground rock formations.

BACKGROUND

Certain geologic formations, such as unconventional reservoirs in shale, sandstone, and other rock types, often exhibit increased hydrocarbon production subsequent to one or more completion operations being performed. One such completion operation may be a hydraulic fracturing operation, in which a liquid is pumped into a wellbore to contact the geologic formation and generate fractures throughout the formation due to a pressure of the pumped liquid (e.g., that is greater than a fracture pressure of the rock formation). In some cases, an understanding of a size or other characteristics of the generated hydraulic fractures may be helpful in understanding a potential hydrocarbon production from the geologic formation.

SUMMARY

In a general implementation according to the present disclosure, a structured data processing system for determining geometries of hydraulic fractures includes one or more hardware processors; and a memory in communication with the one or more hardware processors that stores a data structure and an execution environment. The data structure stores data that includes a plurality of hydraulic fracture identifiers and a plurality of observed fluid pressures, where at least one of the plurality of hydraulic fracture identifiers is associated with a first hydraulic fracture formed from a monitor wellbore that extends from a terranean surface into a subsurface rock formation and at least another of the plurality of hydraulic fracture identifiers is associated with a second hydraulic fracture formed from a treatment wellbore that extends from the terranean surface into the subsurface rock formation. At least one of the plurality of observed fluid pressures includes a pressure change in a fluid in the first hydraulic fracture that is induced by formation of the second hydraulic fracture. The execution environment includes a hydraulic fracture geometry solver configured to perform operations including (i) executing a single- or multi-objective, non-linear constrained optimization analysis to minimize at least one objective function associated with the plurality of observed fluid pressures, and (ii) based on minimizing the at least one objective function, determining respective sets of hydraulic fracture geometries associated with at least one of the first hydraulic fracture or the second hydraulic fracture. The execution environment further includes a user interface module that generates a user interface that renders one or more graphical representations of the determined respective sets of hydraulic fracture geometries; and a transmission module that transmits, over one or more communication protocols and to a computing device, data that represents the one or more graphical representations.

In an aspect combinable with the general implementation, the at least one objective function includes a first objective function.

In another aspect combinable with any of the previous aspects, minimizing the first objective function includes minimizing a difference between the observed pressure and a modeled pressure associated with the first and second hydraulic fractures.

In another aspect combinable with any of the previous aspects, the hydraulic fracture geometry solver is further configured to perform operations including assessing a shift penalty to the first objective function.

In another aspect combinable with any of the previous aspects, the operation of assessing the shift penalty includes minimizing a standard deviation of the center location of each of a plurality of hydraulic fractures in a stage fracturing treatment initiated from the treatment wellbore that includes the second hydraulic fracture.

In another aspect combinable with any of the previous aspects, the modeled pressure is determined with a finite element method that outputs the modeled pressure based on inputs that include parameters of a hydraulic fracture operation and the respective sets of hydraulic fracture geometries of the first and second hydraulic fractures.

In another aspect combinable with any of the previous aspects, the hydraulic fracture geometry solver is further configured to perform operations including minimizing a second objective function associated with at least one of an area of the first or second hydraulic fracture.

In another aspect combinable with any of the previous aspects, the operation of minimizing the second objective function includes at least one of minimizing a difference between the area of the first hydraulic fracture and an average area of a group of hydraulic fractures in a hydraulic fracturing stage group that includes the first hydraulic fracture; or minimizing a difference between the area of the second hydraulic fracture and an average area of a group of hydraulic fractures in a hydraulic fracturing stage group that includes the second hydraulic fracture.

In another aspect combinable with any of the previous aspects, the hydraulic fracture geometry solver is further configured to perform operations including applying a constraint to the single- or multi-objective, non-linear constrained optimization analysis associated with at least one of a center of the first hydraulic fracture or a center of the second hydraulic fracture.

In another aspect combinable with any of the previous aspects, the operation of applying the constraint includes at least one of constraining a distance between the center of the first hydraulic fracture and the radial center of the monitor wellbore to be no greater than a fracture half-length dimension of the first hydraulic fracture and no greater than a fracture height dimension of the first hydraulic fracture; or constraining a distance between the center of the second hydraulic fracture and the radial center of the treatment wellb ore to be no greater than a fracture half-length dimension of the second hydraulic fracture and no greater than a fracture height dimension of the second hydraulic fracture.

In another aspect combinable with any of the previous aspects, the hydraulic fracture geometry solver is further configured to perform operations including iterating steps (i)

and (ii) until an error for at least one of the first or second objective functions is less than a specified value; and a change in the determined plurality of fracture geometry data for the first hydraulic fracture from a previous iteration to a current iteration is less than the specified value.

In another aspect combinable with any of the previous aspects, the operation of iterating includes setting the set of hydraulic fracture geometries of the first hydraulic fracture to an initial set of data values; minimizing at least one of the first or second objective functions using the observed pressure and modeled pressure that is based on the set of hydraulic fracture geometries of the first hydraulic fracture and a set of hydraulic fracture geometries of the second hydraulic fracture; calculating a new set of hydraulic fracture geometries of the first hydraulic based on the minimization; and resetting the set of hydraulic fracture geometries of the first hydraulic fracture to the calculated new set of hydraulic fracture geometries.

In another aspect combinable with any of the previous aspects, the operation of determining respective sets of hydraulic fracture geometries associated with at least one of the first hydraulic fracture or the second hydraulic fracture includes determining respective sets of hydraulic fracture geometries associated with the first hydraulic fracture.

In another aspect combinable with any of the previous aspects, the hydraulic fracture geometry solver is further configured to perform operations including based on the error for at least one of the first or second objective functions being less than the specified value, fixing the set of hydraulic fracture geometries of the first hydraulic fracture to the calculated new set of hydraulic fracture geometries; and minimizing the first objective function to minimize the difference between the observed pressure and the modeled pressure associated with the first and second hydraulic fractures.

In another aspect combinable with any of the previous aspects, the hydraulic fracture geometry solver is further configured to perform operations including optimizing, through an iterative process, the hydraulic fracture geometries of the second hydraulic fracture, the optimizing including applying a constraint associated with a fracture height of the second hydraulic fracture or a fracture length-to-fracture height ratio of the second hydraulic fracture.

In another aspect combinable with any of the previous aspects, the iterative process includes iterating steps (i) and (ii) until an error for at least one of the first or second objective functions is less than a specified value; and a change in the determined plurality of fracture geometry data for the second hydraulic fracture from a previous iteration to a current iteration is less than the specified value.

In another aspect combinable with any of the previous aspects, the operation of iterating includes setting the set of hydraulic fracture geometries of the second hydraulic fracture to an initial set of data values; minimizing at least one of the first or second objective functions using the observed pressure and modeled pressure that is based on the fixed set of hydraulic fracture geometries of the first hydraulic fracture and the set of hydraulic fracture geometries of the second hydraulic fracture; calculating a new set of hydraulic fracture geometries of the second hydraulic based on the minimization; and resetting the set of hydraulic fracture geometries of the second hydraulic fracture to the calculated new set of hydraulic fracture geometries.

In another aspect combinable with any of the previous aspects, the single- or multi-objective, non-linear constrained optimization analysis includes a sequential quadratic programming method.

In another aspect combinable with any of the previous aspects, the data structure includes an observation graph that includes a plurality of nodes and a plurality of edges, each edge connecting two nodes.

In another aspect combinable with any of the previous aspects, each node represents one of the plurality of hydraulic fractures and each edge represents one of the observed pressures.

In another general implementation, a computer-implemented method for determining geometries of hydraulic fractures includes (i) searching, with one or more hardware processors, memory in communication with the one or more hardware processors for a data structure stored in the memory; (ii) extracting, with one or more hardware processors, data from the data structure, the data including a plurality of hydraulic fracture identifiers and a plurality of observed fluid pressures, at least one of the plurality of hydraulic fracture identifiers that represent a first hydraulic fracture formed from a monitor wellbore that extends from a terranean surface into a subsurface rock formation and at least another of the plurality of hydraulic fracture identifiers that represent a second hydraulic fracture formed from a treatment wellbore that extends from the terranean surface into the subsurface rock formation, at least one of the plurality of observed fluid pressures including a pressure change in a fluid in the first hydraulic fracture that is induced by formation of the second hydraulic fracture; (iii) performing, with the one or more hardware processors, a single- or multi-objective, non-linear constrained optimization analysis to minimize at least one objective function associated with the plurality of observed fluid pressures; and (iv) based on minimizing the at least one objective function, determining, with the one or more hardware processors, respective sets of hydraulic fracture geometries associated with at least one of the first hydraulic fracture or the second hydraulic fracture.

In an aspect combinable with the general implementation, the at least one objective function includes a first objective function.

In another aspect combinable with any one of the previous aspects, minimizing the first objective function includes minimizing a difference between the observed pressure and a modeled pressure associated with the first and second hydraulic fractures.

Another aspect combinable with any one of the previous aspects further includes assessing, with the one or more hardware processors, a shift penalty to the first objective function.

In another aspect combinable with any one of the previous aspects, assessing the shift penalty includes minimizing a standard deviation of the center location of each of a plurality of hydraulic fractures in a stage fracturing treatment initiated from the treatment wellbore that includes the second hydraulic fracture.

In another aspect combinable with any one of the previous aspects, the modeled pressure is determined with a finite element method that outputs the modeled pressure based on inputs that include parameters of a hydraulic fracture operation and the respective sets of hydraulic fracture geometries of the first and second hydraulic fractures.

In another aspect combinable with any one of the previous aspects, step (iii) further includes minimizing a second objective function associated with at least one of an area of the first or second hydraulic fracture.

In another aspect combinable with any one of the previous aspects, minimizing the second objective function includes at least one of minimizing a difference between the area of the first hydraulic fracture and an average area of a group of hydraulic fractures in a hydraulic fracturing stage group that includes the first hydraulic fracture; or minimizing a difference between the area of the second hydraulic fracture and an average area of a group of hydraulic fractures in a hydraulic fracturing stage group that includes the second hydraulic fracture.

In another aspect combinable with any one of the previous aspects, step (iii) further includes applying, with the one or more hardware processors, a constraint to the single- or multi-objective, non-linear constrained optimization analysis associated with at least one of a center of the first hydraulic fracture or a center of the second hydraulic fracture.

In another aspect combinable with any one of the previous aspects, applying the constraint includes at least one of constraining a distance between the center of the first hydraulic fracture and the radial center of the monitor wellbore to be no greater than a fracture half-length dimension of the first hydraulic fracture and no greater than a fracture height dimension of the first hydraulic fracture; or constraining a distance between the center of the second hydraulic fracture and the radial center of the treatment wellbore to be no greater than a fracture half-length dimension of the second hydraulic fracture and no greater than a fracture height dimension of the second hydraulic fracture.

Another aspect combinable with any one of the previous aspects further includes iterating steps (iii) and (iv) until an error for at least one of the first or second objective functions is less than a specified value; and a change in the determined plurality of fracture geometry data for the first hydraulic fracture from a previous iteration to a current iteration is less than the specified value.

In another aspect combinable with any one of the previous aspects, iterating includes setting the set of hydraulic fracture geometries of the first hydraulic fracture to an initial set of data values; minimizing at least one of the first or second objective functions using the observed pressure and modeled pressure that is based on the set of hydraulic fracture geometries of the first hydraulic fracture and a set of hydraulic fracture geometries of the second hydraulic fracture; calculating a new set of hydraulic fracture geometries of the first hydraulic based on the minimization; and resetting the set of hydraulic fracture geometries of the first hydraulic fracture to the calculated new set of hydraulic fracture geometries.

In another aspect combinable with any one of the previous aspects, determining respective sets of hydraulic fracture geometries associated with at least one of the first hydraulic fracture or the second hydraulic fracture includes determining respective sets of hydraulic fracture geometries associated with the first hydraulic fracture.

Another aspect combinable with any one of the previous aspects further includes based on the error for at least one of the first or second objective functions being less than the specified value, fixing the set of hydraulic fracture geometries of the first hydraulic fracture to the calculated new set of hydraulic fracture geometries; and minimizing the first objective function to minimize the difference between the observed pressure and the modeled pressure associated with the first and second hydraulic fractures.

Another aspect combinable with any one of the previous aspects further includes optimizing, through an iterative process, the hydraulic fracture geometries of the second hydraulic fracture, the optimizing including applying a constraint associated with a fracture height of the second hydraulic fracture or a fracture length-to-fracture height ratio of the second hydraulic fracture In another aspect combinable with any one of the previous aspects, the iterative process includes iterating steps (iii) and (iv) until an error for at least one of the first or second objective functions is less than a specified value; and a change in the determined plurality of fracture geometry data for the second hydraulic fracture from a previous iteration to a current iteration is less than the specified value.

In another aspect combinable with any one of the previous aspects, iterating includes setting the set of hydraulic fracture geometries of the second hydraulic fracture to an initial set of data values; minimizing at least one of the first or second objective functions using the observed pressure and modeled pressure that is based on the fixed set of hydraulic fracture geometries of the first hydraulic fracture and the set of hydraulic fracture geometries of the second hydraulic fracture; calculating a new set of hydraulic fracture geometries of the second hydraulic based on the minimization; and resetting the set of hydraulic fracture geometries of the second hydraulic fracture to the calculated new set of hydraulic fracture geometries.

In another aspect combinable with any one of the previous aspects, the single- or multi-objective, non-linear constrained optimization analysis includes a sequential quadratic programming method.

In another aspect combinable with any one of the previous aspects, the data structure includes an observation graph that includes a plurality of nodes and a plurality of edges, each edge connecting two nodes.

In another aspect combinable with any one of the previous aspects, each node represents one of the plurality of hydraulic fractures and each edge represents one of the observed pressures.

Another aspect combinable with any one of the previous aspects further includes preparing, with the one or more hardware processors, the determined plurality of fracture geometry data for presentation through a graphical user interface.

Implementations of a hydraulic fracturing geometric modeling system according to the present disclosure may include one, some, or all of the following features. For example, implementations may more accurately determine hydraulic fracture dimensions, thereby informing a fracture treatment operator about one or more effects of particular treatment parameters. As another example, implementations may inform a fracture treatment operator about more efficient or effective well spacing (e.g., horizontally and vertically) in an existing or future production field. As yet another example, implementations may inform a fracture treatment operator about more efficient or effective well constructions parameters, such as well cluster count and well cluster spacing (e.g., horizontally and vertically).

Implementations of a hydraulic fracturing geometric modeling system according to the present disclosure may include a system of one or more computers that can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF DRAWINGS

FIGS. 1A-1C are schematic illustrations of an example implementation of a hydraulic fracture geometric modeling system within a hydraulic fracturing system.

FIG. 13 illustrates a dependency matric for the combination observation graph-map of FIG. 12.

FIG. 23 illustrates a table with solution results from the determination of fracture geometries of the hydraulic fractures represented in FIG. 14.

FIG. 24 illustrates a table with solution results from determinations of fracture geometries of the hydraulic fractures represented in other model problem examples.

DETAILED DESCRIPTION

Figure 1A:
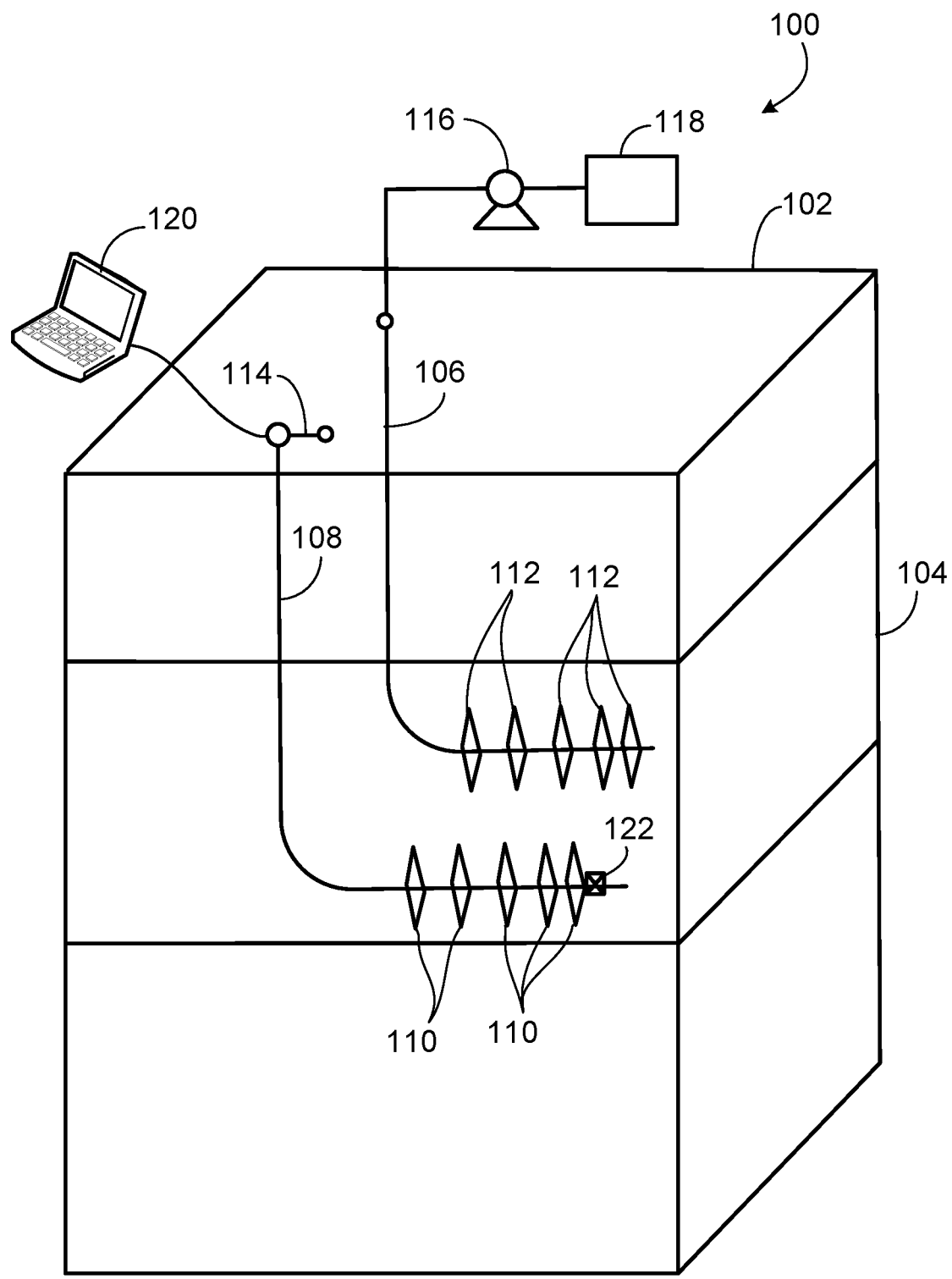
Figure 1B:
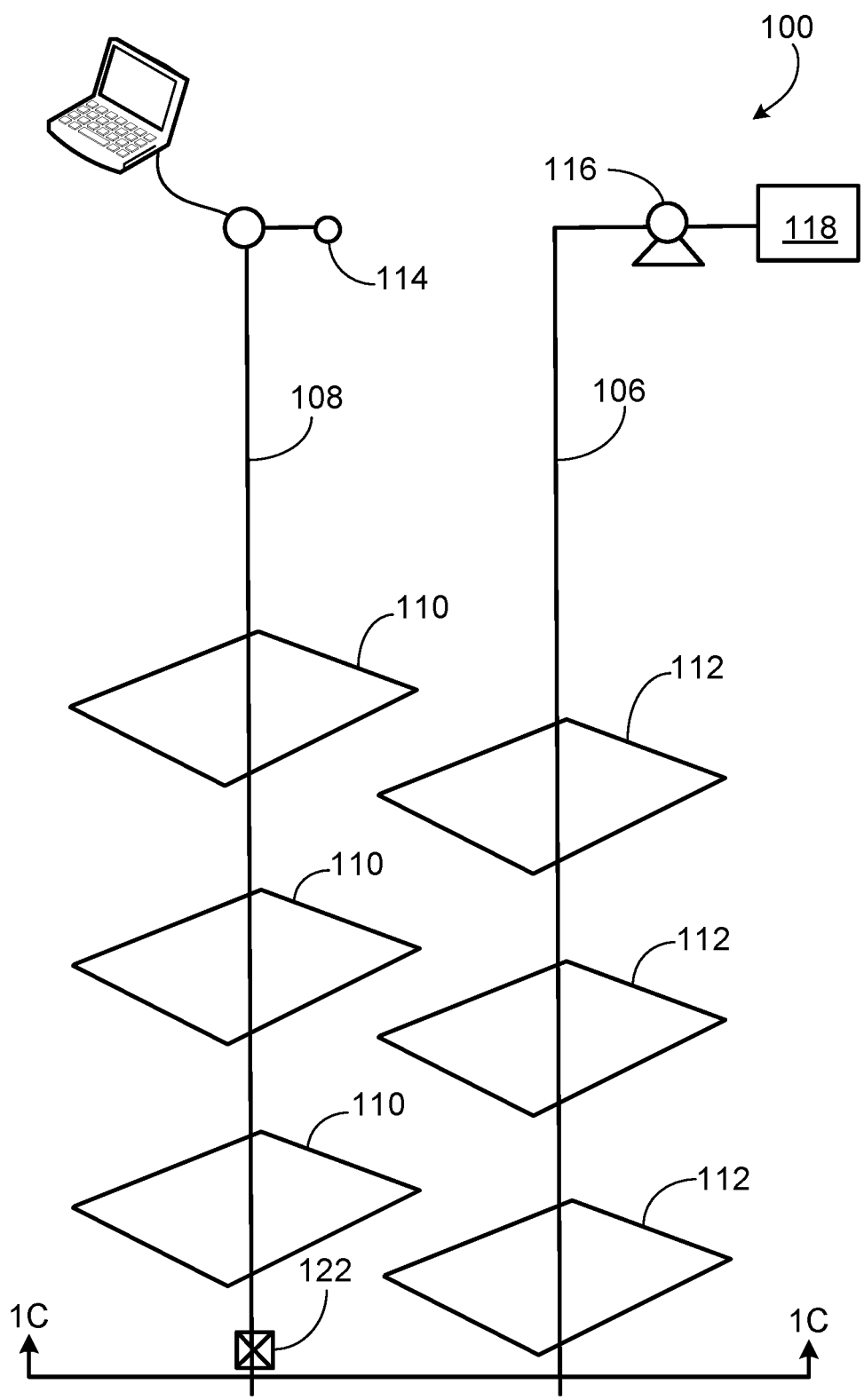

FIGS. 1A-1C are schematic illustrations of an example implementation of a hydraulic fracture geometric modeling system 120 within a hydraulic fracturing system 100. As shown, system 100 includes a monitor wellbore 108 that is formed from a terranean surface 102 to a subterranean zone 104 located below the terranean surface 102. The monitor wellbore 108, generally, includes a plug 122 or other fluid barrier positioned in the wellbore 108, and a pressure sensor 114. In this example, the pressure sensor 114 is located at or near a wellhead on the monitor wellbore 108 but in alternate implementations, the pressure sensor 114 may be positioned within the monitor wellbore 108 below the terranean surface 102. Generally, according to the present disclosure, the monitor wellbore 108 may be used to measure pressure variations in a fluid contained in the wellbore 108 and/or one or more hydraulic fractures 110 formed from the monitor wellbore 108 that are induced by a hydraulic fracturing fluid pumped into a treatment wellbore 106 to form one or more hydraulic fractures 112 formed from the treatment wellbore 106. Such induced pressure variations, as explained more fully below, may be used to determine a fracture growth curve and other information regarding the hydraulic fractures 112.

The monitor wellbore 108 shown in FIG. 1A includes vertical and horizontal sections, as well as a radiussed section that connects the vertical and horizontal portions. Generally, and in alternative implementations, the wellbore 108 can include horizontal, vertical (e.g., only vertical), slant, curved, and other types of wellbore geometries and orientations. The wellbore 108 may include a casing (not shown) that is cemented or otherwise secured to the wellbore wall to define a borehole in the inner volume of the casing. In alternative implementations, the wellbore 108 can be uncased or include uncased sections. Perforations (not specifically labeled) can be formed in the casing to allow fracturing fluids and/or other materials to flow into the wellbore 108. Perforations can be formed using shape charges, a perforating gun, and/or other tools. Although illustrated as generally vertical portions and generally horizontal portions, such parts of the wellbore 108 may deviate from exactly vertical and exactly horizontal (e.g., relative to the terranean surface 102) depending on the formation techniques of the wellbore 108, type of rock formation in the subterranean formation 104, and other factors. Generally, the present disclosure contemplates all conventional and novel techniques for forming the wellbore 108 from the surface 102 into the subterranean formation 104.

The treatment wellbore 106 shown in FIG. 1A includes vertical and horizontal sections, as well as a radiussed section that connects the vertical and horizontal portions. Generally, and in alternative implementations, the wellbore 106 can include horizontal, vertical (e.g., only vertical), slant, curved, and other types of wellbore geometries and orientations. The treatment wellbore 106 may include a casing (not shown) that is cemented or otherwise secured to the wellbore wall to define a borehole in the inner volume of the casing. In alternative implementations, the wellbore 106 can be uncased or include uncased sections. Perforations (not specifically labeled) can be formed in the casing to allow fracturing fluids and/or other materials to flow into the wellbore 106. Perforations can be formed using shape charges, a perforating gun, and/or other tools. Although illustrated as generally vertical portions and generally horizontal portions, such parts of the wellbore 106 may deviate from exactly vertical and exactly horizontal (e.g., relative to the terranean surface 102) depending on the formation techniques of the wellbore 106, type of rock formation in the subterranean formation 104, and other factors. Generally, the present disclosure contemplates all conventional and novel techniques for forming the wellbore 106 from the surface 102 into the subterranean formation 104. Generally, according to the present disclosure, the treatment wellbore 106 is used to form one or more hydraulic fractures 112 that can produce or enhance production of hydrocarbons or other fluids in the subterranean zone 104. A hydraulic fracturing fluid used to form such fractures 112, during formation of the fractures 112, may induce pressure variations in a fluid contained in the monitor wellbore 108, which may be used to determine a fracture growth curve and other information regarding the hydraulic fractures 112.

Although a single monitor wellbore 108 and a single treatment wellbore 106 are shown in FIGS. 1A-1C, the present disclosure contemplates that the system 100 may include multiple (e.g., more than 2) wellbores, any of which may be assigned as a "monitor" wellbore or a "treatment" wellbore. For example, in some aspects, there may be multiple (e.g., 10 or more) wellbores formed into the subterranean zone 104, with a single wellbore assigned to be the monitor wellbore and the remaining wellbores assigned to be treatment wellbores. Alternatively, there may be multiple monitor wellbores and multiple treatment wellbores within a set of wellbores formed into the subterranean zone. Further, in some aspects, one or more wellbores in a set of wellbores formed into the subterranean zone 104 may be initially designated as monitor wellbores while one or more other wellbores may be designated as treatment wellbores. Such initial designations, according to the present disclosure, may be adjusted over time such that wellbores initially designated monitor wellbores may be re-designated as treatment wellbores while wellbores initially designated treatment wellbores may be re-designated as monitor wellbores.

The example hydraulic fracturing system 100 includes a hydraulic fracturing liquid circulation system 118 that is fluidly coupled to the treatment wellbore 106. In some aspects, the hydraulic fracturing liquid circulation system 118, which includes one or more pumps 116, is fluidly coupled to the subterranean formation 104 (which could include a single formation, multiple formations or portions of a formation) through a working string (not shown). Generally, the hydraulic fracturing liquid circulation system 118 can be deployed in any suitable environment, for example, via skid equipment, a marine vessel, sub-sea deployed equipment, or other types of equipment and include hoses, tubes, fluid tanks or reservoirs, pumps, valves, and/or other suitable structures and equipment arranged to circulate a hydraulic fracturing liquid through the treatment wellbore 106 and into the subterranean formation 104 to generate the one or more fractures 112. The working string is positioned to communicate the hydraulic fracturing liquid into the treatment wellbore 106 and can include coiled tubing, sectioned pipe, and/or other structures that communicate fluid through the wellbore 106. The working string can also include flow control devices, bypass valves, ports, and or other tools or well devices that control the flow of fracturing fluid from the interior of the working string into the subterranean formation 104.

Although labeled as a terranean surface 102, this surface may be any appropriate surface on Earth (or other planet) from which drilling and completion equipment may be staged to recover hydrocarbons from a subterranean zone. For example, in some aspects, the surface 102 may represent a body of water, such as a sea, gulf, ocean, lake, or otherwise. In some aspects, all are part of a drilling and completion system, including hydraulic fracturing system 100, may be staged on the body of water or on a floor of the body of water (e.g., ocean or gulf floor). Thus, references to terranean surface 102 includes reference to bodies of water, terranean surfaces under bodies of water, as well as land locations.

Subterranean formation 104 includes one or more rock or geologic formations that bear hydrocarbons (e.g., oil, gas) or other fluids (e.g., water) to be produced to the terranean surface 102. For example, the rock or geologic formations can be shale, sandstone, or other type of rock, typically, that may be hydraulically fractured to produce or enhance production of such hydrocarbons or other fluids.

As shown specifically in FIG. 1C, the monitor fractures 110 emanating from the monitor wellbore 108 and the treatment fractures 112 emanating from the treatment wellbore 106 may extend past each other (e.g., overlap in one or two dimensions) when formed. In some aspects, data about the location of such fractures 110 and 112 and their respective wellbores 108 and 106, such as locations of the wellbores, distances between the wellbores (e.g., in three dimensions) depth of horizontal portions of the wellbores, and locations of the hydraulic fractures initiated from the wellbores (e.g., based on perforation locations formed in the wellbores), among other information.

In some aspects, such information (along with the monitored, induced pressure variations in a fluid in the one or more monitor wellbores) may be used to help determine one or more dimensions (e.g., fracture length, fracture half-length, fracture height, fracture area) of the hydraulic fractures 112. For example, as shown in FIG. 1C, particular dimensions that comprise a fracture geometry (e.g., a set of values that define a geometry of a hydraulic fracture) are illustrated. In this illustration, $X_f$, represents a half-length of the hydraulic fracture 110. This dimension, as shown, lies in an x-direction in three dimensional space defined under the terranean surface 102. Another dimension, $H_f$, represents a height of the hydraulic fracture 110. This dimension, as shown, lies in a z-direction in three dimensional space defined under the terranean surface 102. Another dimension, $x_o$, represents a distance between a center 111 of the hydraulic fracture 110 and a radial center 109 of the wellbore 108 in the x-direction. This dimension, as shown, lies in the x-direction in three dimensional space defined under the terranean surface 102. Another dimension, $z_o$, represents a distance between a center 111 of the hydraulic fracture 110 and a radial center 109 of the wellbore 108 in the z-direction. This dimension, as shown, lies in the z-direction in three dimensional space defined under the terranean surface 102. Another dimension, $y_o$ (not shown), represents a distance between the center 111 of the hydraulic fracture 110 and a fracture initiation location along the wellbore 108 in the y-direction. This dimension lies in the y-direction in three dimensional space defined under the terranean surface 102. Another dimension that may be part of the fracture geometry is an angle, a, that represents the angle between the hydraulic fracture 110 and the wellbore 108. Such dimensions can also be assigned to any fracture 112.

Figure 2:
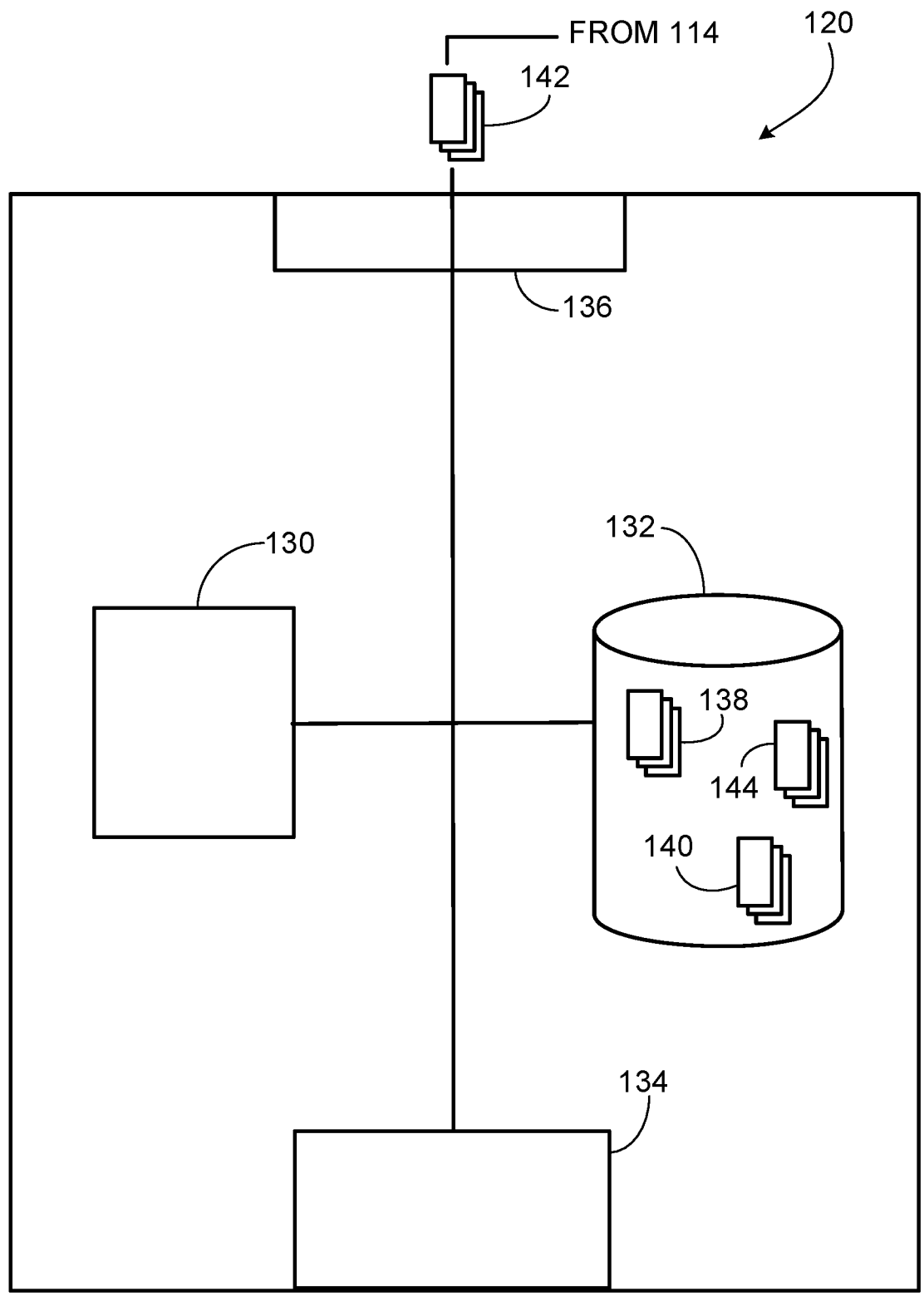
FIG. 2 is a schematic diagram of a computing system that implements the hydraulic fracture geometric modeling system.

FIG. 2 is a schematic diagram of a computing system that implements the hydraulic fracture geometric modeling system 120 shown in FIGS. 1A-1C. Generally, the hydraulic fracture geometric modeling system 120 includes a processor-based control system operable to implement one or more operations described in the present disclosure. As shown in FIG. 2, observed pressure signal values 142 may be received at the hydraulic fracture geometric modeling system 120 from the pressure sensor 114 that is fluidly coupled to or in the monitor wellbore 108. The observed pressure signal values 142, in some aspects, may represent pressure variations in a fluid that is enclosed or contained in the monitor wellbore 108 and/or the hydraulic fractures 110 that are induced by a hydraulic fracturing fluid being used to form hydraulic fractures 112 from the treatment wellbore 106.

For example, the observed pressure signals 142 may represent poromechanical interactions between the hydraulic fractures 110 and the hydraulic fractures 112. The poromechanical interactions may be identified using observed pressure signals measured by the pressure sensor 114 of a fluid contained in the monitor wellbore 108 or the hydraulic fractures 110. The poromechanical interactions may also be identified using one or more pressure sensors or other components that measure a pressure of a hydraulic fracturing fluid used to form the hydraulic fractures 112 from the treatment wellbore 106. In certain embodiments, the observed pressure signals include a pressure versus time curve of the observed pressure signal. Pressure-induced poromechanic signals may be identified in the pressure versus time curve and the pressure-induced poromechanic signals may be used to assess one or more parameters (e.g., geometry) of the hydraulic fractures 112.

As used herein, a "pressure-induced poromechanic signal" refers to a recordable change in pressure of a first fluid in direct fluid communication with a pressure sensor (e.g., pressure gauge) where the recordable change in pressure is caused by a change in stress on a solid in a subsurface formation that is in contact with a second fluid (e.g., a hydrocarbon fluid), which is in direct fluid communication with the first fluid. The change in stress of the solid may be caused by a third fluid used in a hydraulic stimulation process (e.g., a hydraulic fracturing process) in a treatment wellbore 106 in proximity to (e.g., adjacent) the observation (monitoring) wellbore with the third fluid not being in direct fluid communication with the second fluid.

For example, a pressure-induced poromechanic signal may occur in the pressure sensor 114 attached to the wellhead of the monitor wellbore 108, where at least one stage of that monitor wellbore 108 has already been hydraulically fractured to create the fractures 110 (assumed, for this example, to be part of a common fracturing stage), when the adjacent treatment wellbore 106 undergoes hydraulic stimulation. A particular hydraulic fracture 112 emanating from the treatment wellbore 106 may grow in proximity to the fracture 110 but these fractures do not intersect. No fluid from the hydraulic fracturing process in the treatment wellbore 106 contacts any fluid in the hydraulic fractures 110 and no measureable pressure change in the fluid in the hydraulic fractures 110 is caused by advective or diffusive mass transport related to the hydraulic fracturing process in the treatment wellbore 106. Thus, the interaction of the fluids in the hydraulic fracture 112 with fluids in the subsurface matrix does not result in a recordable pressure change in the fluids in the fracture 110 that can be measured by the pressure sensor 114. The change in stress on a rock (in the subterranean zone 104) in contact with the fluids in the fracture 112, however, may cause a change in pressure in the fluids in the fracture 110, which can be measured as a pressure-induced poromechanic signal in the pressure sensor 114.

Poromechanic signals may be present in traditional pressure measurements taken in the monitor wellbore 108 while fracturing the treatment wellbore 106. For example, if a newly formed hydraulic fracture 112 overlaps or grows in proximity to a particular hydraulic fracture 110 in fluid communication with the pressure sensor 114 in the monitor wellbore 108, one or more poromechanic signals may be present. However, poromechanic signals may be smaller in nature than a direct fluid communication signal (e.g., a direct observed pressure signal induced by direct fluid communication such as a direct fracture hit or fluid connectivity through a high permeability fault).

Poromechanic signals may also manifest over a different time scale than direct fluid communication signals. Thus, poromechanic signals are often overlooked, unnoticed, or disregarded as data drift or error in the pressure sensor 114. However, such signals may be used, at least in part, to determine a fracture growth curve and other associated fracture dimensions of the hydraulic fractures 112 that emanate from the treatment wellbore 106.

The hydraulic fracture geometric modeling system 120 may be any computing device operable to receive, transmit, process, and store any appropriate data associated with operations described in the present disclosure. The illustrated hydraulic fracture geometric modeling system 120 includes hydraulic fracturing modeling application 130. The application 130 is any type of application that allows the hydraulic fracture geometric modeling system 120 to request and view content on the hydraulic fracture geometric modeling system 120. In some implementations, the application 130 can be and/or include a web browser. In some implementations, the application 130 can use parameters, metadata, and other information received at launch to access a particular set of data associated with the hydraulic fracture geometric modeling system 120. Further, although illustrated as a single application 130, the application 130 may be implemented as multiple applications in the hydraulic fracture geometric modeling system 120.

The illustrated hydraulic fracture geometric modeling system 120 further includes an interface 136, a processor 134, and a memory 132. The interface 136 is used by the hydraulic fracture geometric modeling system 120 for communicating with other systems in a distributed environment—including, for example, the pressure sensor 114—that may be connected to a network. Generally, the interface 136 comprises logic encoded in software and/or hardware in a suitable combination and operable to communicate with, for instance, the pressure sensor 114, a network, and/or other computing devices. More specifically, the interface 136 may comprise software supporting one or more communication protocols associated with communications such that a network or interface's hardware is operable to communicate physical signals within and outside of the hydraulic fracture geometric modeling system 120.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, ABAP, assembler, Perl, Python, .net, Matlab, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The processor 134 executes instructions and manipulates data to perform the operations of the hydraulic fracture geometric modeling system 120. The processor 134 may be a central processing unit (CPU), a blade, an application specific integrated circuit (ASIC), a field-programmable gate array (FPGA), or another suitable component. Generally, the processor 134 executes instructions and manipulates data to perform the operations of the hydraulic fracture geometric modeling system 120.

Although illustrated as a single memory 132 in FIG. 2, two or more memories may be used according to particular needs, desires, or particular implementations of the hydraulic fracture geometric modeling system 120. In some implementations, the memory 132 is an in-memory database. While memory 132 is illustrated as an integral component of the hydraulic fracture geometric modeling system 120, in some implementations, the memory 132 can be external to the hydraulic fracture geometric modeling system 120. The memory 132 may include any memory or database module and may take the form of volatile or non-volatile memory including, without limitation, magnetic media, optical media, random access memory (RAM), read-only memory (ROM), removable media, or any other suitable local or remote memory component. The memory 132 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the hydraulic fracture geometric modeling system 120.

The illustrated hydraulic fracture geometric modeling system 120 is intended to encompass any computing device such as a desktop computer, laptop/notebook computer, wireless data port, smart phone, smart watch, wearable computing device, personal data assistant (PDA), tablet computing device, one or more processors within these devices, or any other suitable processing device. For example, the hydraulic fracture geometric modeling system 120 may comprise a computer that includes an input device, such as a keypad, touch screen, or other device that can accept user information, and an output device that conveys information associated with the operation of the hydraulic fracture geometric modeling system 120 itself, including digital data, visual information, or a GUI.

As illustrated in FIG. 2, the memory 132 stores data, including one or more data structures 138. In some aspects, the data structures 138 may store structured data that represents or includes, for example, relationships between the treatment and monitor wellbores 106 and 108, respectively, fractures 112 and fractures 110, and the observed pressure signals 142. For example, in some aspects, each data structure 138 may be or include one or more tables that include information such as the observed pressure signals 142 and an identifier for each of the fractures 110 and 112. In some aspects, each data structure 138 may also include information that represents a relationship between a particular fracture 110, a particular fracture 112, and a particular observed pressure signal 142.

In some aspects, at least one of the data structures 138 stored in the memory 132 may be or include an observation graph. For example, turning to FIGS. 4A-4B, these figures show schematic illustrations of example implementations of an observation graph. Generally, each observation graph include nodes and edges. Each node represents a particular hydraulic fracture formed from a particular wellbore within a wellbore system. Each edge represents an observed pressure signal 142. The observation graph illustrates relationships, where each relationship includes two nodes and an edge that connects the two nodes. One of the nodes represents a particular hydraulic fracture 110 (e.g., a fracture initiated from the monitor wellbore 108) while the other node represents a particular hydraulic fracture 112 (e.g., a fracture initiated from the treatment wellbore 106). The edge represents the observed pressure signal 142 generated and measured (e.g., by the sensor 114) at the particular fracture 110 during the hydraulic fracturing operation that created the particular hydraulic fracture 112.

Figure 4A:
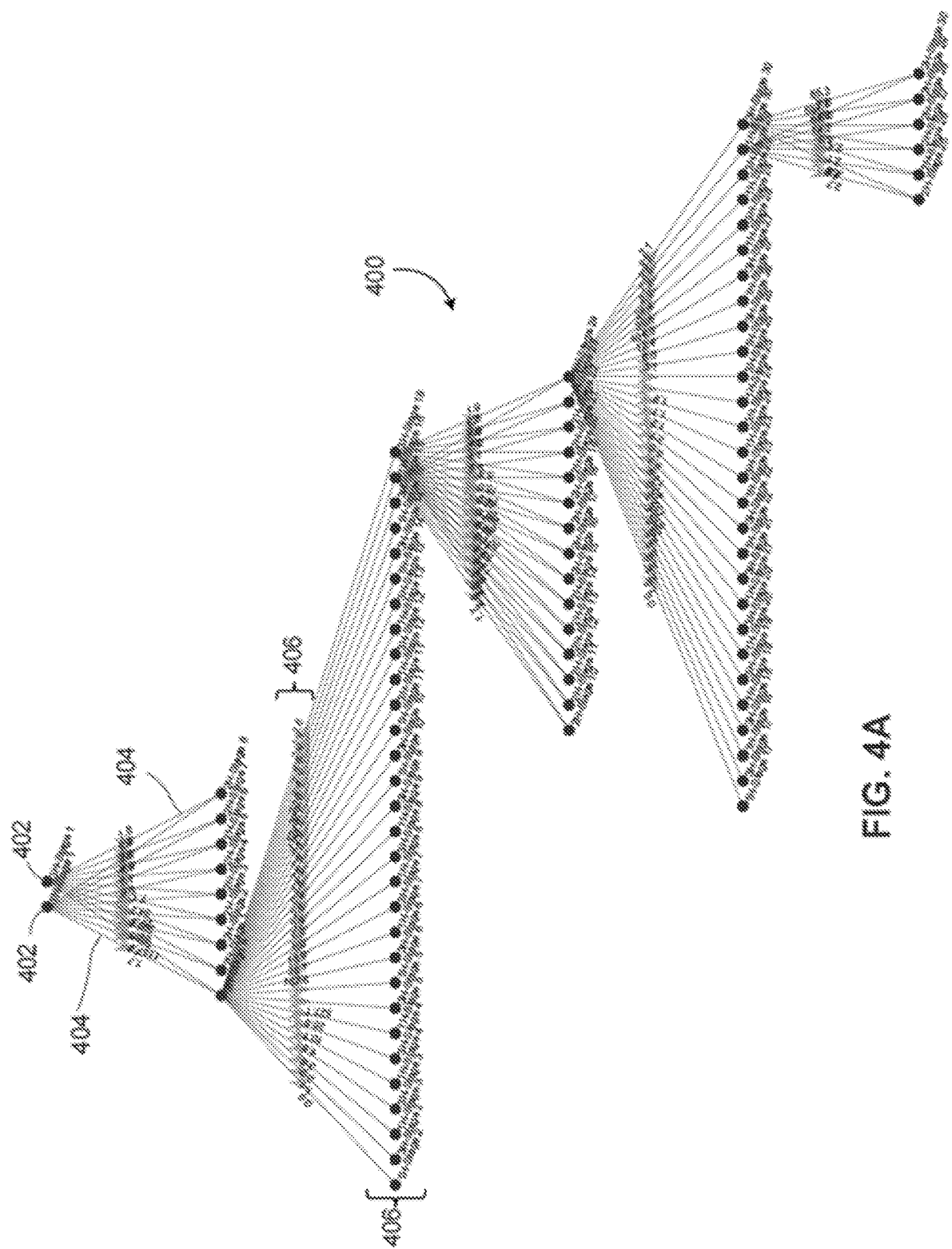
FIGS. 4A-4B are schematic illustrations of example implementations of a data structure that stores structure hydraulic fracturing data within a hydraulic fracture geometric modeling system.

FIG. 4A represents an example observation graph 400 that includes multiple nodes 402 and multiple edges 404. Each node 402 is connected to another node 404 (i.e., a single node) by a single edge 404. Thus, in some cases, each node 402, which represents a particular fracture initiated from a particular wellbore, is connected to only one other node 402 by a particular edge 404. Each node 402, in some aspects, includes data that identifies the particular wellbore (within, typically, a multi-wellbore system) and the particular hydraulic fracture from the particular wellbore). In some aspects, within a combination of two nodes 402 connected by a single edge 404, one of the nodes 402 represents a particular fracture located on a wellbore that is deemed or designated a "monitor wellbore" while the other node 402 represents a particular fracture located on a wellbore that is deemed or designated a "treatment wellbore." Because a wellbore may be, at one time instant or duration, designated a "monitor wellbore," while at another time instant or duration be designated a "treatment wellbore," a particular node 402 may be connected to two or more other nodes 402 (each connection being a single edge 404). In one connection, the particular node 402 may represent the particular fracture on a particular wellbore designated as a monitor wellbore, while in another connection (of the two or more connections), the particular node 402 may represent the particular fracture on the particular wellbore designated as a treatment wellbore (e.g., at a later time instant or duration during a series of hydraulic fracturing operations).

As further illustrated, this example observation graph 400, includes multiple levels (e.g., eleven shown here). Each level represents a particular hydraulic fracturing stage 406 that may include one or multiple hydraulic fractures (and thus one or multiple nodes 402).

Figure 4B:
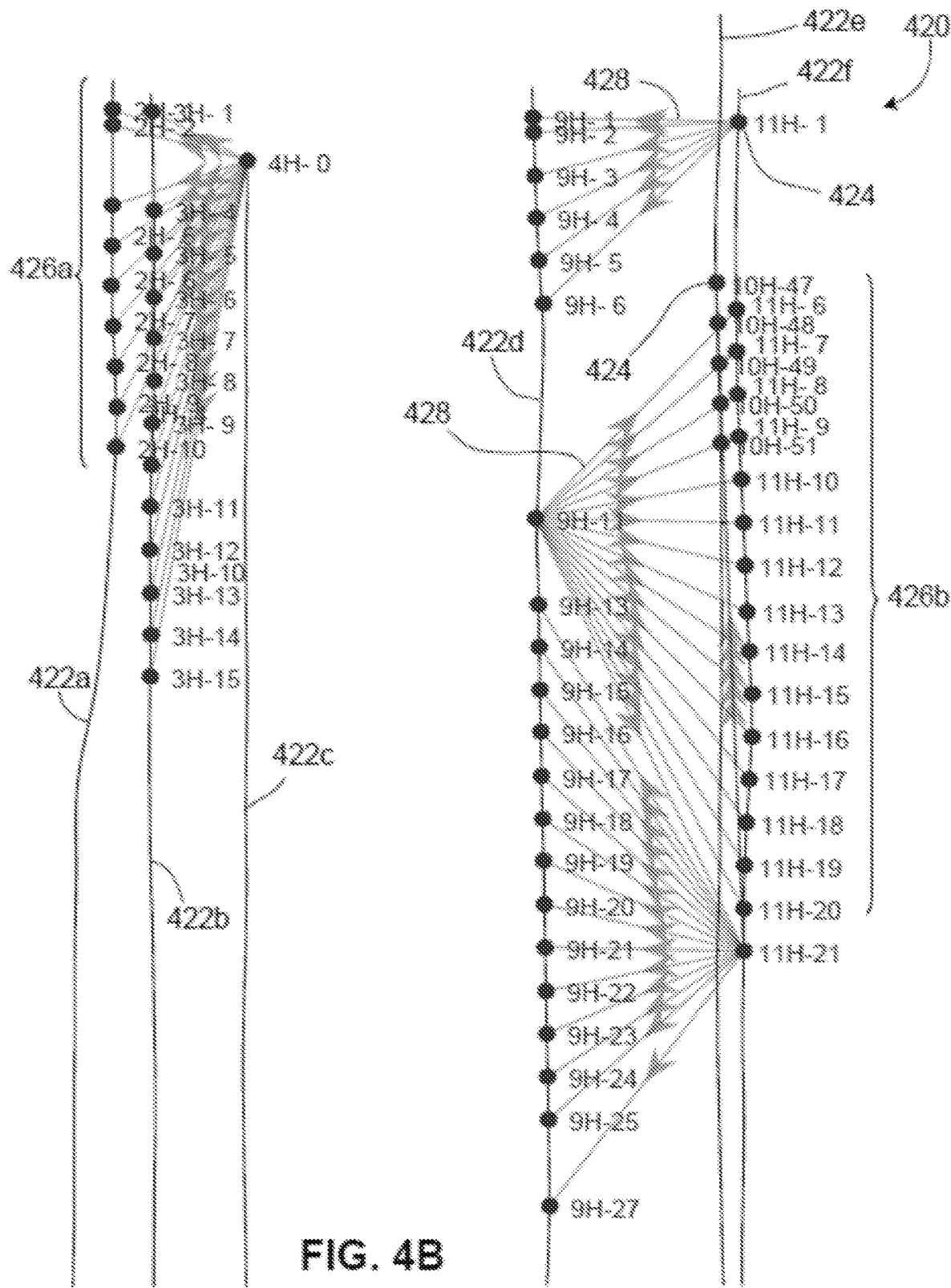

FIG. 4B represents an example observation graph 420 that includes multiple nodes 424 (one labeled here) and multiple edges 428 (one labeled here). In some aspects, each node 424 is connected to another node 424 (i.e., a single node) by a single edge 428. Thus, in some cases, each node 424, which represents a particular fracture initiated from a particular wellbore, is connected to only one other node 424 by a particular edge 428. Each node 424, in some aspects, includes data that identifies the particular wellbore (within, typically, a multi-wellbore system) and the particular hydraulic fracture from the particular wellbore). This form of the observation graph 420 also includes representations (e.g., lines) of each of the wellbores 422 within a multiple wellbore system.

In some aspects, within a combination of two nodes 424 connected by a single edge 428, one of the nodes 424 represents a particular fracture located on a wellbore that is deemed or designated a "monitor wellbore" while the other node 424 represents a particular fracture located on a wellbore that is deemed or designated a "treatment wellbore." Because a wellbore may be, at one time instant or duration, designated a "monitor wellbore," while at another time instant or duration be designated a "treatment wellbore," a particular node 424 may be connected to two or more other nodes 424 (each connection being a single edge 428). In one connection, the particular node 424 may represent the particular fracture on a particular wellbore designated as a monitor wellbore, while in another connection (of the two or more connections), the particular node 424 may represent the particular fracture on the particular wellbore designated as a treatment wellbore (e.g., at a later time instant or duration during a series of hydraulic fracturing operations).

Here, each wellbore 422a-422f may be a treatment wellbore or a monitor wellbore, or may be both at different time instants or time durations during the hydraulic fracturing operations. As further shown in the observation graph 420, a hydraulic fracturing stage group 426 (which includes one or more fractures, and thus one or more nodes 424). Hydraulic fracturing stage groups 426a-426b are shown here for illustrative purposes.

Turning back to FIG. 2, the memory 132, in this example, also stores modeled pressure signals 140 that are, for example, used to calculate or determine hydraulic fracture geometry data 144 (also stored in the memory 132 in this example system). In some aspects, the modeled pressure signals 140 may represent a modeled fluid pressure at a particular hydraulic fracture 110 on the monitor wellbore 108 due to a particular hydraulic fracture 112 being created on the treatment wellbore 106. The modeled fluid pressure may be determined, for example, by a finite element model that predicts (or models) the fluid pressure at the particular hydraulic fracture 110 on the monitor wellbore 108 due to the particular hydraulic fracture 112 being created on the treatment wellbore 106 based on, for example, the fracturing parameters (e.g., pumped volume of hydraulic fracturing liquid, pressure of pumped hydraulic fracturing liquid, flow rate of hydraulic fracturing liquid, viscosity and density of hydraulic fracturing liquid, geologic parameters, and other data).

Figure 3A:
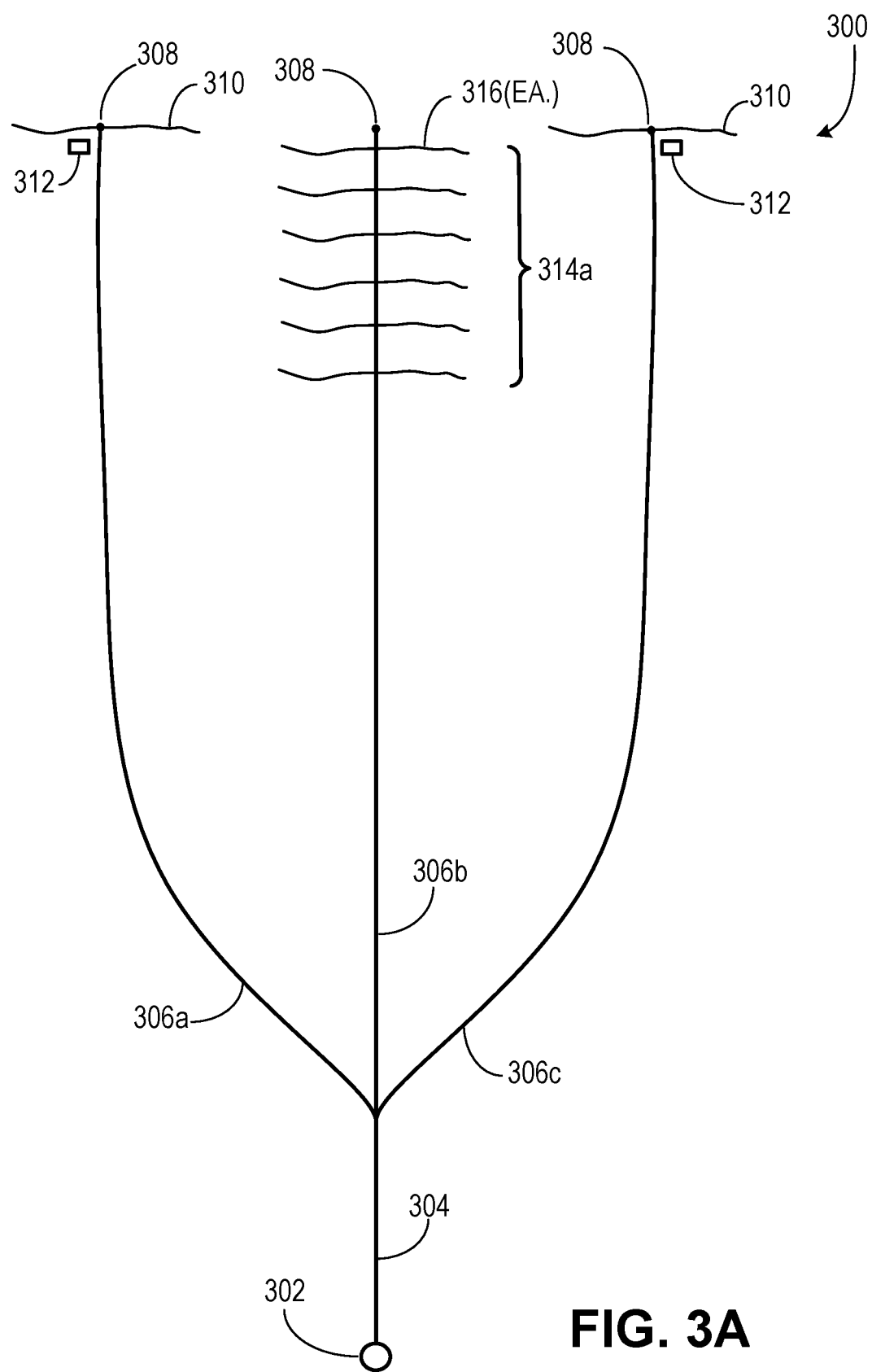
FIGS. 3A-3D illustrate a sequential process for hydraulically fracturing multiple wellbores from which a hydraulic fracture geometric modeling system may determine geometries of the hydraulic fractures.

FIGS. 3A-3D illustrate plan or plat views of a sequential process for hydraulically fracturing multiple wellbores from which the hydraulic fracture geometric modeling system 120 may determine geometries 144 of the hydraulic fractures. For example, FIGS. 3A-3D illustrate an example "zipper" fracturing process in which multiple wellbores are sequentially fractured, with each wellbore within the system being, at times during the process, a treatment wellbore and at other times in the process, a monitor wellbore. For instance, as shown in FIG. 3A, a vertical wellbore 304 is formed from an entry location 302 (at a terranean surface). Directional wellbores 306a-306c are formed from the vertical wellbore 304, with each directional wellbore 306 having, for example, a radiussed portion and a horizontal portion. In some aspects, the directional wellbores 306a-306c may include horizontal portions that land in the same rock formation, different rock formations, at the same true vertical depth (TVD) or at different TVDs. Each directional wellbore 306a-306c ends at a toe 308.

As shown in FIG. 3A, during an initial part of the fracturing operation, pressure sensors 312 are placed in wellbores 306a and 306c once a hydraulic fracture 310 is formed in each. Thus, during this part, wellbores 306a and 306c are monitor wellbores and wellbore 306b is a treatment wellbore. Wellbore 306b is subsequently fractured to create multiple hydraulic fractures 316 in a stage 314a of hydraulic fractures 316. The hydraulic fractures 310, therefore, are considered monitor (or observation) fractures while the fractures 316 are treatment fractures. Pressures observed in the fractures 310 (by the sensor 312) may be stored (e.g., in a data structure) and correlated to a particular fracture 310-fracture 316 combination. Thus, in the example data structure of an observation graph, a two node-one edge combination may include: a designation of one of the observation fractures 310 (e.g., designating the particular wellbore 306 and the particular fracture), a designation of a particular treatment fracture 316 within the stage 314a of treatment fractures, and the observed pressure recorded by the sensor 312 (in the wellbore of the designated observation fracture 310) during the operation to create the particular treatment fracture 316.

Figure 3B:
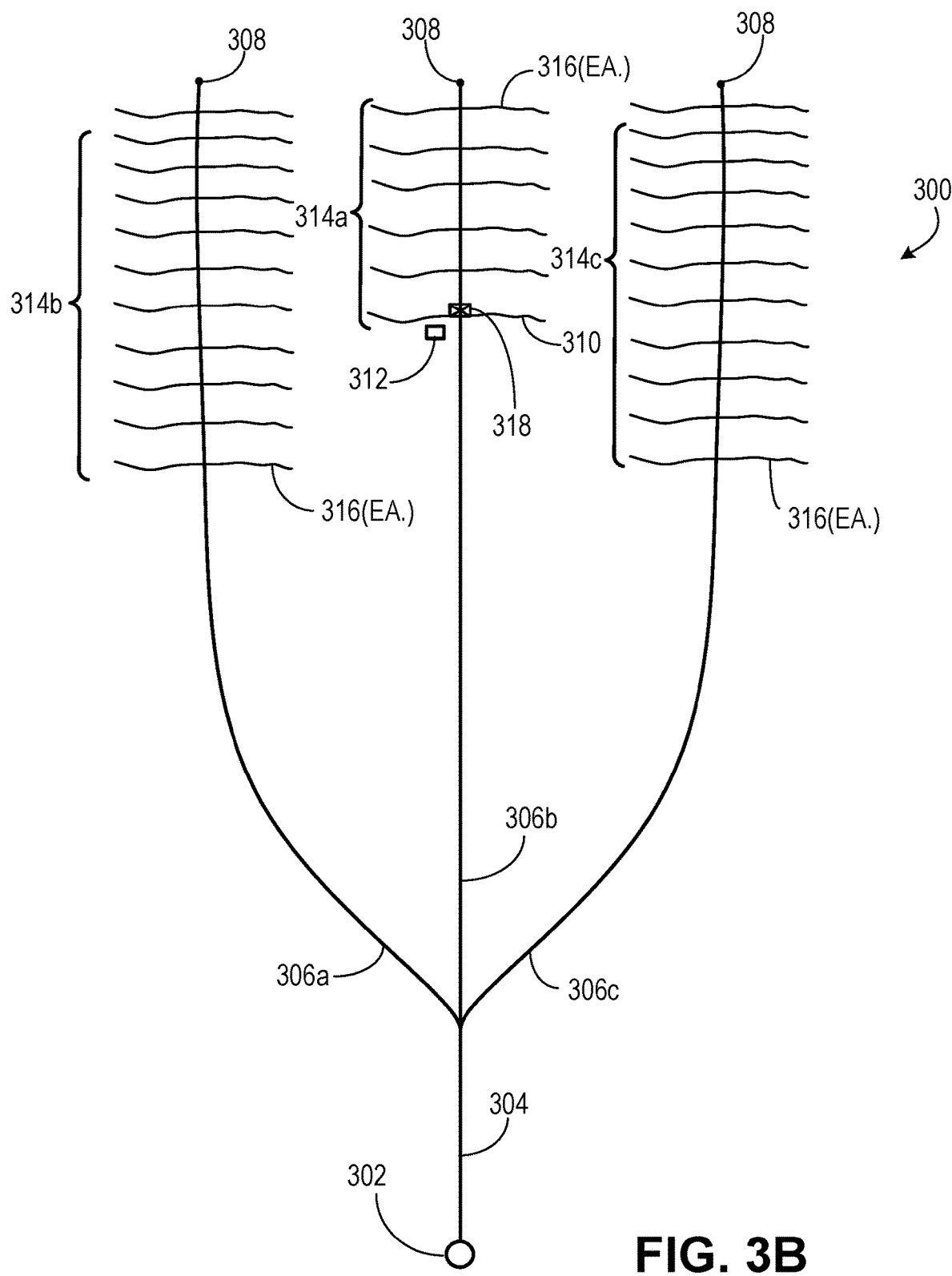

FIG. 3B shows a next part of the fracturing operation. Here, a plug or seal 318 is placed in the wellbore 306b downhole of the last treatment fracture 316 and a pressure sensor 312 is also placed in the wellbore 306b. An uphole treatment fracture 316 (e.g., a fracture nearest the entry 302) therefore, becomes an observation fracture 310 as shown. Subsequently, both wellbores 306a and 306c are hydraulically fractured to create multiple treatment fractures 316 in stages 314b and 314c.

Figure 3C:
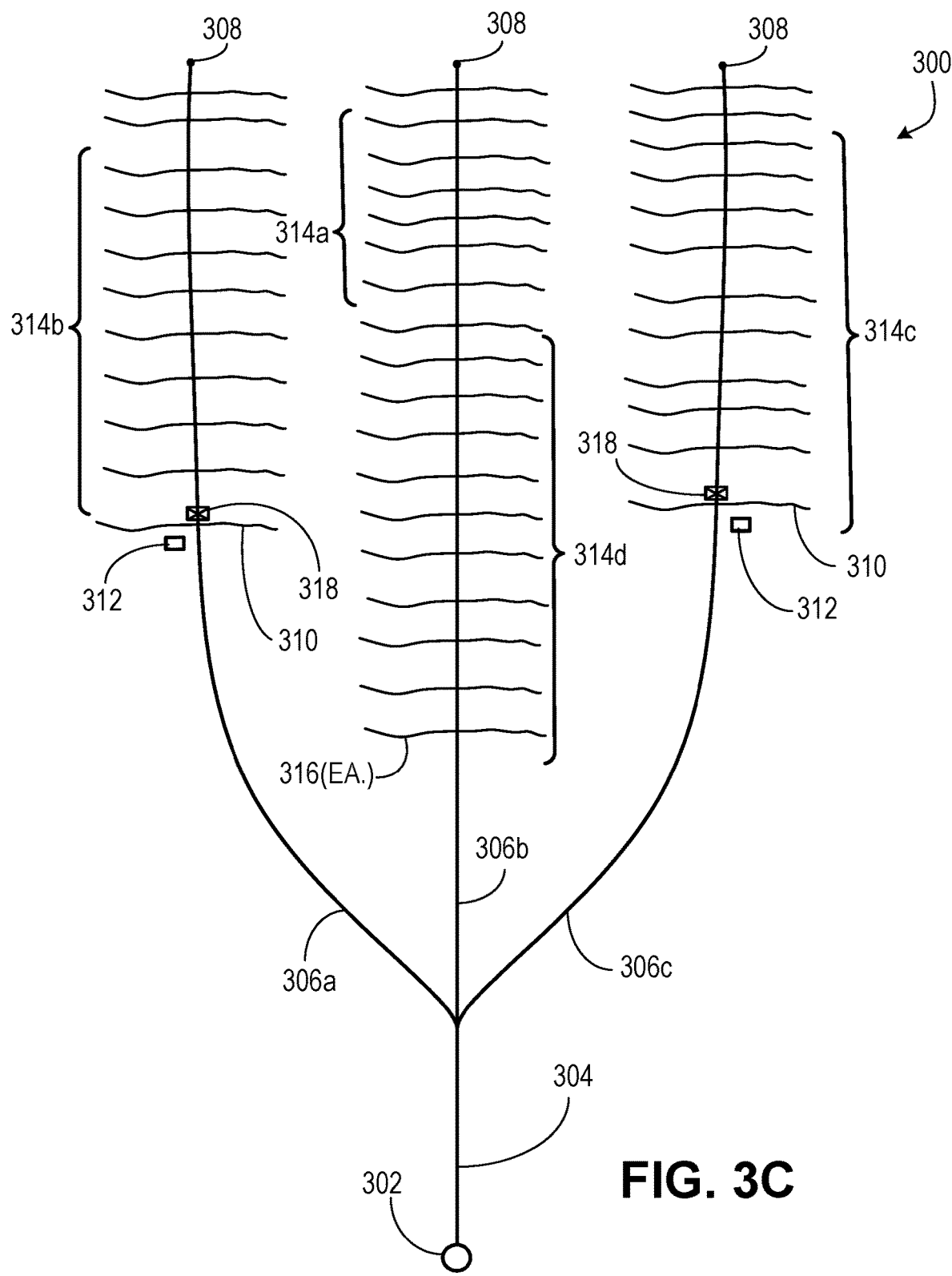

FIG. 3C shows a next part of the fracturing operation. Here, plugs or seals 318 are placed in the wellbores 306a and 306c (as shown) downhole of the last treatment fracture 316 and pressure sensors 312 are also placed in the wellbores 306a and 306c. Uphole treatment fractures 316 in wellbores 306a and 306c (e.g., respective fractures nearest the entry 302) therefore, become observation fractures 310 as shown. Subsequently, wellbore 306b is hydraulically fractured to create treatment fractures 316 in stage 314d.

Figure 3D:
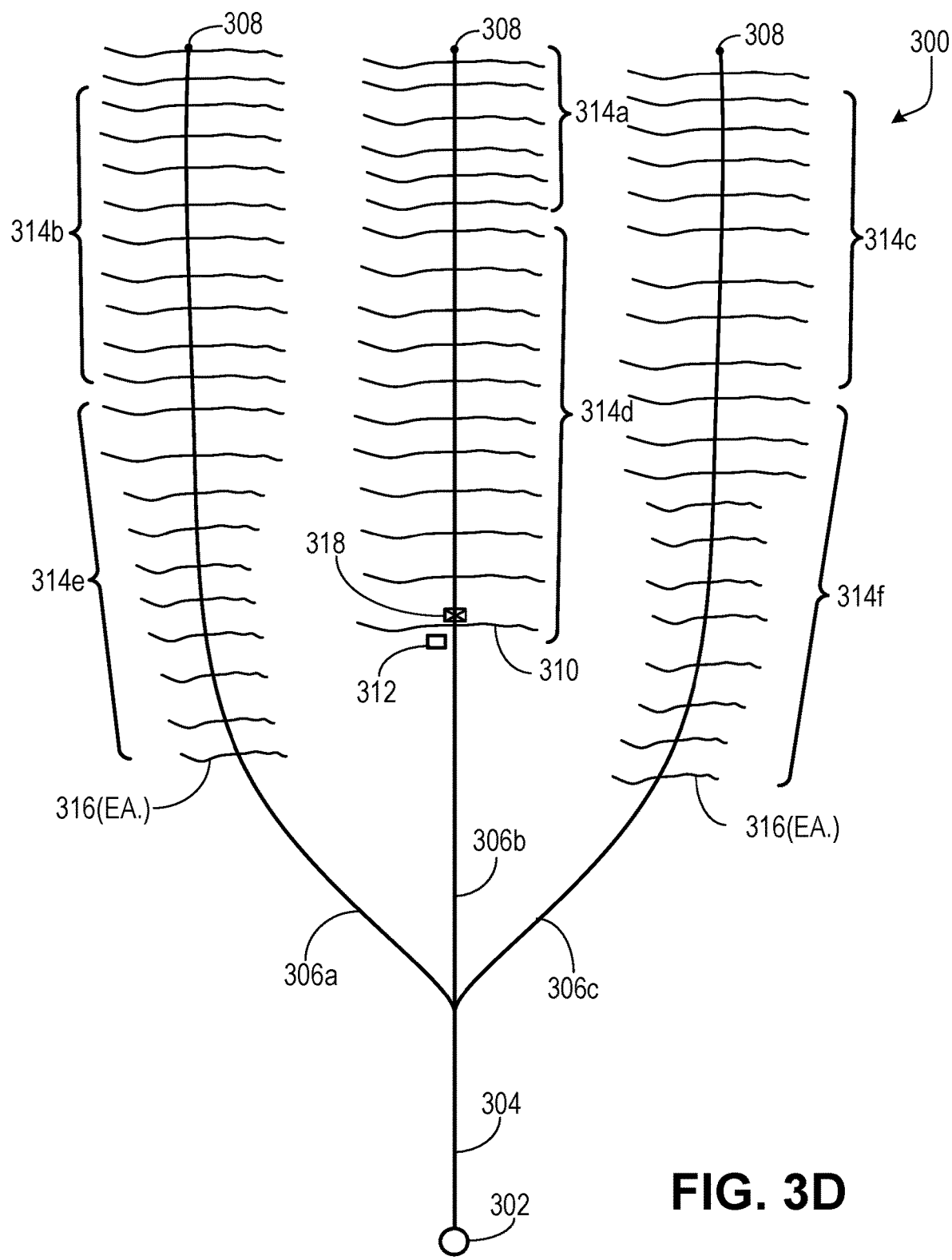

FIG. 3D shows a next part of the fracturing operation. Here, a plug or seal 318 is placed in the wellbore 306b downhole of the last treatment fracture 316 and the pressure sensor 312 is also placed in the wellbore 306b. An uphole treatment fracture 316 (e.g., a fracture nearest the entry 302) therefore, becomes an observation fracture 310 as shown. Subsequently, both wellbores 306a and 306c are hydraulically fractured to create multiple treatment fractures 316 in stages 314e and 314f.

As shown in FIGS. 3A-3D, multiple wellbores may be fractured in particular sequences. Based on the sequential fracturing operation, a data structure (e.g., an observation graph) may be built and include data such as fracture identifiers (e.g., identifying the particular wellbore and particular fracture emanating from that wellbore) as well as observed fluid pressures. The observed fluid pressures may be measure by one or more pressure sensors located in one or more monitor wellbores as a treatment wellbore is being fractured. The data structure may also correlate particular observed fluid pressures with particular fractures (e.g., an observed fluid pressure correlated to a pair of fractures that includes one monitor wellbore fracture and one treatment wellbore fracture).

Figure 5:
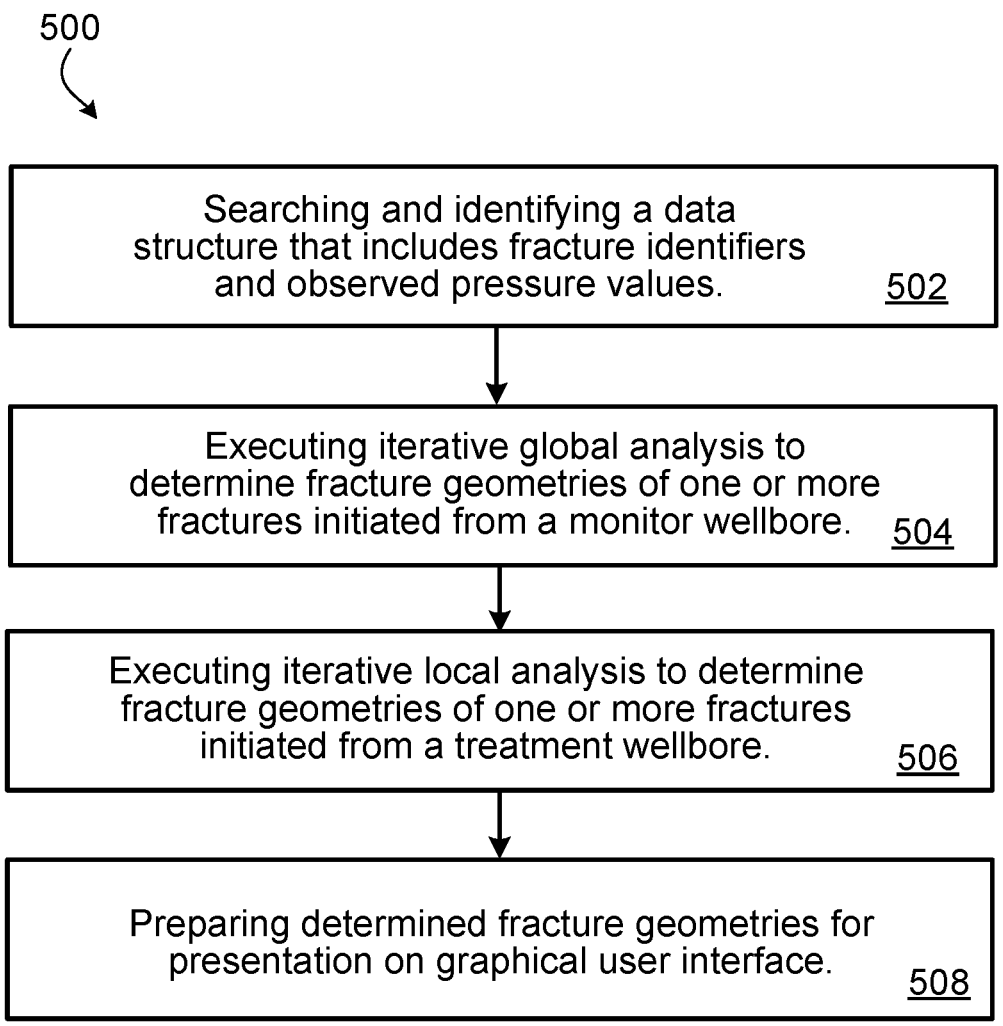
FIGS. 5-7 are flowcharts that illustrate example methods for determining hydraulic fracture geometries.
Figure 6:
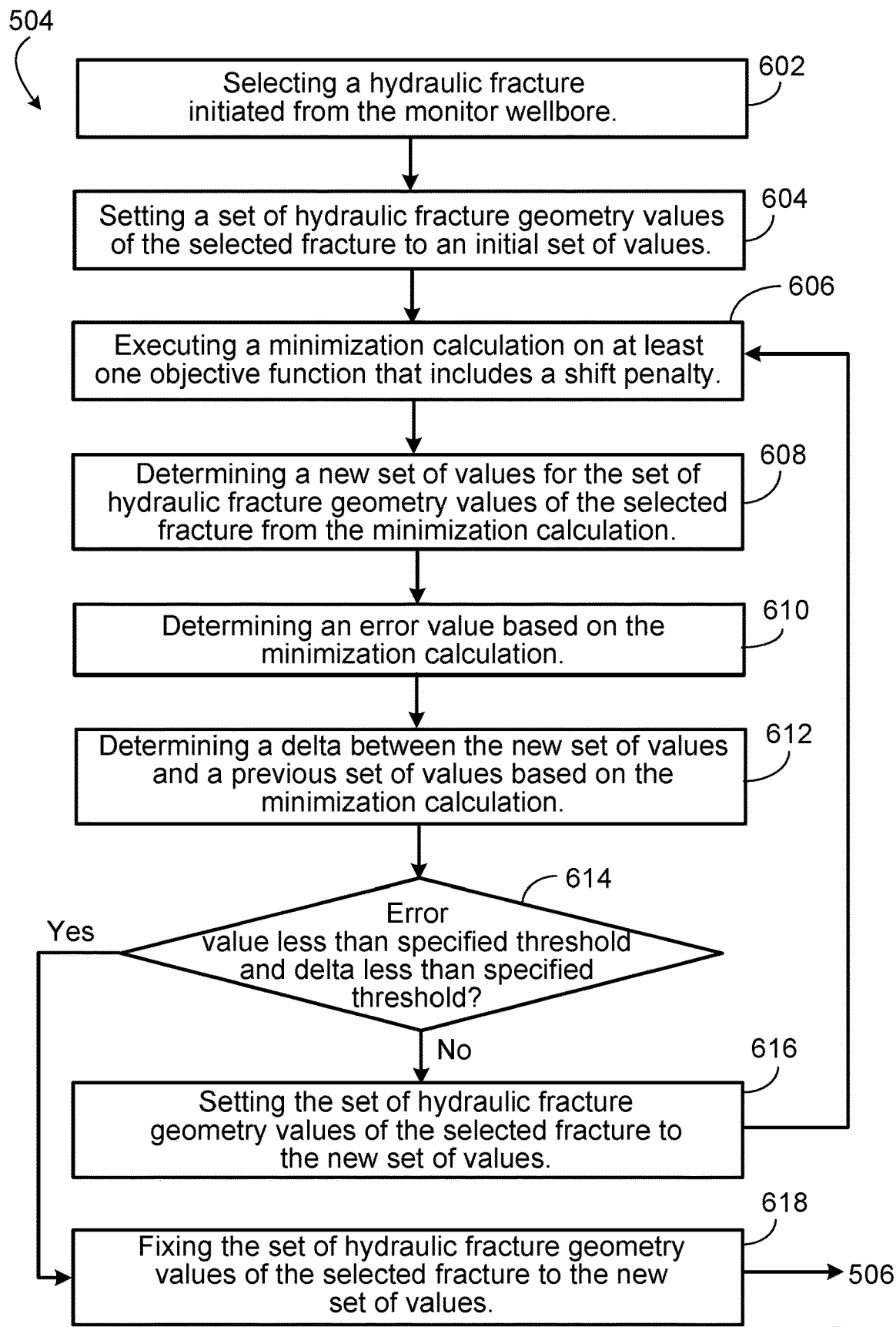
Figure 7:
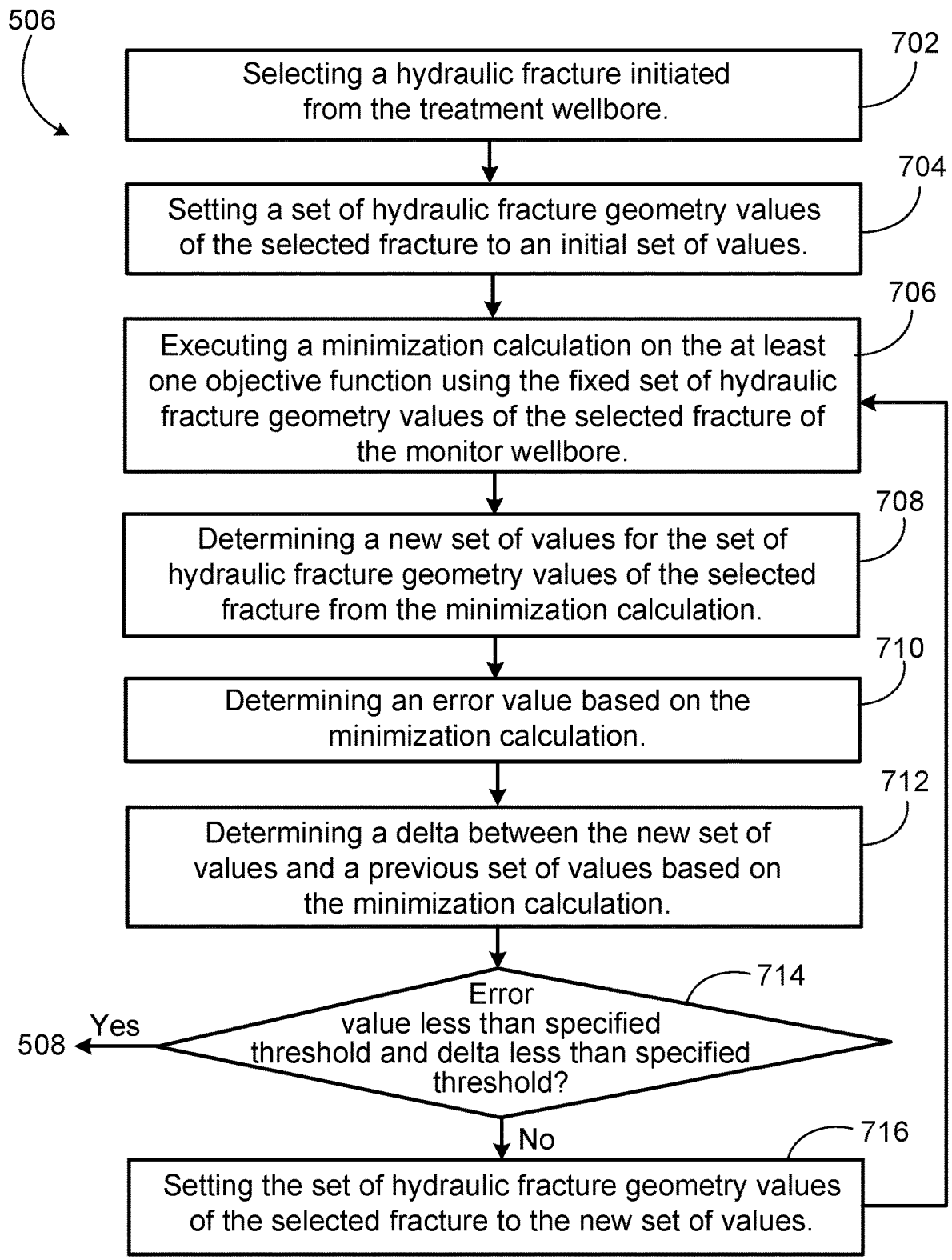

FIGS. 5-7 are flowcharts that illustrate example methods 500, 600, and 700 for determining hydraulic fracture geometries. In some aspects, one or more of methods 500, 600, and 700 can be executed by or with the hydraulic fracture geometric modeling system 120 within a single- or multi objective non-linear constraint optimization analysis (e.g., sequential quadratic programming technique, interior point technique, constrained boundary technique, or otherwise). Method 500 may begin at step 502, which includes searching and identifying a data structure that includes fracture identifiers and observed pressure values. For example, as shown in FIG. 2, one or more data structures 138 may be stored in memory 132. In some examples, the data structures 138 may be observation graphs that store structured data that includes, for example, hydraulic fracture identifiers and observed fluid pressure values. In some aspects, the observation graph may include nodes and edges, with the nodes storing the hydraulic fracture identifying data (e.g., data that indicates a particular wellbore and a particular fracture) and the edges storing pressure data (e.g., an observed fluid pressure at a particular monitor fracture formed from a monitor wellbore based on a fracturing process at a particular treatment fracture from a treatment wellbore).

Method 500 may continue at step 504, which includes executing an iterative macro analysis to determine fracture geometries of one or more fractures initiated from a monitor wellbore. For example, in some aspects, fracture geometry of a particular fracture of a monitor wellbore (or monitor wellbores) may first be determined or calculated. In some aspects, fracture geometry may include a set of values, including fracture length ($X_f$), fracture height ($H_f$), horizontal shift (e.g., shift in the plane of the fracture) ($x_o$), vertical shift (e.g., vertically from wellbore center) ($z_o$), a shift along a wellbore length (e.g., laterally from stage heel location) ($y_o$), and offset azimuthal angle ($\Theta$). In some aspects, of course, $X_f$ can represent a fracture half-length. Thus, a vector, $\tilde{x}^k$, may represent a fracture geometry of any particular fracture, k, with k representing an identifier of the fracture (e.g., with each fracture having a unique identifier):

$$\bar{x}^k = \begin{Bmatrix} X_f^k \\ H_f^k \\ x_o^k \\ y_o^k \\ z_o^k \\ \theta^k \end{Bmatrix}$$

Figure 9:
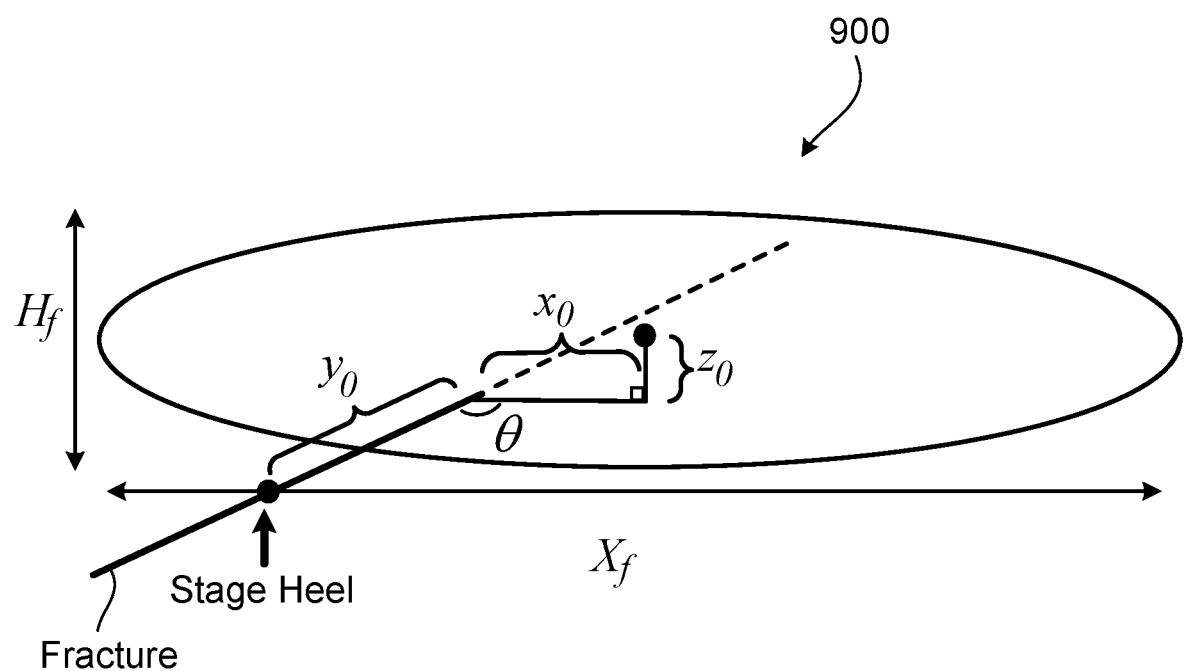
FIG. 9 is a graphical representation of a vector that represents fracture degrees of freedom of a hydraulic fracture.

This vector (e.g., the fracture degrees of freedom) is represented graphically in FIG. 9 through graph 900.

Turning to FIG. 6, this flowchart represents an example implementation of step 504 (e.g., an iterative macro analysis to determine fracture geometries of one or more fractures initiated from a monitor wellbore). The method of step 504 may begin at step 602, which includes selecting a hydraulic fracture initiated from the monitor wellbore. For example, in some aspects, a user may select a particular fracture that emanates from the monitor wellbore. In some aspects, the system 120 may select a particular hydraulic fracture based on, e.g., that fracture's order within the sequence of fractures within the system of fractures. For instance, with reference to FIGS. 3A-3D, one of the initial monitor fractures 310 shown in FIG. 3A may be selected.

The method of step 504 may continue at step 604, which includes setting a set of hydraulic fracture geometry values of the selected fracture to an initial set of values. For instance, the set of geometry values, $x_i$, for the selected fracture may be set to feasible values, i.e., values that are feasible given, e.g., wellbore location, fracturing operation parameters (e.g., fluid volume pumped, fluid pressure during fracturing, fluid viscosity and/or density, etc.) present during the fracturing operation that initiated the selected hydraulic fracture.

The method of step 504 may continue at step 606, which includes executing a minimization calculation on at least one objective function that includes a shift penalty. For instance, in some aspects, the values set in step 604, one or more observed pressure values associated with poromechanic pressures measured at the selected hydraulic fracture during fracturing operations to initiate one or more treatment fractures (e.g., taken from the identified observation graph), and modeled pressure(s) corresponding to the observed fluid pressures (e.g., from the finite element analysis) are set within an objective function.

The objective function may, in some aspects, minimize a difference between the observed pressure values and the modeled pressure values. In some aspects, the objective function may minimize a difference in the mean of the squares of the observed pressure values and the modeled pressure values. For instance, the objective function, $f_o(x)$, may be defined as:

$$f_o(x^i) = \frac{1}{m} \sum_{1}^{m} [dP(x_T^i, x_M^i) - MP(x_T^i, x_M^i)]^2 \quad \text{Eq. 1}$$

where, $dP(x_T^i, x_M^i)$ is an observed fluid pressure (e.g., from the observation graph) between the selected monitor (M) fracture and each treatment (T) fracture that the selected monitor fracture "observes" (e.g., experiences a poromechanic fluid pressure during fracturing), and $MP(x_T^i, x_M^i)$ is the modeled fluid pressure (e.g., from the finite element analysis) between the selected monitor fracture and each treatment fracture that the selected monitor fracture observes. In Equation 1, m represents the number of observed pressures.

In some aspects, step 606 may include executing a minimization calculation on a second objective function. For example, the objective function, $f_o(x)$, described above may be a first objective function $f_o^1(x)$, and a second objective function may minimize an absolute difference between a fracture area of the selected hydraulic fracture and a mean fracture area of the fractures within a particular fracture stage that includes the selected fracture. For instance, the second objective function, $f_o^2(x)$, may be defined as:

$$f_o^2(x^i) = \frac{1}{n} \sum_{i=1}^{n} (A^i - \text{mean}(A^i))^2 \quad \text{Eq. 2}$$

where $A^i$ is the fracture area (e.g., the product of $2X_f$ and $H_f$) and n is the number of fractures within a particular stage group that includes the selected fracture. This objective function, for example, may ensure that the area of each fracture within a fracture stage group that includes multiple fractures is the same as (or similar to) the mean fracture area of that stage group (e.g., due to similar or identical fracture operation parameters).

In some aspects, step 606 may include executing a minimization calculation on a third objective function. For example, a third objective function may minimize a standard deviation in a fracture shift (in at least one of the x-, y-, or z-directions) in all of the treatments fractures within a particular stage of fractures observed by the selected monitor fracture. For instance, the third objective function, $f_o^3(x)$, may be defined as:

$$f_o^3(x^i) = \left( \frac{\text{Std. dev.}(x_f)}{K1} \right)^2 + \left( \frac{\text{Std. dev.}(z_f)}{K2} \right)^2 \quad \text{Eq. 3}$$

where K1 and K2 are constants (adjustable) that account for variances in wellbore location in the underground rock formation.

In some aspects, one, two, or all of the described objective functions may be minimized in step 606. For example, in some aspects, only one of the objective functions (e.g., the first, second, or third) may be minimized in step 606. In other aspects, two of the three objective functions may be minimized in step 606. In other aspects, all three of the objective functions (or other objective functions in accordance with the present disclosure) may be minimized in step 606.

In some aspects, step 606 may include applying a constraint associated with an intersection of the selected fracture and the monitor wellbore. For example, in some aspects, step 604 may require that a center location (e.g., in one or more of the x-, y-, or z-directions) of the selected fracture be no further from a radial center of the monitor wellbore than the fracture half-length ($X_f$) in the x-direction and/or half of the fracture height ($H_f$) in the z-direction. In some aspects, this constraint may be a binary calculation (e.g., pass or fail). If the binary calculation results in a "fail," in some aspects, the system 120 may be programmed to add entropy to the analysis and find a point location near the center location of the selected fracture that is a feasible center location relative to the radial center of the monitor wellbore.

The method of step 504 may continue at step 608, which includes determining a new set of values for the set of hydraulic fracture geometry values of the selected fracture from the minimization calculation. For example, based on the minimization of the one or more objective functions, assessment of the shift penalty, and any other constraints, a new set of geometry values, $x_{k+1}{}^i$, (with $x_k{}^i$ representing the previously determined or set vector) is calculated.

The method of step 504 may continue at step 610, which includes determining an error value based on the minimization calculation. For example, in some aspects, as the at least one objective function is minimized to a particular value, the minimized particular value is compared to a particular threshold value (e.g., $1 \times 10^{-6}$).

The method of step 504 may continue at step 612, which includes determining a delta between the new set of values and a previous set of values based on the minimization calculation. For example, in some aspects, a difference between the previous vector values, $x_k{}^i$, and the new vector values, $x_{k+1}{}^i$, are compared according to:

$$\|x_{k+1}{}^i - x_k{}^i\| \leq \varepsilon \qquad \text{Eq. 4}$$

where $\varepsilon$ is an error threshold value (e.g., $1 \times 10^{-6}$) and $\|x_{k+1}{}^i - x_k{}^i\|$ denotes the l2-error norm of $(x_{k+1}{}^i - x_k{}^i)$.

The method of step 504 may continue at step 614, which includes a determination of whether the error value is less than a specified threshold and the delta is less than a specified threshold. If the error values are not satisfied, then the method may continue at step 616, which includes setting the set of hydraulic fracture geometry values of the selected fracture to the new set of values, and returning to step 606. Thus, the method of step 504 may iterate until the error value is less than the specified threshold and the delta is less than the specified threshold.

If such thresholds are satisfied, then the method may continue at step 618, which includes fixing the set of hydraulic fracture geometry values of the selected fracture to the new set of values. Step 618 may continue back to step 506 of method 500.

Step 506 includes executing an iterative fine analysis to determine fracture geometries of one or more fractures initiated from a treatment wellbore. Turning to FIG. 7, this flowchart represents an example implementation of step 506. The method of step 506 may begin at step 702, which includes selecting a hydraulic fracture initiated from the treatment wellbore. For example, in some aspects, a user may select a particular fracture that emanates from the treatment wellbore. In some aspects, the system 120 may select a particular hydraulic fracture based on, e.g., that fracture's order within the sequence of fractures within the system of fractures. For instance, with reference to FIGS. 3A-3D, one of the initial treatment fractures 316 shown in FIG. 3A may be selected.

The method of step 506 may continue at step 704, which includes setting a set of hydraulic fracture geometry values of the selected fracture to an initial set of values. For instance, the set of geometry values, $x_i$, for the selected fracture may be set to feasible values, i.e., values that are feasible given, e.g., wellbore location, fracturing operation parameters (e.g., fluid volume pumped, fluid pressure during fracturing, fluid viscosity and/or density, etc.) present during the fracturing operation that initiated the selected hydraulic fracture.

The method of step 506 may continue at step 706, which includes executing a minimization calculation on at least one objective function. In this example, for the fine analysis, the shift penalty may not be assessed.

For instance, in some aspects, the values set in step 704, one or more observed pressure values associated with poromechanic pressures measured at the selected hydraulic fracture during fracturing operations to initiate one or more treatment fractures (e.g., taken from the identified observation graph), and modeled pressure(s) corresponding to the observed fluid pressures (e.g., from the finite element analysis) are set within an objective function.

The objective function may, in some aspects, minimize a difference between the observed pressure values and the modeled pressure values. In some aspects, as with the macro analysis, the objective function may minimize a difference in the mean of the squares of the observed pressure values and the modeled pressure values. For instance, the objective function, $f_o(x)$, may be defined as:

$$f_o(x^i) = \frac{1}{m} \sum_{1}^{m} [dP(x_T^i, x_M^i) - MP(x_T^i, x_M^i)]^2 \qquad \text{Eq. 1}$$

where, $dP(x_T{}^i, x_M{}^i)$ is an observed fluid pressure (e.g., from the observation graph) between the selected monitor (M) fracture and each treatment (T) fracture that the selected monitor fracture "observes" (e.g., experiences a poromechanic fluid pressure during fracturing), and $MP(x_T{}^i, x_M{}^i)$ is the modeled fluid pressure (e.g., from the finite element analysis) between the selected monitor fracture and each treatment fracture that the selected monitor fracture observes. In Equation 1, m represents the number of observed pressures.

In some aspects, step 706 may include executing a minimization calculation on a second objective function. For example, the objective function, $f_o(x)$, described above may be a first objective function $f_o{}^1(x)$, and a second objective function may minimize an absolute difference between a fracture area of the selected hydraulic fracture and a mean fracture area of the fractures within a particular fracture stage that includes the selected fracture. For instance, the second objective function, $f_o{}^2(x)$, may be defined as:

$$f_o^2(x^i) = \frac{1}{n} \sum_{i=1}^{n} (A^i - \text{mean}(A^i))^2 \qquad \text{Eq. 2}$$

where $A^i$ is the fracture area (e.g., the product of $2X_f$ and $H_f$) and n is the number of fractures within a particular stage group that includes the selected fracture. This objective function, for example, may ensure that the area of each fracture within a fracture stage group that includes multiple fractures is the same as (or similar to) the mean fracture area of that stage group (e.g., due to similar or identical fracture operation parameters).

In some aspects, one or both of the described objective functions may be minimized in step 706. For example, in some aspects, only one of the objective functions (e.g., the first or second) may be minimized in step 706. In other aspects, both of the objective functions may be minimized in step 706.

In some aspects, step 706 may include applying a constraint associated with an intersection of the selected fracture and the monitor wellbore. For example, in some aspects, step 604 may require that a center location (e.g., in one or more of the x-, y-, or z-directions) of the selected fracture be no further from a radial center of the monitor wellbore than the fracture half-length ($X_f$) in the x-direction and/or half of the fracture height ($H_f$) in the z-direction. In some aspects, this constraint may be a binary calculation (e.g., pass or fail). If the binary calculation results in a "fail," in some aspects, the system 120 may be programmed to add entropy to the analysis and find a point location near the center location of the selected fracture that is a feasible center location relative to the radial center of the monitor wellbore.

The method of step 506 may continue at step 708, which includes determining a new set of values for the set of hydraulic fracture geometry values of the selected fracture from the minimization calculation. For example, based on the minimization of the one or more objective functions and any other constraints, a new set of geometry values, $x_{k+1}^i$, (with $x_k^i$ representing the previously determined or set vector) is calculated.

The method of step 506 may continue at step 710, which includes determining an error value based on the minimization calculation. For example, in some aspects, as the at least one objective function is minimized to a particular value, the minimized particular value is compared to a particular threshold value (e.g., $1 \times 10^{-6}$).

The method of step 506 may continue at step 712, which includes determining a delta between the new set of values and a previous set of values based on the minimization calculation. For example, in some aspects, a difference between the previous vector values, $x_k^i$, and the new vector values, $x_{k+1}^i$, are compared according to:

$$\|x_{k+1}^i - x_k^i\| \leq \varepsilon \qquad \text{Eq. 4}$$

where $\varepsilon$ is an error threshold value (e.g., $1 \times 10^{-6}$) and $\|x_{k+1}^i - x_k^i\|$ denotes the l2-error norm of $(x_{k+1}^i - x_k^i)$.

The method of step 506 may continue at step 714, which includes a determination of whether the error value is less than a specified threshold and the delta is less than a specified threshold. If the error values are not satisfied, then the method may continue at step 716, which includes setting the set of hydraulic fracture geometry values of the selected fracture to the new set of values, and returning to step 706. Thus, the method of step 506 may iterate until the error value is less than the specified threshold and the delta is less than the specified threshold.

Figure 8A:
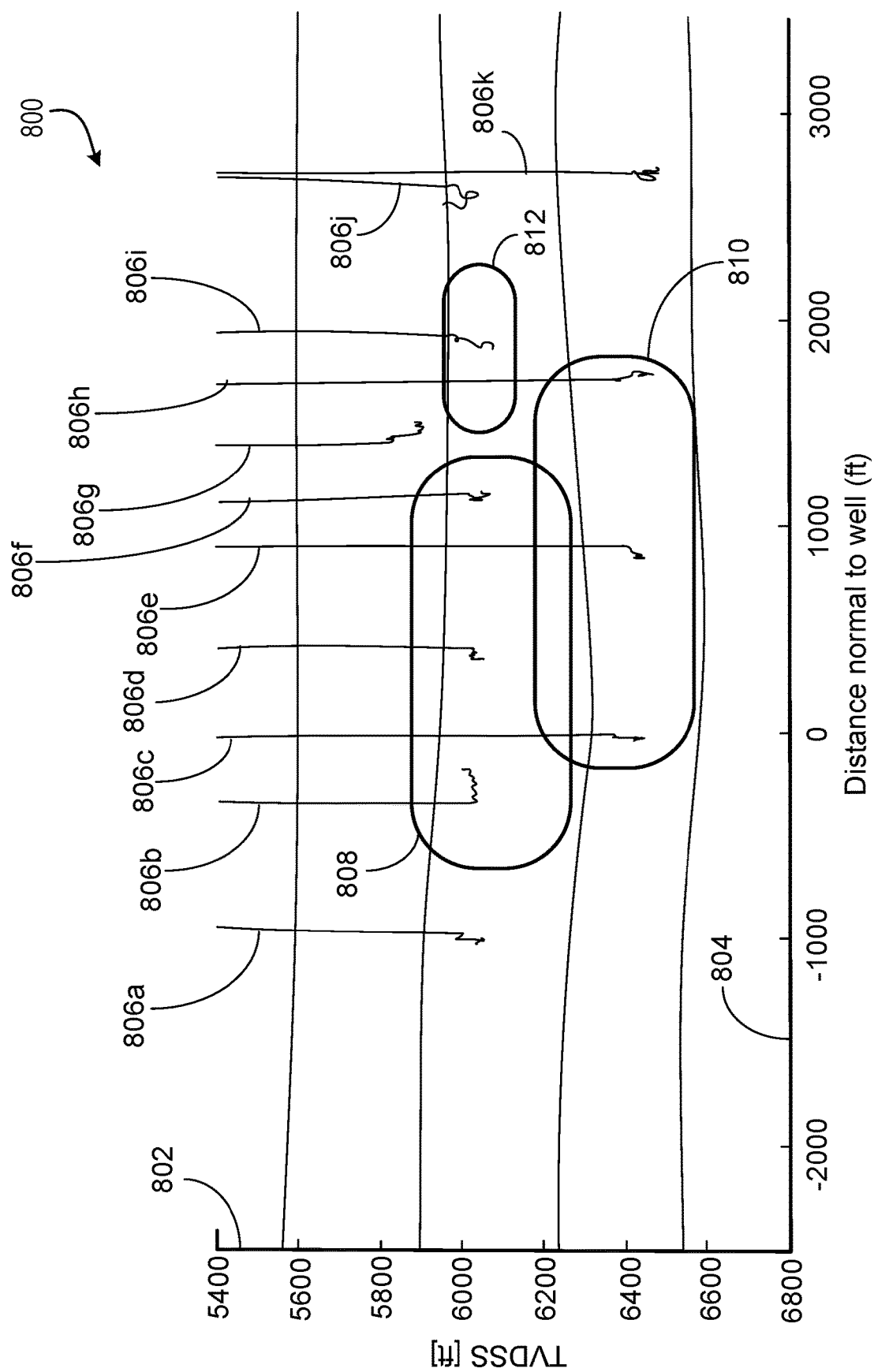
FIGS. 8A-8B illustrate example graphical outputs from a hydraulic fracture geometric modeling system.
Figure 8B:
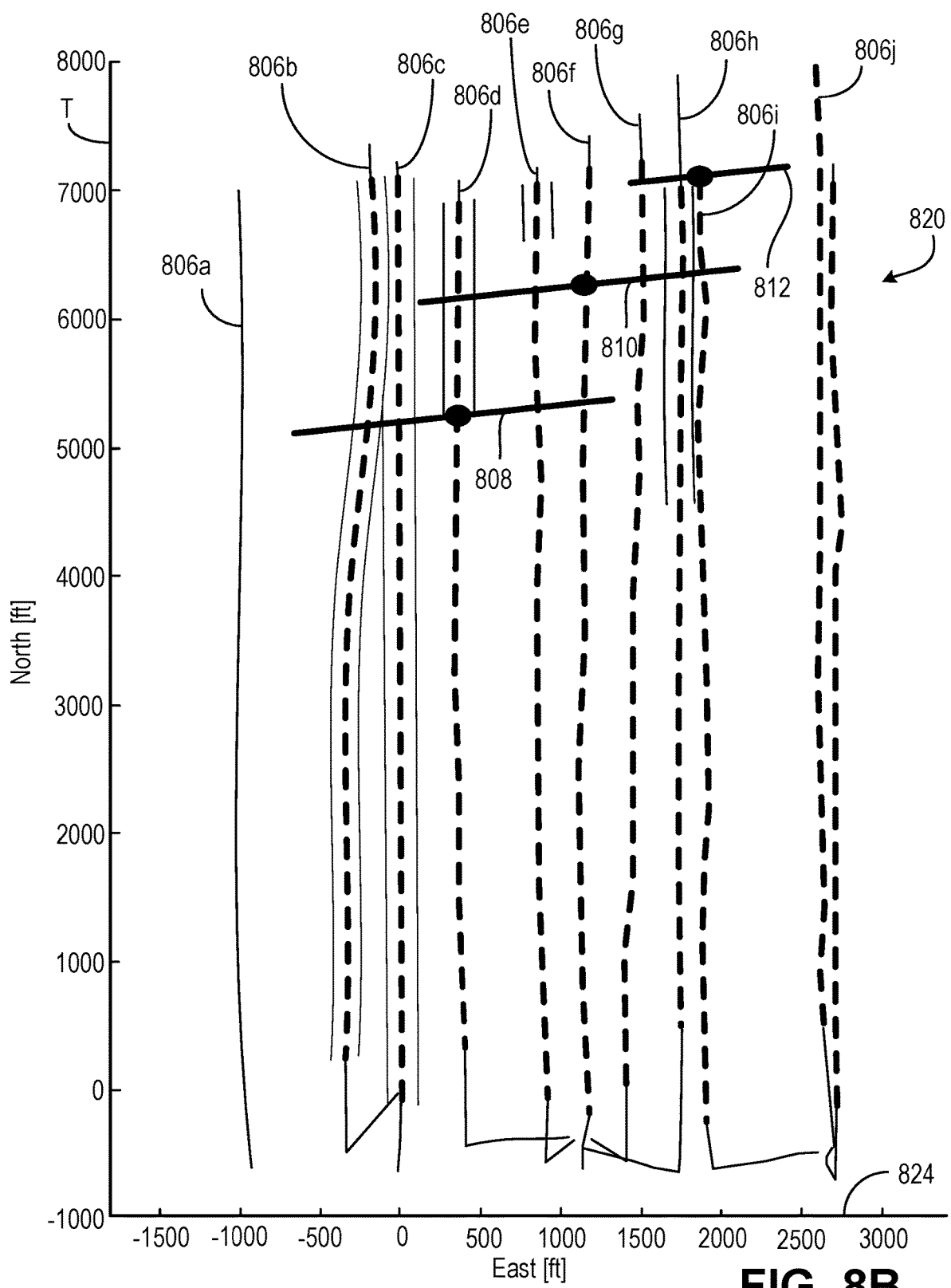

If such thresholds are satisfied, then the method may continue to step 508. Step 508 includes preparing the determined fracture geometries for presentation on a graphical user interface (GUI). FIGS. 8A-8B show example output data that includes or describes the calculated hydraulic fracture geometry data (e.g., of particular hydraulic fractures among multiple hydraulic fractures).

Method 500 may include further operations and steps as well. For example, in some aspects, the determined fracture geometries may be presented to a hydraulic fracture treatment operator, as well as recommendations based on the determined geometries. For instance, recommendations may include adjusting one or more parameters of the current hydraulic fracturing operation in the treatment wellbore 106 or a future hydraulic fracturing operation (e.g., in treatment wellbore 106 or another wellbore).

FIG. 8A illustrates a graphical representation 800 that shows a graph with a y-axis 802 that represents true vertical depth (in feet) relative to sea level (TVDSS) of the wellbores 806a-806k shown in the graph 800. An x-axis 804 represents a normal distance (in feet) to the well, which represents a case-specific axis that is perpendicular to the wellbore.

Graph 800 shows the wellbores 806a-806k in a "gun barrel" view, along with fractures 808, 810, and 812 with scaled, calculated geometries. For example, as shown, the fractures 808, 810, and 812 are illustrated in the graph 800 with scaled fracture half-lengths ($X_f$) and fracture heights ($H_f$) determined, e.g., by method 500.

FIG. 8B illustrates another graphical representation 820 that shows a graph with a y-axis 822 that represents a distance (in feet) from a particular reference point on the terranean surface (labeled as 0 feet). An x-axis 824 represents another distance (in feet) from a particular reference point on the terranean surface (labeled as 0 feet), which represents a case-specific axis that is perpendicular to the wellbore.

Graph 820 shows the wellbores 806a-806k in a "plan" or "plat" view, along with fractures 808, 810, and 812 with scaled, calculated geometries. For example, as shown, the fractures 808, 810, and 812 are illustrated in the graph 820 with scaled fracture half-lengths ($X_f$) and calculated angles ($\alpha$) determined, e.g., by method 500.

As described in the present disclosure, once identified, poromechanical signals can be used to estimate hydraulic fracture geometry by matching the observed responses in monitor stages to a "digital twin." For example, a three-dimensional numerical finite element analysis (FEA) used to generate modeled pressure responses with which the comparison to field observations takes place is an example of a "digital twin." The digital twin may account for the pad specific well trajectories, stage locations, and timing of the treatment to yield results that are representative of the rock and fracture mechanics that drive offset well pressure observations. In some aspects, as described now, a mathematical optimization problem may be constructed to determine fracture geometries and address questions of accuracy and uniqueness of the resulting solution.

In some examples, a target deployment process for mapping fracture geometries according to the present disclosure using the digital twin may include the following criteria: greater than or equal to 2 horizontal wells with well spacing less than two times the average fracture half-length; greater than or equal to 5 observed stages per monitor stage (can be relaxed to fewer with lower accuracy); limited faults and natural fractures in less than 20% of stages connected (may be extended to higher percentage but risk of inability to image is increased)—highly connected stages cannot be imaged; and average formation permeability of less than 10 millidarcys (mD).

The following notations and descriptions are used in the target deployment process:

TABLE 1

Notations and Descriptions

| Notation | Description |
| --- | --- |
| $N^{prm}$ | Number of fracture parameters per stage |
| $N^{cnst}$ | Number of constraints in the system |
| $N^{stg}$ | Number of stages |

TABLE 1-continued

Notations and Descriptions

| Notation | Description |
| --- | --- |
| $N^{rsp}$ | Number of Poromechanical Reponses |
| $N^{dof} = N^{stg} * N^{prm}$ | Number of degrees of freedom in the system |
| $N_{dof}^{r}$ | Number of retained degrees of freedom in the system |
| $\bar{x} = x_i: i = 1, \ldots, N^{dof}$ | Fracture parameters |
| $\bar{x}^k: k = 1, \ldots, N^{stg}$ | Fracture parameters for the $k^{th}$ stage |
| $\bar{w} = w_i: i = 1, \ldots, N^{dof}$ | Fine-Scale fracture parameters |
| $\bar{y} = y_j: j = 1, \ldots, N_{dof}^{r}$ | Optimization Variable |
| $D = D_{ij}$ | Macro-scale dependency matrix |
| $\bar{x}^* = x_i^*: i = 1, \ldots, N^{dof}$ | Optimal Solution Vector |
| $f_0(\bar{x})$ | Objective Function |
| $f_m(\bar{x}): m = 1, \ldots, N^{cnst}$ | $m^{th}$ Constraint Function |
| $b_m: m = 1, \ldots, N^{cnst}$ | $m^{th}$ Constraint Bounds |
| $R^l: l = 1, \ldots, N^{rsp}$ | $l^{th}$ Poromechanical response |
| $g^l(\{\bar{x}^k\})$ | Poromechanical pressure response model function |
| $\Omega$ | Feasible region |
| $h(R^l)$ | Scaling operator |

Figure 10:
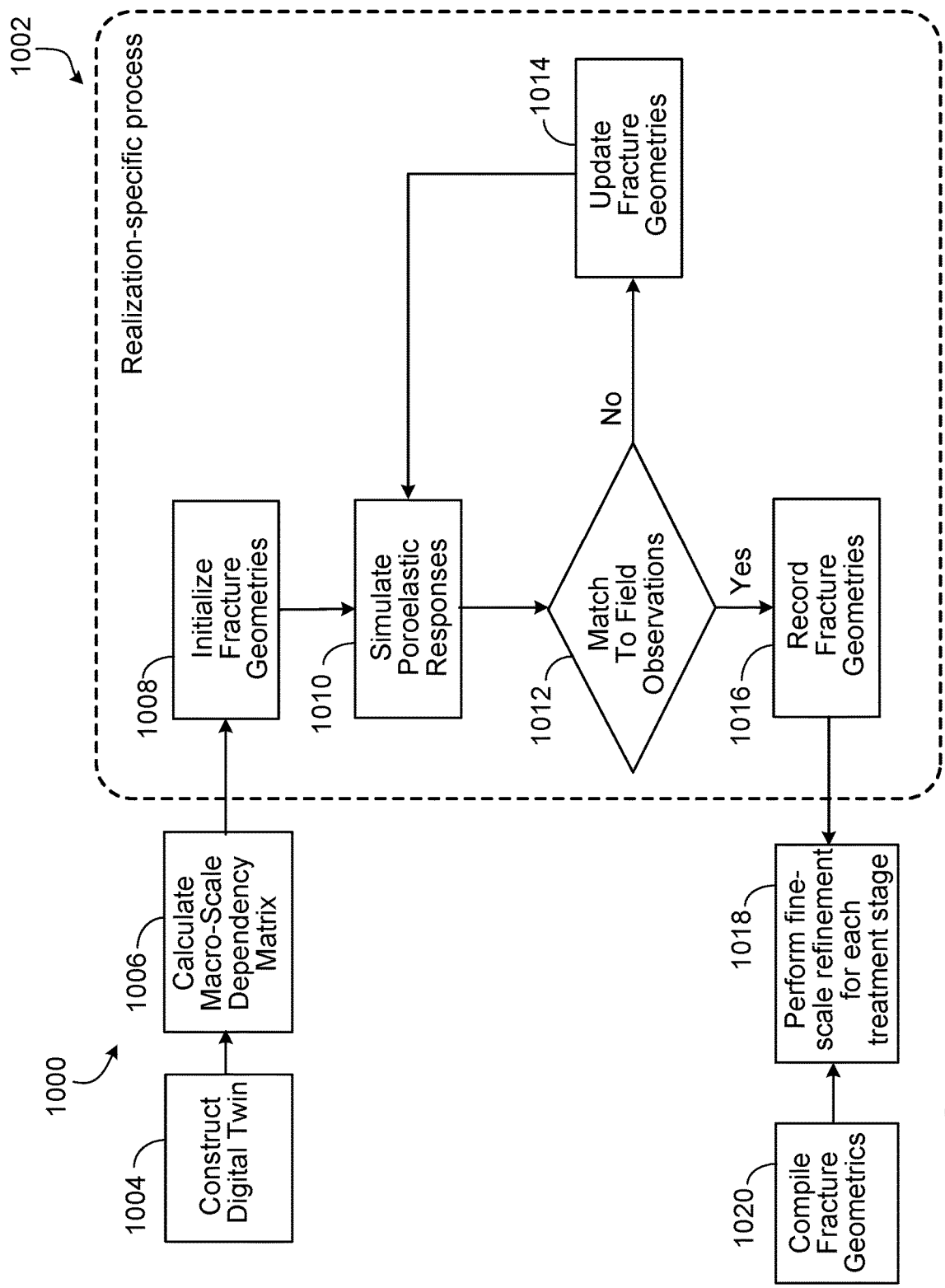
FIG. 10 is a flowchart that describes another example process for estimating fracture geometries using poromechanical responses in offset wells.

FIG. 10 is a flowchart that describes another example process 1000 for estimating fracture geometries using poromechanical responses in offset wells. As shown in FIG. 10, process 1000 may include a sub-process 1002 that includes multiple realizations that are run to develop a statistical distribution of geometries sufficient to estimate uncertainties in the results. Process 1000 may begin at step 1004, which includes constructing a digital twin. For example, a digital twin may be constructed based upon the well trajectories, stage locations for each well, perforation locations for each stage, and treatment durations. In some aspects, a digital twin is a computer or virtual representation of a physical system, in this case, the well pad from which monitor and treatment wellbores are formed and fractures according to a pre-designed hydraulic fracturing plan. This digital twin is constructed, for example, to predict observed pressures in the monitor wellbore. Such predicted observed pressures, which, in some aspects, are initially assumed based on assumed fracture geometries, may then be compared to the actual (i.e., measured) observed pressures. The digital twin is then modified to match the actual observed pressures.

Process 1000 may continue at step 1006, which includes calculating a macro-scale dependency matrix, $\hat{D}$, based upon the specifics of the treatment and the acquisition geometry. The macro-scale dependency matrix, for example, is shown in FIG. 13.

Process 1000 may continue from step 1006 into the realization sub-process 1002 and specifically to step 1008, which includes initializing fracture geometries. For example, fracture dimensions for each stage may be initialized. The origin of each of the initialized fractures should be centered on the stage and heights and lengths randomly selected between approximately 0.5× and 1.5× well spacing. In some aspects, fracture dimensions, $\bar{y}$, for each stage are initialized using a random initial vector that satisfies the physical constraints of the fracture but may not minimize the macro-scale objective function.

Process 1000 may continue at step 1010, which includes estimating (or simulating) poromechanical responses. For example, poromechanical responses may be simulated for the stage geometries from the digital twin.

Process 1000 may continue at step 1012, which includes a determination of whether a comparison between the simulated responses (e.g., simulated pressures) are close enough to observed pressures (e.g., from an actual fracturing process). For example, the simulated poromechanical responses are compared to the actual observed poromechanical responses in the field when a treatment wellbore is fractured, thereby creating the observed poromechanical responses (e.g., pressure changes) in a monitor wellbore. In some aspects, the simulated poroelastic responses, $g^l(\{\bar{x}^k\})$, are compared to the actual observed poroelastic responses in the field.

If the determination in step 1012 is "no" (i.e., the comparison yields insufficient results), then process 1000 may continue from step 1012 to step 1014, which includes updating the fracture geometries. In some aspects, an insufficient result is that the $l^2$ norm of the differences between modeled and observed responses is not minimized. For example, in step 1014, the fracture dimensions (e.g., the dimensions of the digital twin) may be updated for each stage in such a way as to reduce an absolute difference between modeled and observed responses for each stage. In some aspects, the updating includes updating the fracture dimensions, $\bar{y}$, to achieve a better match between $g^l(\{\bar{x}^k\})$ and $R^l$ for the next iteration. Step 1014 may continue back to step 1010 with the newly updated fracture dimensions in order to re-estimate the poromechanical responses.

If the determination in step 1012 is "yes" (i.e., the comparison yields sufficient results), then process 1000 may continue from step 1012 to step 1016, which includes recording the fracture geometries (e.g., of the digital twin) for the particular realization. As there may be multiple realizations in the sub-process 1002, the steps of sub-process 1002 (e.g., steps 1008 through 1016) may be performed multiple times before the process continues to step 1018. Step 1018 includes performing fine-scale refinement for each treatment stage (as described later).

Process 1000 may continue at step 1020, which includes collecting the estimated fracture geometries for all realizations and assess the statistical distribution of results. In some aspects, step 1018 may represent an end of the macro solution and, thus, a solution of fracture geometries for the monitor fracture.

Figure 11:
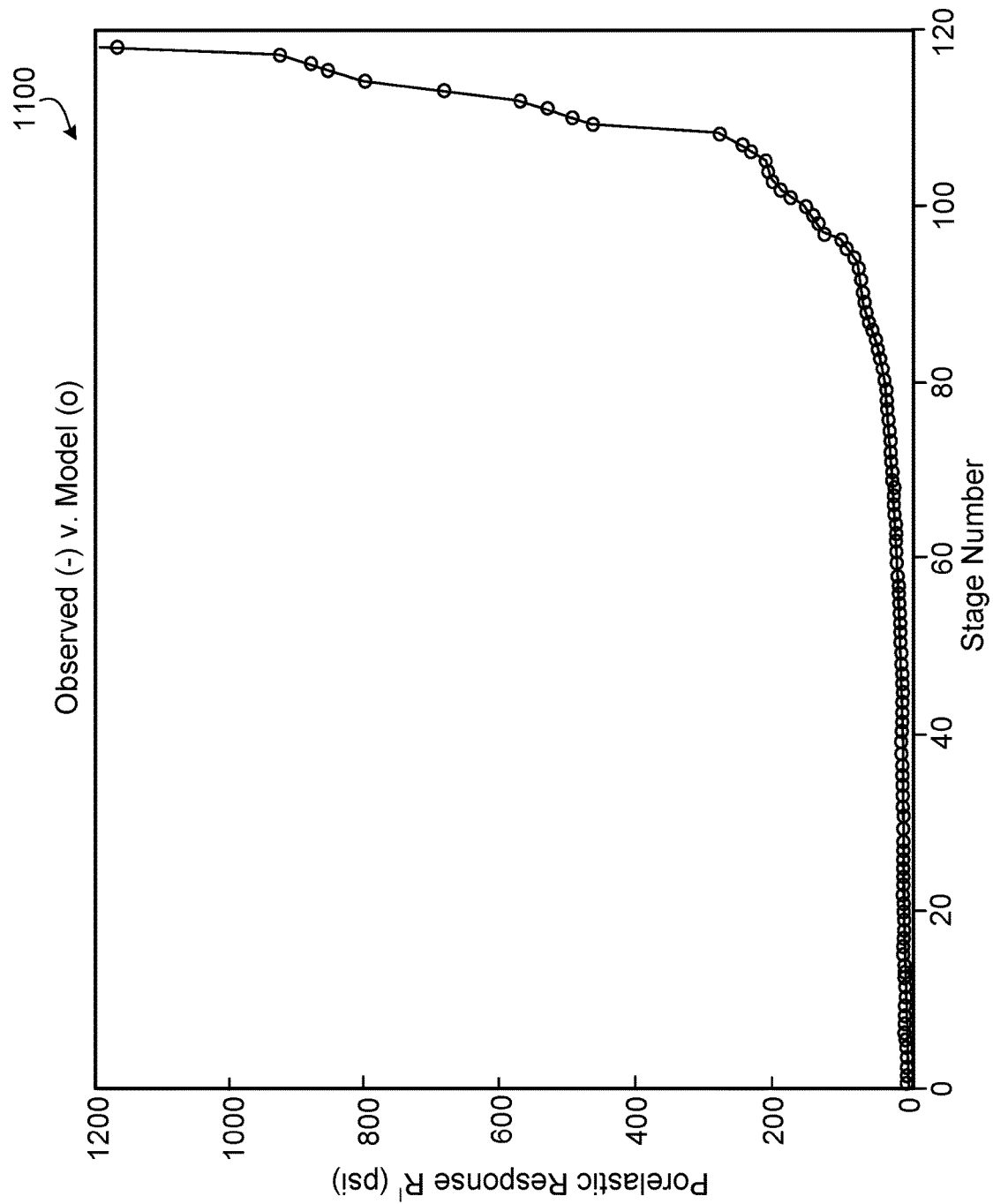
FIG. 11 graphically illustrates a final model fit for a single realization of a sub-process for the process described in FIG. 10.

In some aspects, criterion for "sufficient" determining in step 1010 is sufficient may account for both fine (individual observation-by-observation) and macro (all observations simultaneously) differences. For example, a given solution may have a very low $l^2$ Norm, but one stage may have an absolute difference between the modeled and observed responses that is three standard deviations away from the mean difference. Solutions may not be accepted where large local differences are present. An example final model fit for a single realization is shown in graph 1100 of FIG. 11.

In some aspects, step 1012 may include several sub steps. For example, in some aspects, parameters specific to a normal faulting regime with a defined fracture shape may be defined according to:

$$\bar{x}^k = \begin{Bmatrix} X_f^k \\ H_f^k \\ x_o^k \\ y_o^k \\ z_o^k \\ \theta^k \end{Bmatrix}$$

This vector, described previously, is also represented graphically in FIG. 9. Also, a misfit function may be defined as the l2 norm of the difference between observed and model responses:

$$\text{misfit} = \sqrt{\Sigma_{l=1}^{N^{rsp}}(R_{sim}^l - R_{obs}^l)^2} \qquad \text{Eq. 5}$$

In some aspects, if there are $N^{prm}$ parameters per stage, each evaluated at discrete evaluation points EvalPts and $N^{stg}$ stages, then the number of evaluations required to evaluate the misfit error for every permutation of fracture parameters may be:

$$\text{Evaluation Count} = (\Pi_{i=1}^{N^{prm}} \text{EvalPts}_i)^{N^{stg}} \qquad \text{Eq. 6}$$

For instance, in an example situation with one monitor fracture and six treatment fractures, each fracture is symmetric and originates at the stage heel ($x_o = y_o = z_o = 0$), using a parameter sweep such that: $X_f$ varies from 500-2000 feet in 10 ft increments, $H_f$ varies from 10-500' in 10 ft increments, and $\theta$ varies from 5-20 degrees in 1-degree increments. Then the misfit function evaluation count is:

$$\text{Evaluation Count} = (150*50*5)^7 = 2.28 \times 10^{35}.$$

Thus, an exhaustive search of the parameter space may be computationally infeasible with this simple acquisition geometry, as there may be too many scenarios to evaluate. Equally challenging is that the physics of fracture mechanics yields many possible combinations of parameters that will produce a misfit error of zero, i.e., a perfect match. In some aspects, a two-part analysis solution may include, in a first part, a macro-scale analysis, e.g., all the fracture parameters $x^k$ for each stage in the system may be restricted to be equal. This common set of fracture parameters may be x'. To address this, additional constraints on fracture feasibility may be preferable.

While a large number, this is far more manageable. The search space is small enough that it can be efficiently computed completely and searched manually. Results may be selected from the set of all minimizing values of x' for the case where there are more than one minima. This macro-scale analysis, using the l2 norm of the difference in observed and model responses produces effectively a composite result—and as such this result may be used as the fracture parameters for fractures that are common to more than one observation, the monitor fractures. Finding a macro-scale solution first using few degrees of freedom has a secondary benefit as well, as it limits the impact of a single poorly quantified poromechanical response. Uncertainty x' is therefore driven by systemic concerns. The overall approach to quantifying the magnitude of each poromechanical response must be accurate to limit this uncertainty.

In some aspects, the second part, called a fine-scale analysis, sets the monitor fracture parameters $x^k$, k∈Monitor Set to the x' from the global analysis and then varies the individual treatment fracture parameters $x^k$, k∈Treatment Set such that $R_{model}^l - R_{observed}^l = 0 \forall l$. This is done either: (1) by varying $X^f$ while holding $H^f$ constant, or (2) by varying $X^f$ while holding $$\frac{X^f}{H^f}$$

constant.

In some aspects, this approach may be used for situations, e.g., with a single monitor fracture, completions with expected similarity (monitor and treatment schedules identical or near so), and low expected fracture asymmetry (for example due to parent well influence, order of operations or geologic factors). When situations become more complex, the approach to solution may, in some aspects, be generalized. For example, particularly challenging are stages that are observed during treatment and are then used as monitor stages themselves, stages observed by more than one monitor simultaneously, stages that have large expected differences in dimension from one or more monitors, and stages that have expected asymmetries due to one or more factors.

In such cases, a mathematical optimization approach may be taken. For example, mathematical optimization is a broad field with applications in virtually all branches of science and engineering. Fundamentally, it is the process of finding the best solution to a mathematical model with requirements that are represented by constraints on the set of all feasible solutions. Much of the mathematics is supported by rigorous proof, and the algorithms applicable to each class of problem are widely validated across disciplines.

Continuity of variables may define the approach to solutions. Discrete optimization may be most appropriate when one or more optimization variables can take on a finite set of values. Continuous optimization may be used when the optimization variables can take on an any value, usually subject to a set of constraints. The special case where the objective function to be minimized is linear in the optimization variables; and the constraints may be specified using only linear equalities and inequalities is known as Linear Programming (LP). Generalizing further, nonlinear optimization is where the objective function is non-linear in the optimization variables, and/or one or more of the constraints are non-linear. Problems with as few as ten variables that objectively appear simple in their construction, can be intractable. Methods for solving these problems therefore may take approaches that involve compromises. The most common approach for large degree of freedom problems is local optimization, where the compromise is to give up on seeking a global optimum and instead seek a point that is only locally optimal, minimizing the objective function in the feasible region nearby, but not guaranteeing the lowest possible value in the entire region. Local optimization of nonlinear problems may be solved iteratively by LP via linearization of the non-linearities.

The problem addressed in the present disclosure involves physical properties which take on continuous values, where the objective function and constraints involve nonlinear, but at least $C^2$ continuous, combinations of the optimization variable. Solutions can be pursued to a constrained, nonlinear optimization problem. The general optimization problem in standard form is:

$$\text{minimize } f_0(\bar{x})$$

$$\text{subject to } f_m(\bar{x}) \leq b_m, m=1, \ldots, N^{cnst} \qquad \text{Eq. 7}$$

Where the vector $\bar{x} = x_i$: $i=1, \ldots, N^{dof}$ is the optimization variable of the problem, $f_0(\bar{x}): \mathcal{R}^{Ndof} \to \mathcal{R}$ is the objective function, the functions $f_m(\bar{x}): \mathcal{R}^{Ndof} \to \mathcal{R}$ are the constraint functions, and the constants $b_m$ are the bounds of the constraints. A vector $\bar{x}^*$ is a solution, called optimal, if it has the smallest objective value for all vectors that satisfy the constraints. With this definition, and the definition of Eq. 4 above, the optimization variable $\bar{x}$ is built from the fracture parameters of each fracture k in the system as follows. Let:

$$\tilde{x} \cdots = x_i = \begin{bmatrix} \left.\begin{matrix} x_1 \\ x_2 \\ x_3 \\ \vdots \end{matrix}\right\} \begin{bmatrix} X_f^k \\ H_f^k \\ x_o^k \\ y_o^k \\ z_o^k \\ \theta^k \end{bmatrix} : i = 1, \ldots, N_{dof}; \\ \vdots \\ \vdots \\ \vdots \\ x_{N_{dof}} \end{bmatrix} \qquad \text{Eq. 8}$$

formed from $\bar{x}^k$ k=1, ..., $N^{stg}$ in Eq. 4 be the fracture parameters. As described previously, a macro-scale and fine-scale effect may be used:

$$\bar{x} = \bar{x}^{macro} + \bar{x}^{fine} = \tilde{D} \cdot \bar{y} + \bar{w}$$

$$x_i = x_i^{macro} + x_i^{fine} = D_{ij} y_j + w_i$$

The first term, $\tilde{D} \cdot \bar{y}$, represents the component of the fracture parameters due to macro-scale effects such as overall geology, planned pump schedule, number of perforations, and other parameters. The matrix $\tilde{D}$, in this example, is a dependency matrix which limits the degrees of freedom that are carried through to the optimization variable. In the special case where $D_{ij}$ is the identity matrix, all the fracture parameters may be carried through as degrees of freedom.

The second term, $\bar{w}$, represents the component of the fracture parameters due to fine-scale effects, such as stage-specific geologic heterogeneity and deviation from perfect pumping schedule. If $w_i$ are assumed to be small perturbations about $x_i$, the optimization problem can be condensed:

$$\text{minimize } f_0(x_i) = \text{minimize } f_0(D_{ij} y_j + w_i) \qquad \text{Eq. 9}$$
$$= \text{minimize } f_0(D_{ij} y_j) + \varepsilon$$

$$\varepsilon = \left.\frac{\partial f_0}{\partial x_i}\right|_{D_{ij} y_i} \cdot w_i + O^2(w_i) \qquad \text{Eq. 10}$$

As Eq. 10 shows, removing fine-scale effects from the optimization results in uncertainty that may be directly related to the magnitude of these effects, and to the degree of reduction in the number of degrees of freedom, $N_{dof} \rightarrow N_{dof}^r$. The choice of $\tilde{D}$, may therefore depend on how $w_i$ is to be estimated.

To design a suitable objective function, a constitutive relationship may be used that links the fracture parameters to simulated poromechanical responses. Each simulated response $R_{sim}^l$:l=1, ..., $N^{rsp}$ may be a function of a set of fracture parameters:

$$\forall l \exists \{x^k\} \in x \qquad \text{Eq. 11}$$

Such that:

$$R_{sim}^l = g^l(\{\bar{x}^k\}) = g^l(\{x_i\}^l) = g^l(\{D_{ij} y_i\}^l) \qquad \text{Eq. 12}$$

In Eq. 12, the function $g^l$ is a poromechanical response model function (e.g., the digital twin). For macro-scale effects where the poromechanical response is dominated by the fracture geometries of the monitor fracture $\bar{x}^m = x_i^m \in \bar{x}$ and the treatment fracture $\bar{x}^t = x_i^t \in \bar{x}$, Eq. 12 reduces to:

$$R_{sim}^l = g^l(\{\bar{x}_m, \bar{x}^t\}^l) = g^l(\{x_i^m, x_i^t\}^l) = g^l(\{D_{ij} y_j^m, D_{ij} y_j^t\}^l) \qquad \text{Eq. 13}$$

Using Eq. 12, an objective function of the form of Eq. 5 can be constructed. Eq. 10 also addresses an issue of how to link these fracture parameters to the responses that they induce. In some aspects, one or more stages may be monitored as a treatment stage and then become a monitor stage as the completion proceeds. In some cases, it may be desirable to treat the geometry for such stage as either identical during treatment and while monitoring, or as different in such phases, depending on the duration of leak off (and hence reduction of the connected fracture volume) between them.

As described above, FIGS. 4A-4B illustrate example observation graphs. An observation graph may be one example way to understand the set $\{x_i^m, x_i^t\}^l \forall l$ in Eq. 13. For example, in considering a monitor stage—treatment stage pair, an observation of a poromechanical response induced in the monitor by the treatment links these two stages, and gives direction to that link. As described, each stage may be represented as a node in a graph, and each observation as a directed edge. Using each observed poromechanical response to link the stages involved in its observation, arbitrarily complex operations may be generalized while simultaneously building a data structure that enables efficient interrogation of both structure and relation. Some examples include: (1) stages with one or more outbound edges are monitor stages; (2) stages with one or more inbound edges are treatment stages; (3) stages with greater than one inbound edge are observed by multiple monitors simultaneously, and therefore should be better constrained; (4) stages with greater than one outbound edge monitor more than one treatment stage in time, and therefore are better constrained; and (5) stages with both inbound and outbound edges couple segments of operations to one another.

As described, determining fracture geometries may include an objective function and one or more constraints (or constraint functions). The objective function may be represented by $f_o(x)$. Constraint functions may be represented by $f_m(\bar{x})$ and bounds, $b_m$. A constraint limits where in the solution space a minimum of $f_o(\bar{x})$ may be found. This may be also referred to as a feasible region, $\Omega$. In some aspects, there are both linear and non-linear constraints which allow the embedding of physical knowledge of solution feasibility into the solution.

An example of a linear constraint, the limitation that a fracture must intersect a wellbore may be set (as described previously). For example, $x_o$, the shift of the fracture origin in the plane of the fracture for a simple rectangular fracture may be constrained so it cannot exceed the fracture half-length, $X_f/2$ (or simply $X_f$ if this represents fracture half-length) if the fracture is to originate along the wellbore. These parameters are shown in FIG. 1C. Thus, an example constraint may be defined by:

$$-\frac{X_f}{2} \le x_0 \le \frac{X_f}{2}.$$

As another example constraint, a non-linear constraint may be defined by constraining the relationship between fracture length and height:

$$1 < \frac{X_f}{2 * H_f} < 10 \qquad \text{Eq. 14}$$

As another example constraint, a non-linear constraint may be defined by limiting the area of Fracture k, $Area^k$ minus the mean of the area of fractures in a fracture group, $\sigma(\{Area^{FG}\})$ divided by $\sigma(\{Area^{FG}\})$ to be less than a particular percentage (e.g., 15%). Thus, for a given completion design applied to all stages in a fracture group (FG), the area of the largest fracture in each stage may be assumed to vary from the mean area of all fractures completed with the same design in that group by less than a specified percentage (e.g., 15%). This example constraint may be defined by:

$$\left| \frac{Area^k - \sigma(\{Area^{FG}\})}{\sigma(\{Arear^{FG}\})} \right| \leq \text{Specfied Percentage}$$

As another example, constraints may act as secondary objective functions. For example, a solution may be desirable that matches the observed poromechanical responses with minimum fracture asymmetry (e.g., within a specified tolerance). This constraint may be defined by:

$$\Sigma_{i=k}^{N^{stg}} x_0^k \leq \text{Specified tolerance} \qquad \text{Eq. 15}$$

As is shown, there are many possible constraints that can be specified, both linear and non-linear. Such constraints may have a significant impact on the resulting solution, and should be chosen carefully to yield a useful solution. For example, as described, techniques for determining fracture geometries may include nonlinear optimization techniques. Such techniques include algorithms for solving constrained, non-linear optimization problems of continuous variables in standard form, e.g., the Trust-Region family of algorithms (Branch, et al., 1999) (Byrd, et al., 1988); the Sequential Quadratic Programming (SQP) Algorithm (Biggs, 1975) (Han, 1977) (Powell, 1978) (Schittkowski, 1985) (Spellucci, 1998); and the Interior Point Algorithm (Byrd, et al., 2000) (Byrd, et al., 1999) (Waltz, et al., 2006), among others.

In the present disclosure, the SQP and Interior Point Algorithm may be most suitable in practice. For example, the Interior Point Algorithm may be suitable or preferred for computational efficiency reasons. All the methods listed above rely upon the computation of Jacobian matrices of both $f_0(\overline{x})$ and $f_m(x)$:

$$f_0 M = \mathcal{F}(R_{sim}^l - R_{obs}^l) \qquad \text{Eq. 16}$$

In some aspects, the $R_{obs}^l$ are constants that are independent of $x_i$. The Jacobians may be:

$$J_{f_0} = \frac{\partial R_{sim}^l}{\partial x_i} = \frac{\partial R_{sim}^l}{D_{ij} \partial y_j} = \frac{\partial R_{sim}^l}{\partial y_j} D_{ij}^T \qquad \text{Eq. 17}$$

$$J_{f_m} = \frac{\partial f_m}{\partial a_{x_i}} = \frac{\partial f_m}{D_{ij} \partial y_j} = \frac{\partial f_m}{\partial y_j} D_{ij}^T \qquad \text{Eq. 18}$$

In some aspects, for practical data acquisition configurations most of the terms in $J_{f_0}$, and $J_{f_m}$ are zero (sparse) because of the set reduction in Equation 12. By extension, this also leads to a sparse matrix in the Hessian matrix of the LaGrangian of $f_\mu(\overline{x})$ used in the interior point algorithm. Common implementation of the interior point algorithm leverages this sparsity to achieve lower memory footprint and significantly reduced execution time—both allowing for the solution of large degree of freedom problems that are the result of typical of complex pad operations.

In the approaches listed above, there can be many vectors, $\overline{x}$, in $\Omega$ which minimize $f_0(\overline{x})$ locally. In some aspects, it is only for a special case where the objective function, $f_0(x)$, and constraint functions, $f_m(\overline{x})$, are convex that any local solution is also the global solution. A convex function is one that satisfies the following:

$$f_m(\alpha \overline{x} + \beta \overline{y}) \leq \alpha f_m(\overline{x}) + \beta f_m(\overline{y}), \qquad \text{Eq. 19}$$

for all $\overline{x}$, $\overline{y} \in R^{N^{dof}}$ and all $\alpha$, $\beta \in \mathcal{R}$. Although the physical nature of the described solution space and constraints may ensure that the constraint functions can be constructed to be convex, the same may not hold true of the objective function. For example, an objective function based upon Eq. 15 and Eq. 13 may be defined as:

$$f_0(\overline{x}) = f_0 x_i^{macro} = \qquad \text{Eq. 20}$$

$$f_0(D_{ij} y_i) = \frac{1}{N^{rsp}} \sum_{i=1}^{N^{rsp}} \left[ h\big(g^l(\{D_{ij}, y_j^m, D_{ij} y_j^t\}\big) - h(R_{observed}^l) \right]^2,$$

where l is the number of poromechanical responses (e.g., edges in the observation graph), and the function, h, is a scaling operator, such as $\log_{10}(x)$, used to reduce the dynamic range of the responses. In some aspects, $f_0(\overline{x})$ can only be convex if Eq. 13 is convex, but this may not be the case. The simulated response (supported by the underlying fracture physics embedded in the digital twin) may produce identical results for multiple $\overline{x}^m$, $\overline{x}^t$. Therefore, solutions to the problem, $\overline{x}^*$, may be strictly locally optimal, and non-unique.

Figure 12:
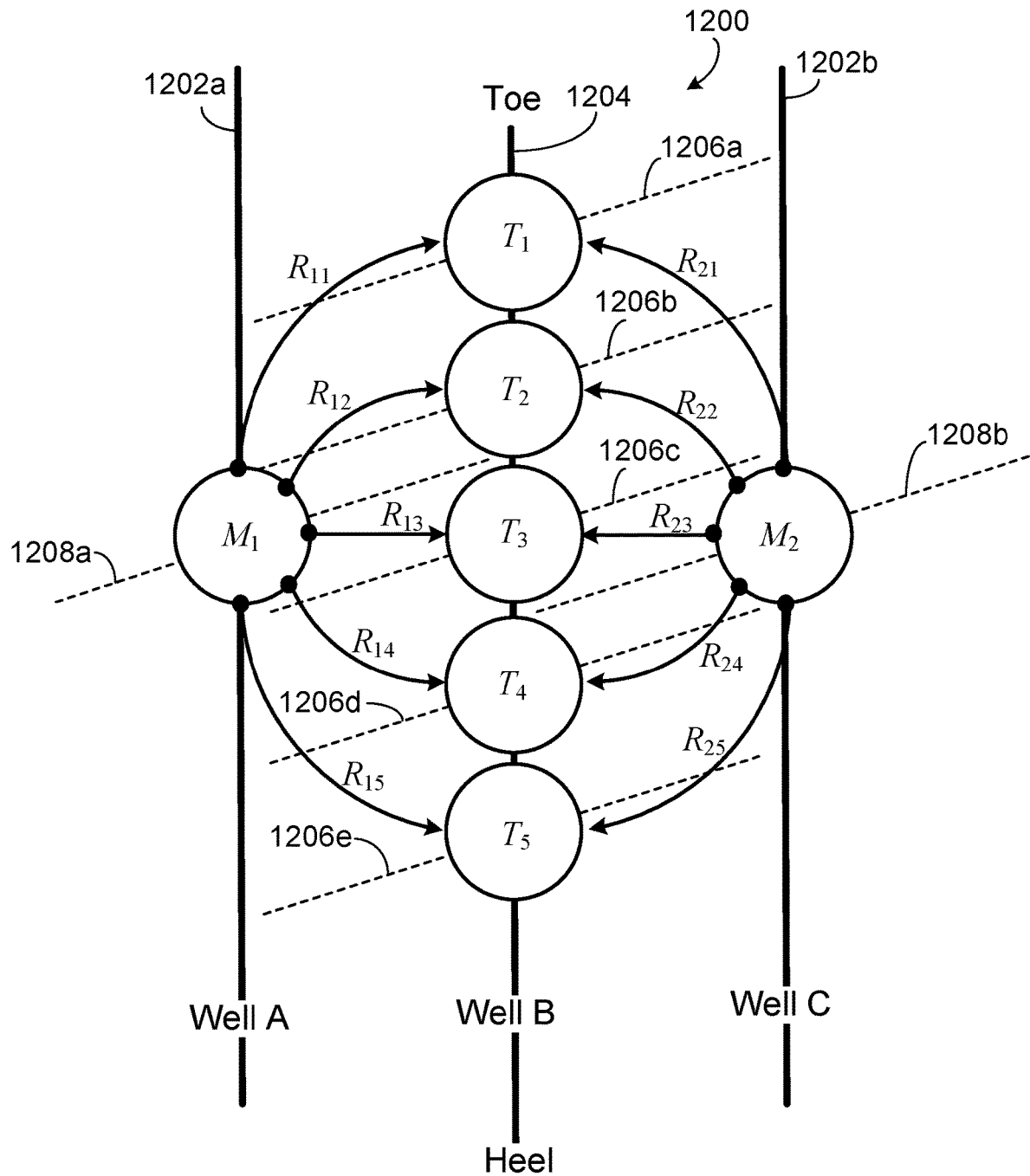
FIG. 12 illustrates a combination observation graph-map that includes a set of five treatment stages monitored by two observation stages on independent offset wells in a particular landing zone.

In some aspects, however, the physics of fracture mechanics, characteristics of the data acquisition, and sensible limitations on the physical viability of solutions limit the feasible region $\Omega$ in such a way that the spread of locally optimal solutions may be narrow. This is because not all the fracture parameters may be independent. For example, FIG. 12 illustrates a combination observation graph-map 1200 that includes a set of five treatment stages monitored by two observation stages on independent offset wells in a particular landing zone. As shown, the graph 1200 includes observation wellbores 1202a and 1202b (labeled Well A and Well C, respectively) and observation fractures 1208a and 1208b (with nodes labeled $M_1$ and $M_2$). Graph 1200 also includes treatment wellbore 1204 (labeled Well B, with Heel and Toe directions shown) and treatment fractures 1206a through 1206e. As further shown, the edges of the graph 1200 (coincident with the treatment fractures 1206a through 1206e) are labeled $R_{11}$, $R_{12}$, $R_{13}$, $R_{14}$, $R_{15}$, $R_{21}$, $R_{22}$, $R_{23}$, $R_{24}$, and $R_{25}$. The poromechanical responses, R/(here labeled $R_{monitor\ id,\ treatment\ id}$ for clarity) are functions of the fracture parameters $x^m$, $x^t$.

Each combination $\{\overline{x}^m, x^t\}$ may produce only one pressure response. If it is assumed that the parameters of a monitor fracture (1208a or 1208b), $\overline{x}^m$, are constant for all treatment stages (1206a through 1206e) that the monitor fractures "observes," then all responses observed by the monitor fracture (the outbound edges) must be generated by the same $x^m$. Similarly, the responses observed by each monitor fracture for each treatment well (the inbound edges) must be generated by the same $\overline{x}^t$. Additionally, the response itself is governed by the poromechanical physics simulated by the digital twin—and this response is a proportional to the surface integral over fluid-solid interface of the fracture—thus coupling the fracture height and length and further limiting the independence of the fracture parameters.

To this, additional information may be added as constraint functions. For example, a set of constraints that may be known as "Typical Constraints" are: (1) fractures have an absolute maximum and minimum length and height suitable for the well spacing and treatment; (2) fractures must originate on the wellbore; (3) minimize the variance of fracture areas with similar completions; and (4) prefer symmetric fractures (Eq. 15).

In some aspects, the degrees of freedom are limited in the optimization by making assumptions about how individual stages may be similar or dissimilar. Also, it may be the limitation of the feasible region, $\Omega$, that drives the variance of locally optimal solutions to the macro-scale optimization problem. For instance, the greater the restriction on $\Omega$, the narrower the resulting solution variance may be. In the limit, the locally optimal solution may become increasingly unique and will approach the globally optimal solution, $\bar{x}^*$. In some aspects, it may be necessary to quantitatively assess the distribution of locally optimal solutions, $\bar{x}$.

Turning briefly to FIG. 13, a dependency matrix ($D_{ij}$) 1300 is shown for the observation graph 1200. In some aspects, the construction of $D_{ij}$ 1300 may include lumping together stages that are likely to behave similarly. For example, if all five treatment stages are completed with a similar design, with Wells A and C completed in zipper operations and Well B in single-well operations, then one choice is to group these seven stages into five stage-groups based upon expected stress effects due to the order of completion operations: $G_1=\{T_1, T_2\}$, $G_2=\{T_4, T_5\}$, $G_3=\{T_3\}$, $G_4=\{M_1\}$, and $G_5=\{M_2\}$. For a system with a fracture azimuth and a fracture length for each stage, $\bar{x}^f=\{X_f^k, \theta^k\}$, if the system is constrained to a common global fracture azimuth $\theta^G$, the dependency matrix appears as matrix 1300. In some aspects, two factors drive the variability of locally optimal solutions to the macro-scale optimization problem: (1) the construction of the dependency matrix $\tilde{D}$, and (2) the limitation of the feasible region $\Omega$.

In some aspects, treatment stages may be lumped together based on, for example, a particular side (e.g., toe side or heel side) of the monitor fracture that the treatment stages are located. For example, as shown in FIG. 12, one particular group of fractures may include those nodes labeled $M_1$, $T_3$, and $M_2$. Another particular group of fractures may include those nodes labeled $T_1$ and $T_2$ (as these treatment fractures are located on the toe side of the monitor fractures, $M_1$ and $M_2$). Another particular group of fractures may include those nodes labeled $T_4$ and $T_5$ (as these treatment fractures are located on the heel side of the monitor fractures, $M_1$ and $M_2$).

In some aspects, the described iterative solutions for determining fracture geometries may be stuck in local minima during a solution iteration. In some aspects, however, this may not be generally a problem in large degree of freedom systems, because to be in a local minimum implies that $\nabla f_0(\bar{x})=0$ and all variables are in a trough. As the number of variables in $\bar{x}$ increases, the likelihood that all partial derivatives of $f_0(x)$ are zero simultaneously and in a trough far away from the global solution, $\bar{x}$, becomes increasingly small. However, the case where $\nabla f_0(\bar{x})=0$ and some variables are in a trough while the remaining rest on saddle points may be a problem for convergence in practical algorithms. The interior point method, for instance, may have several mechanisms (e.g., entropy addition, backoff and redirect, conjugate gradient evaluation) to avoid outright, or limit significantly, convergence problems arising from saddle points.

An example approach to estimating how close a global solution, $\bar{x}^*$, for the macro-scale effects may be to execute multiple realizations of the optimization with different initial conditions $x_i^{initial}$ and identical constraints, and examine the resulting solution distribution statistically to determine the mean, variance, skewness, kurtosis, and higher moments. If results cluster near a common point, $\bar{x}^*$, with a low variance (and low higher moments of distribution), then $\bar{x}^*$ may be deemed a stable point of attraction. Therefore, there may be increased confidence in the plausibility of $\bar{x}^*$ as near a global solution. On the other hand, if results are spread significantly or show significant higher moments, then the ability to construct a meaningful result from the solution distribution may be limited.

In some aspects, solution distributions with large moments often indicate that one or more of the observed poromechanical responses may not be representative of the modeled geometry. For example: (1) a ball did not set and a given stage pumped into the perforations of the prior stage such that the induced fracture(s) were not where the model prescribed them in generating a modeled response; (2) a stage pumped into a pre-existing fault or high-permeability zone such that the induced fracture was much larger than the initial conditions specified; or (3) a stage screened out prematurely and yielded a much smaller in-situ fracture than the initial conditions specified. In these cases, examination of the observed responses and either their removal from the observation graph, a reconstruction of the dependency matrix $\tilde{D}$, or an adjustment to the initialization conditions $x_i^{initial}$ usually results in stabilization of the solution space. For example, a plausible $\bar{x}^*$ may be constructed by looking the maximal probability of the distribution, computing a cost-weighted average of the solutions in Eq. 21 or a combination thereof.

$$\bar{x}^* = \frac{1}{N}\sum_{r=1}^{N} W_r \bar{x}_r^*, \text{ where } 1 = \sum_{r=1}^{N} W_r \quad \text{Eq. 21}$$

In some aspects, calculation of the fine-scale refinement of the macro-scale solution $\bar{x}^*$ proceeds by iterating across the set of stages $\{x^k\}$ in the observation graph which have no outbound edges (e.g., these stages are not monitors), extracting a subgraph for each of these stages containing only the stage itself $x^k$ and all stages monitoring that stage (e.g., all stages with an inbound edge to $x^k$), and then executing a mathematical optimization. The optimization variable may be formed directly from the fracture parameters of the stage $x^k$. This implies that $\tilde{D}=1$ and Eq. 20 becomes:

$$f_0(\bar{x}^{k,fine}) = f_0 x_i^{k,fine} = f_0(I \cdot y_i) = \frac{1}{N^{sg}} \sum_{l=1}^{N^{sg}} \left[ h(g^l(\{x_i^m, I \cdot y_j^l\})) - h(R_{observed}^l) \right]^2 \quad \text{Eq. 22}$$

Where $N^{sg}$ is the number of responses in the subgraph, and $x_i^m$ (the monitor geometries) is drawn from $\bar{x}^*$ and is not part of the optimization variable. As this optimization contains far fewer degrees-of-freedom, and it is a dense matrix problem because the Jacobian and Hessian of the objective function is sensitive to all the optimization variables, the SQP algorithm may be used to solve this problem. In some aspects, the solution proceeds with the same or similar constraints as the macro-scale problem, with the addition of one of the following:

$$H_f^k = H_f^{k,macro} \text{ or } X_f^k/X_f^k = (X_f^k/H_f^k)^{macro} \quad \text{Eq. 23}$$

Thus, either the fracture height, or the ratio between the fracture length and the fracture height for each stage in the fine-scale analysis, is held equal to its respective value in the macro-scale analysis.

To examine the solution approach described previously, a series of examples ("Model Problems") that isolate the solution process from the physics of the digital twin and allows the adjustment of parameters of specific implementations of the interior point method (and the other solvers) in a controlled manner may be constructed. A Model Problem is constructed by defining a known set of fracture geometries $\bar{x}_i^{macro}$ on a virtual pad with known monitor and treatment stages. A digital twin is then employed to compute the poromechanical pressure responses for each monitor-treatment pair $\{\bar{x}^m, \bar{x}^t\}^j$, and these responses are then treated as the observed responses $R_{observed}^j$. With a set of observed responses for the known geometries, the process the process 1000 described in FIG. 10 may be executed to recover a set of estimated fracture geometries $x_i^{estimated}$ and compare the estimated geometries to the known true geometries.

Figure 14:
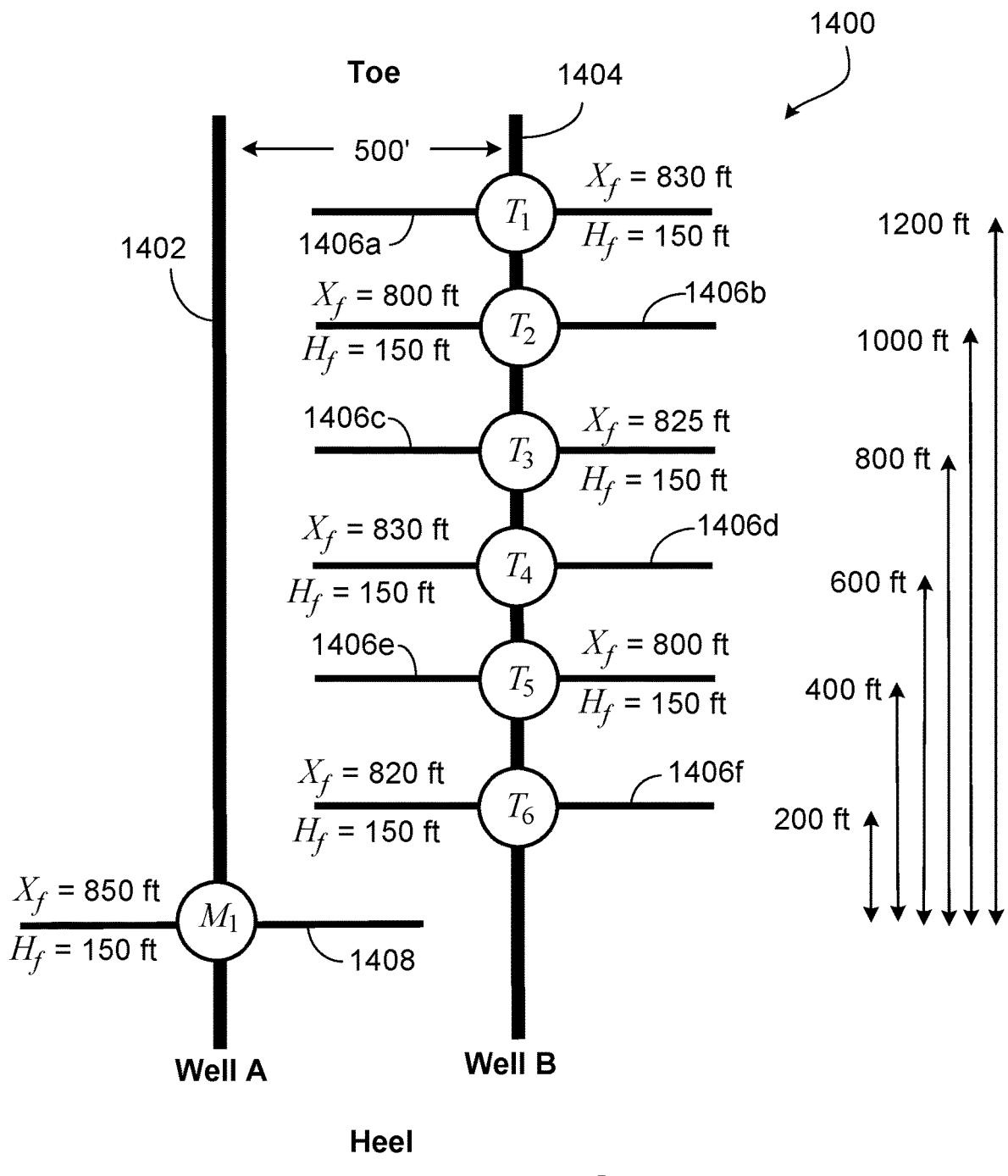
FIG. 14 illustrates a combination observation graph-map that includes a set of six treatment stages monitored by an observation stage on independent offset wells in a particular landing zone.

One of the example Model Problems is shown in FIG. 14. FIG. 14 illustrates a combination observation graph-map 1400 that includes a set of six treatment stages monitored by an observation stage on independent offset wells in a particular landing zone. As shown, the map 1400 includes observation wellbore 1402 (labeled Well A) and observation fracture 1408 (with node labeled $M_1$). Graph 1400 also includes treatment wellbore 1404 (labeled Well B with Heel and Toe directions shown) and treatment fractures 1406a through 1406f.

In this example, Wells A and B are in the same zone, all stages are defined to be symmetric about the wellbore and have a common fracture azimuth of $\theta_g=90°$, and all stages have a perforated interval of 150 feet with three clusters per stage. For this example, the optimization has three degrees of freedom for each stage: $\bar{x}^k=\{X_f^k, H_f^k, y_o^k\}$. Therefore, there are 21 degrees of freedom in this example and six observed responses. The full system is reduced by treating all treatment fractures as one group and the monitor fracture as a second group (e.g., as described with reference to FIG. 12).

Figure 16:
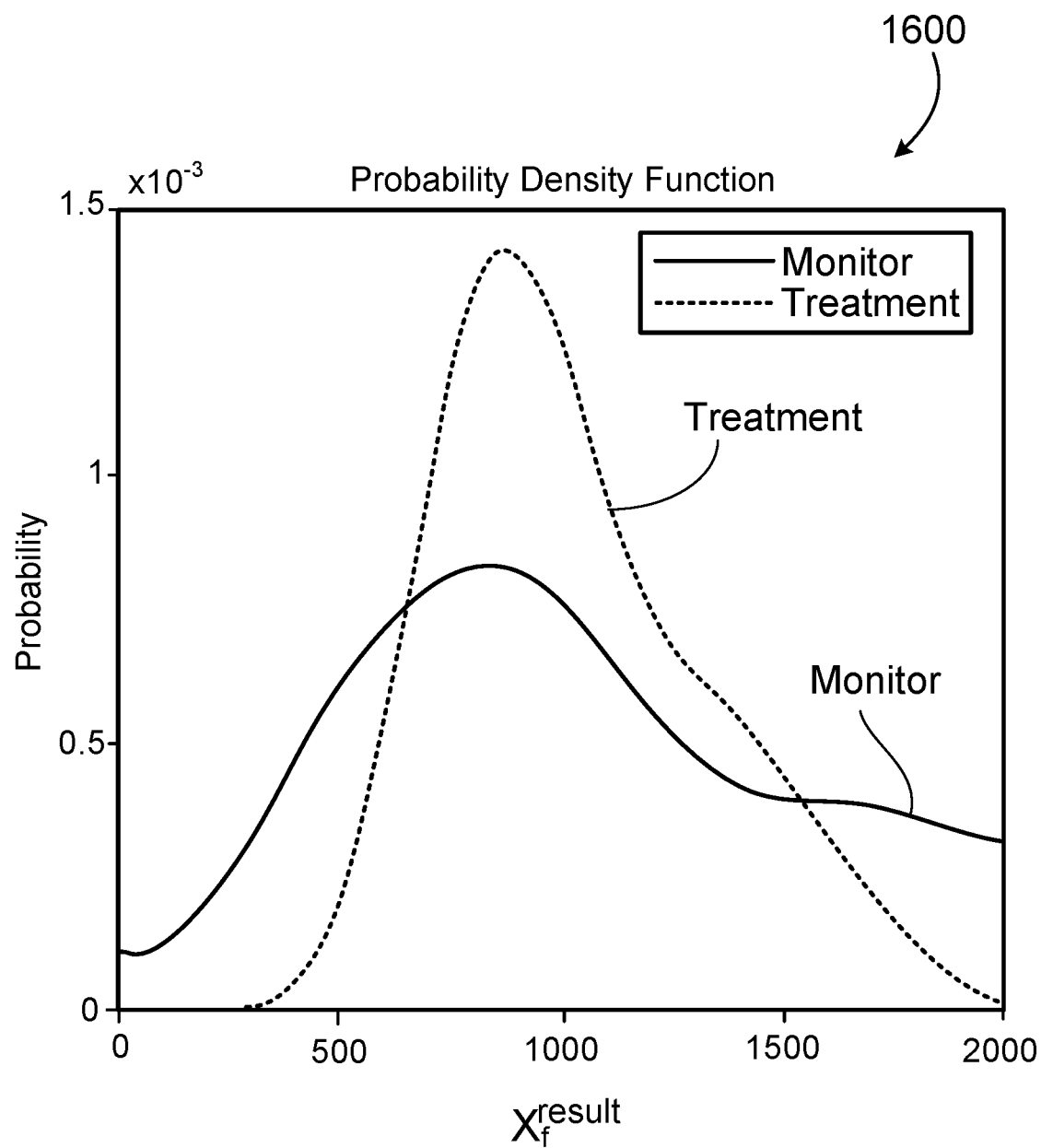
Figure 17:
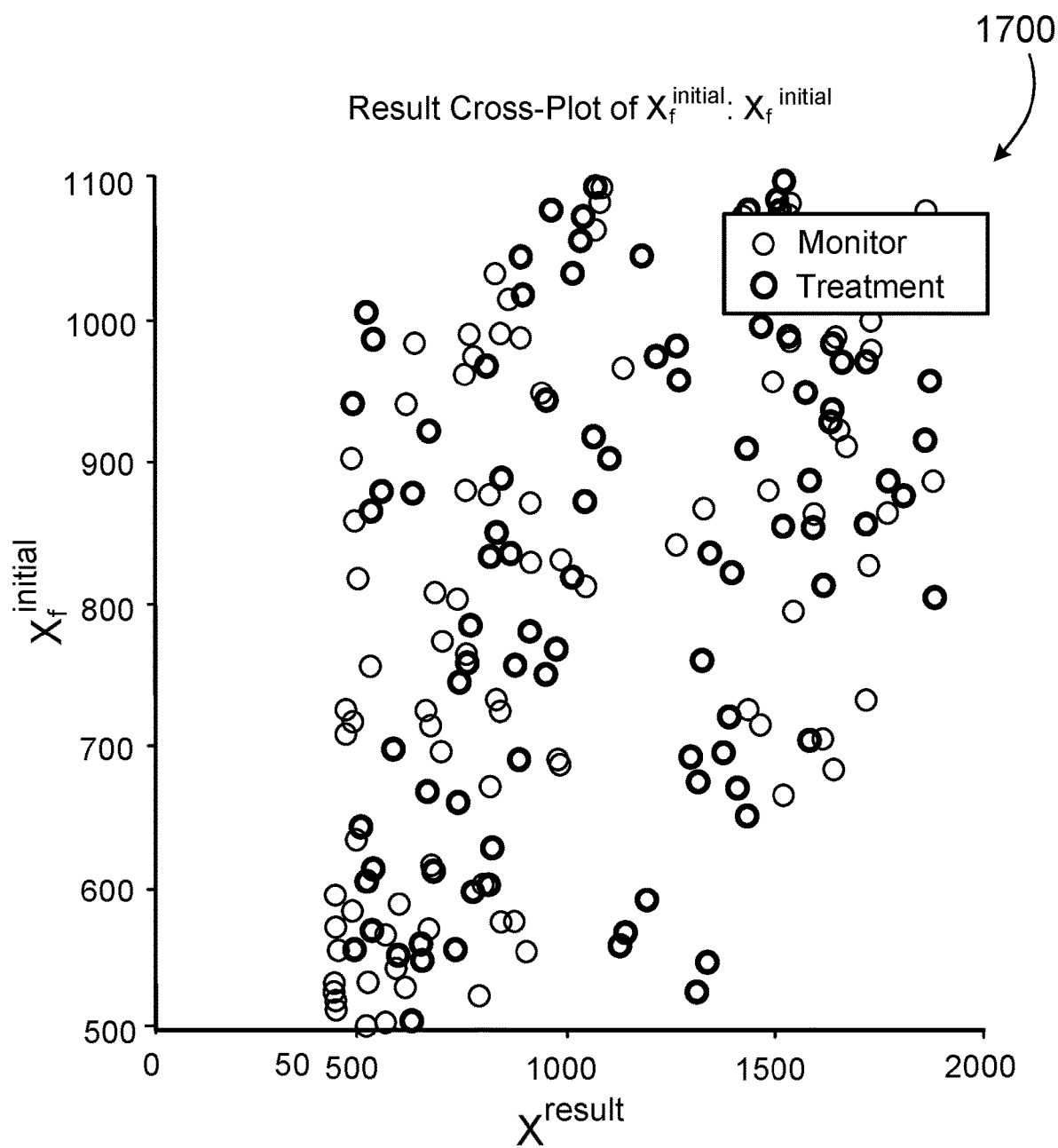

As no asymmetry determination may be possible in this acquisition, fracture shifts are constrained to zero: ($x_o^k=0$, $z_0^k=0$). The macro-scale analysis is then performed using 100 realizations with equal-weighted random distributions for: (1) $X_f^{initial}$ from a minimum of 500 feet to a maximum of 1100 feet for the fracture lengths; (2) $H_f^{initial}$ from 100 feet to 200 feet for the fracture heights; and (3) $y_0^{initial}$ from 0 to 150 feet. Nine cases, corresponding to the monitor and treatment fractures each originating from either the heel, midpoint, or toe perforation cluster, are evaluated. An example of the solution distribution of results from these realizations for $X_f^{treatment}$ and $X_f^{monitor}$ for the monitor=toe, treatment=heel case are shown in FIGS. 15-17.

Figure 15:
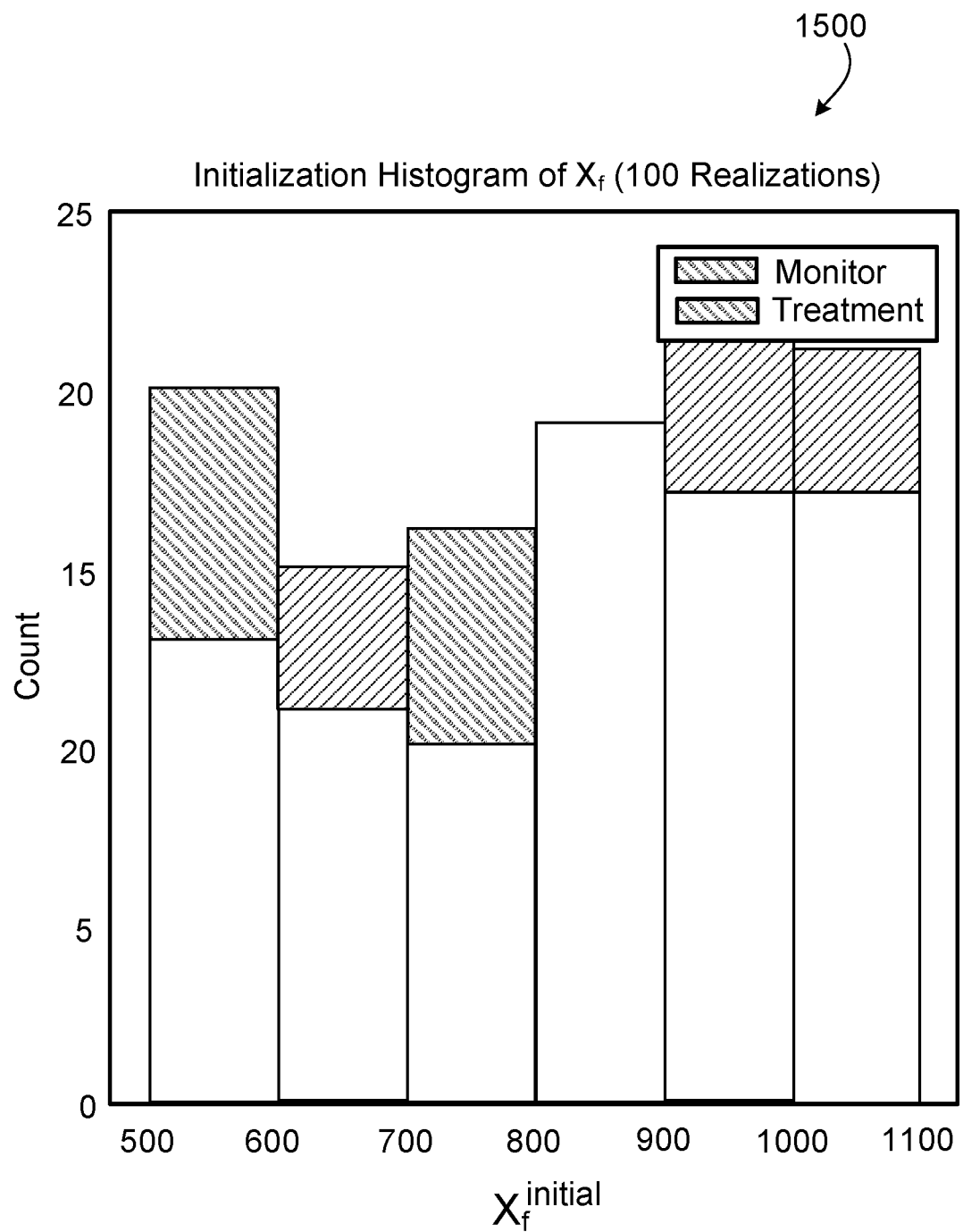
FIGS. 15-22 are graphs that illustrate solution distribution of results from the determination of fracture geometries of the hydraulic fractures represented in FIG. 14.

For example, FIG. 15 shows a graph 1500 that illustrates a histogram of the random distribution used for the initialization vector. Graph 1500 includes a y-axis that describes count number for the monitor and treatment fractures for each particular range of $X_f^{initial}$ (on the x-axis). FIG. 16 shows a graph 1600 that illustrates cross plot of the initialization and result. Graph 1600 includes a y-axis that describes $X_f^{initial}$ $n^{at}a^l$ values and an x-axis that describes $X_f^{result}$, with both monitor and treatment fractures cross-plotted. FIG. 17 shows a graph 1700 that illustrates an estimated probability distribution resulting from the optimization. Graph 1700 includes a y-axis that describes probability and an x-axis that describes $X_f^{result}$, with both monitor and treatment fractures plotted.

Figure 18:
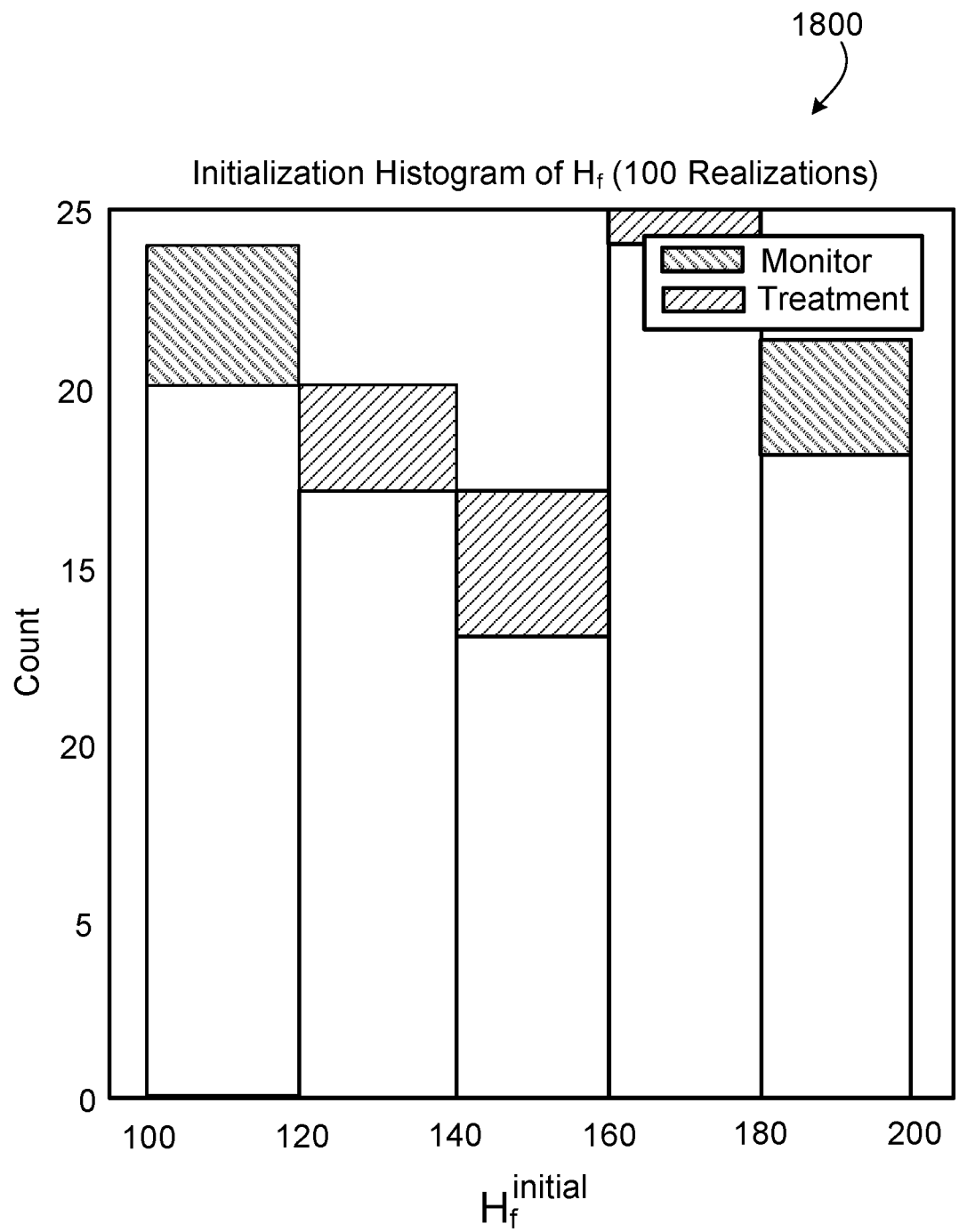
Figure 19:
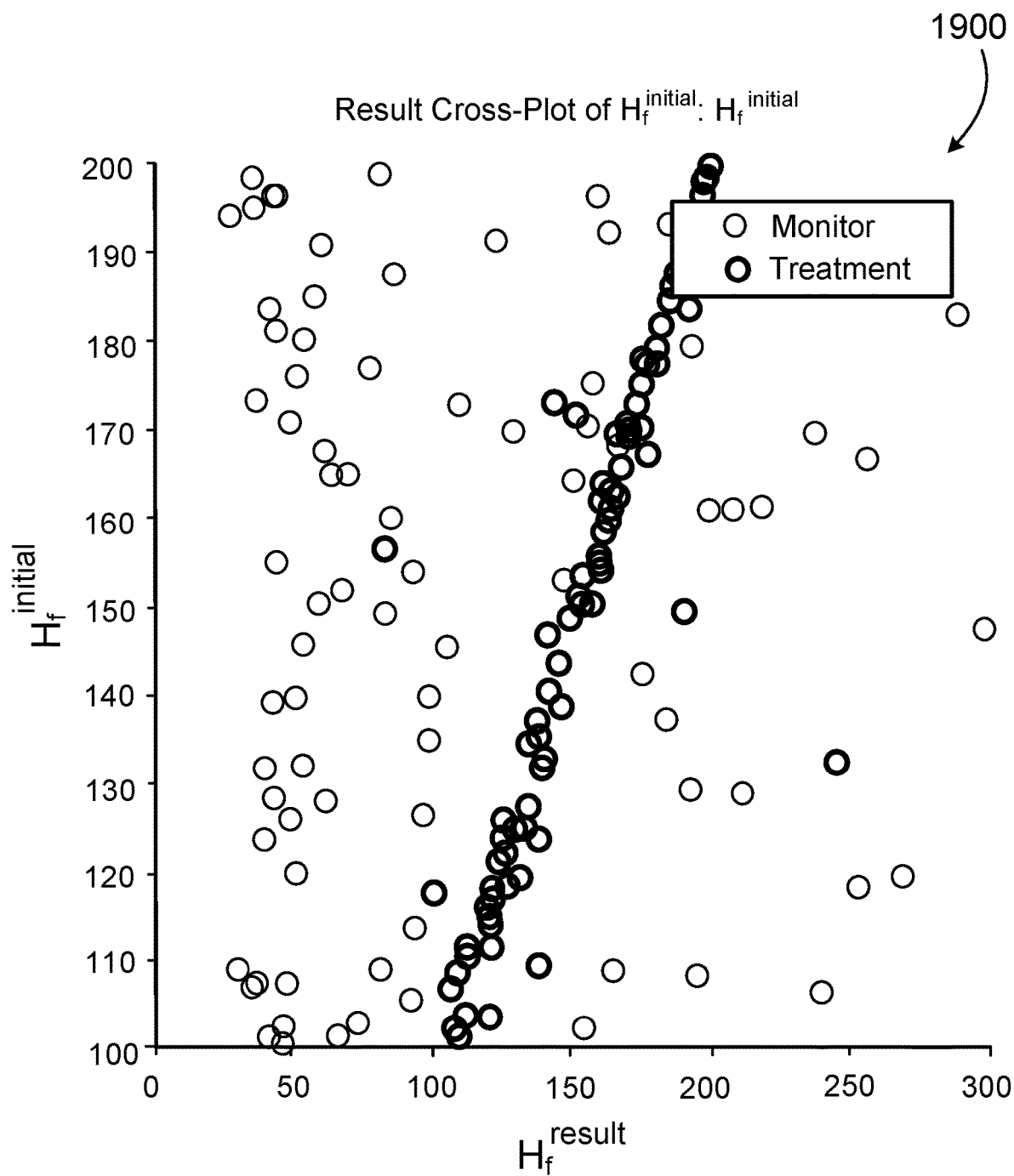
Figure 20:
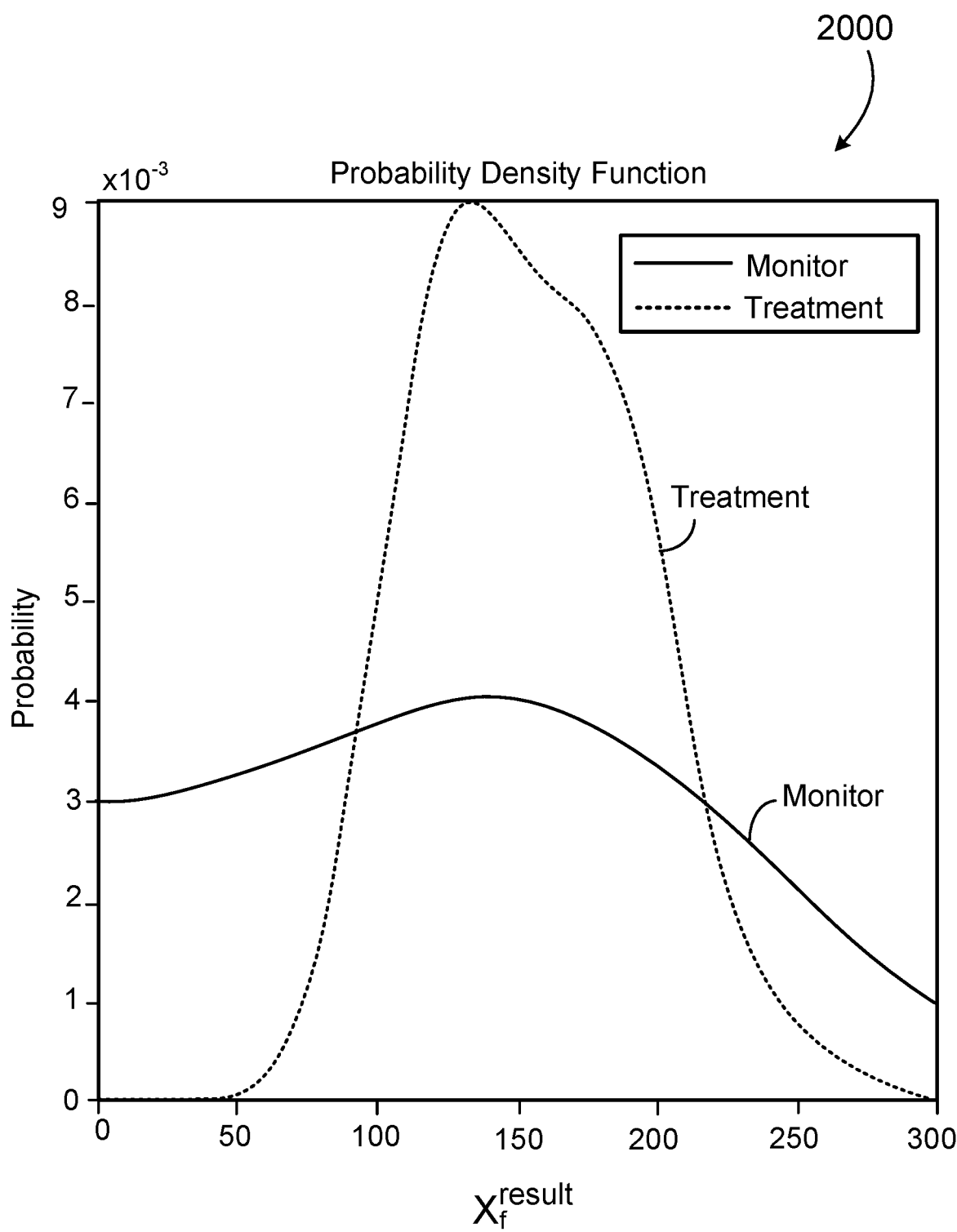

Similarly, an example of the solution distribution of results from these realizations for $H_f^{treatment}$ and $H_f^{monitor}$ for the monitor=toe, treatment=heel case are shown in FIGS. 18-20. For example, FIG. 18 shows a graph 1800 that illustrates a histogram of the random distribution used for the initialization vector. Graph 1800 includes a y-axis that describes count number for the monitor and treatment fractures for each particular range of $H_f^{initial}$ (on the x-axis). FIG. 19 shows a graph 1900 that illustrates cross plot of the initialization and result. Graph 1900 includes a y-axis that describes $H_f^{initial}$ values and an x-axis that describes $X_f^{result}$ with both monitor and treatment fractures cross-plotted. FIG. 20 shows a graph 2000 that illustrates an estimated probability distribution resulting from the optimization. Graph 2000 includes a y-axis that describes probability and an x-axis that describes $X_f^{result}$, with both monitor and treatment fractures plotted.

Figure 21:
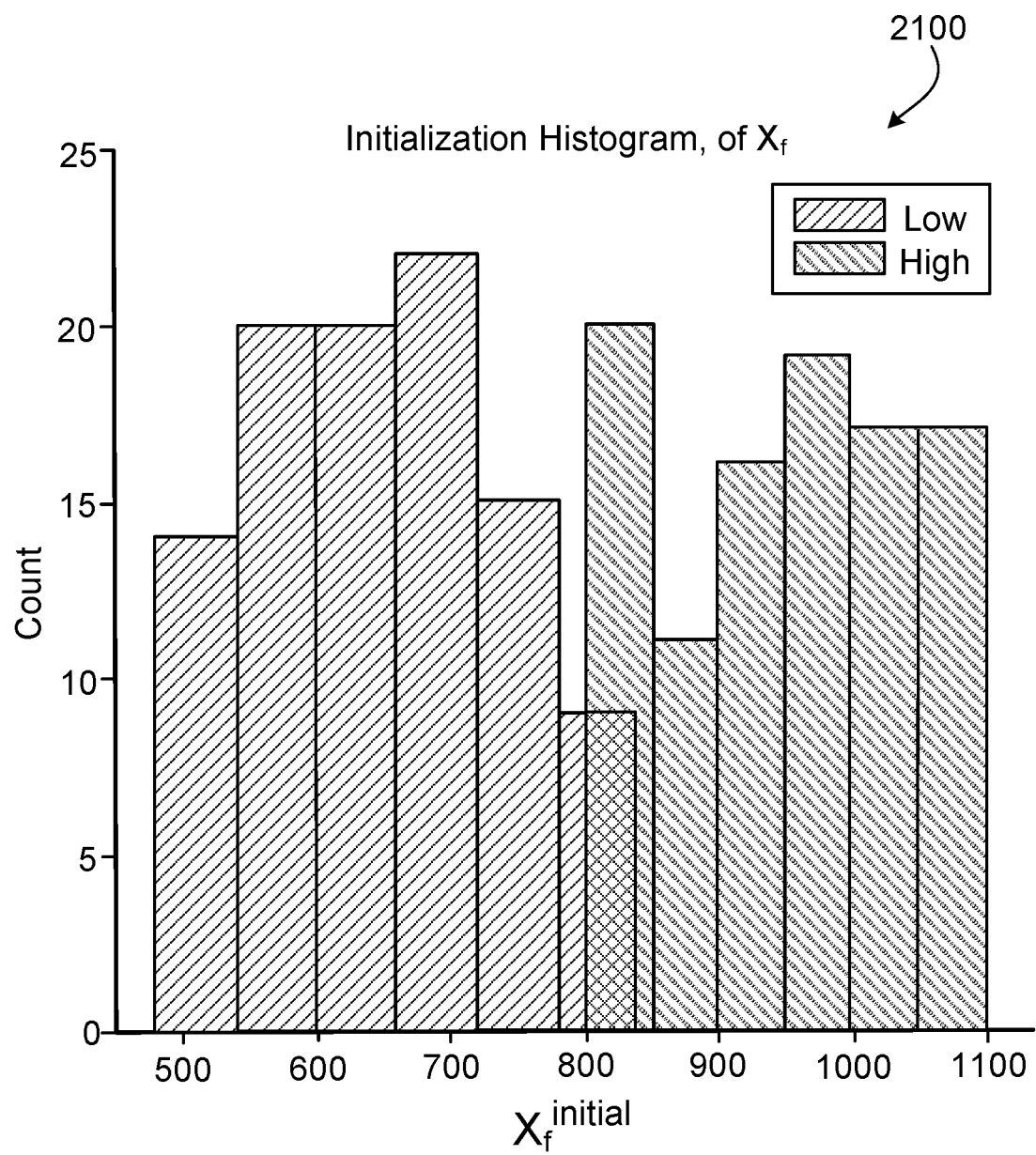
Figure 22:
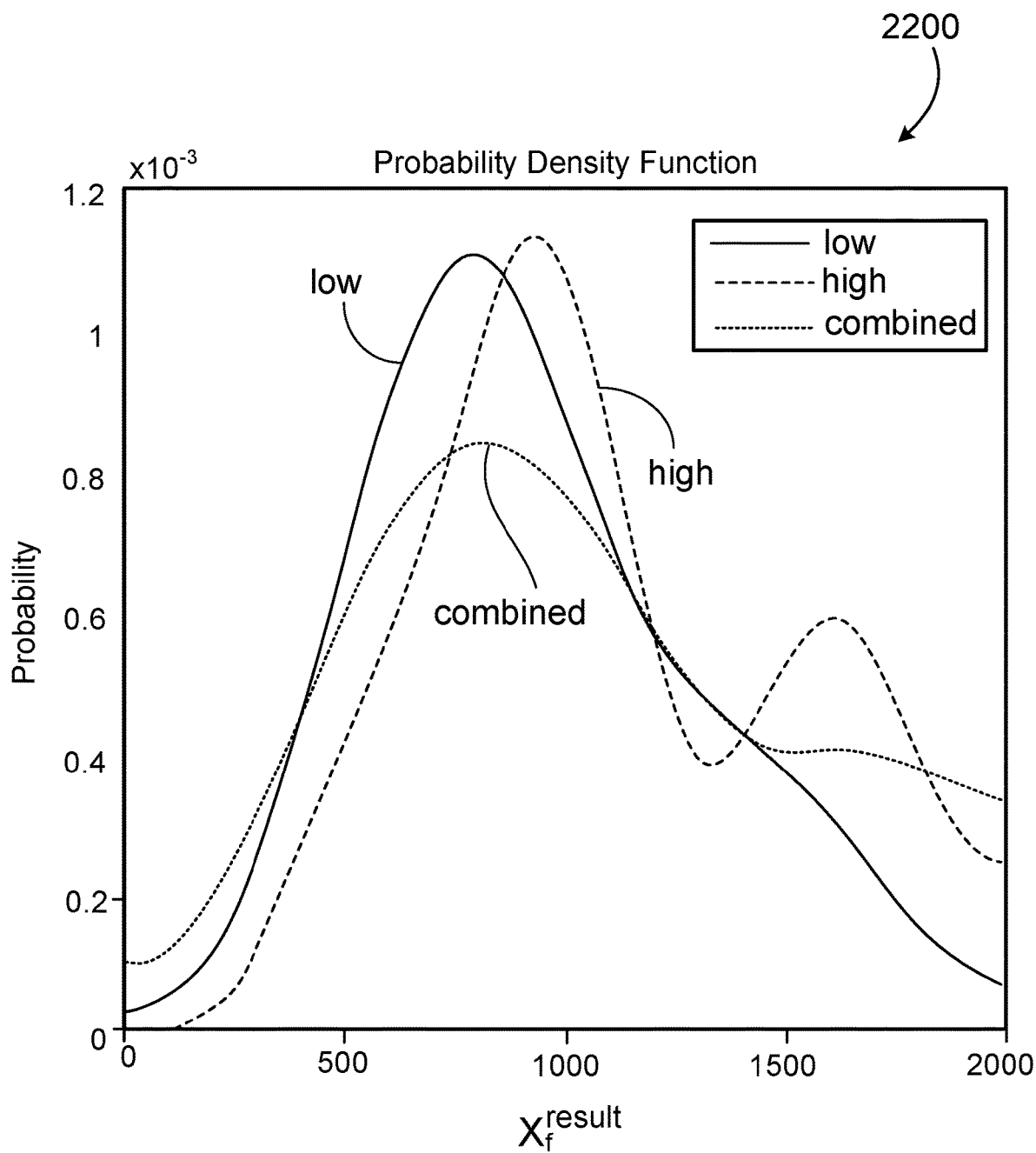

Further, by separating the initialization vectors into segments, bias in the selection of the initialization range can be tested. For example, the monitor dimension, $X_f$, can be tested for bias, as shown in FIGS. 21 and 22. For example, FIG. 21 illustrates a graph 2100 that a histogram of the random distribution used for the initialization vector of $X_f$. Graph 2100 includes a y-axis that describes count number for the monitor and treatment fractures for each particular range of $X_f$ (on the x-axis). FIG. 22 shows a graph 2200 that illustrates an estimated probability distribution resulting from the optimization. Graph 2200 includes a y-axis that describes probability and an x-axis that describes $X_f^{result}$, with low, high, and combined values plotted. The area under the curve is equal to one, equivalent to 100%.

The completed solution table for this example Model Problem (of FIG. 14) after fine-scale refinement (holding the fracture height constant) is shown in the table of FIG. 23. There are several interesting observations from this table. First, the perforation location of the monitor was not fixed in the optimization; therefore, the recovered perforation location must be interpreted in relative terms, with 0=Toe, 50=Mid, 100=Heel. A recovered location of monitor=52, treatment=0, indicates the monitor fracture is most likely at the mid-perf and treatment fracture is most likely at the toe perf. This is functionally equivalent to the monitor in the heel and the treatment at the midpoint of the perforated interval. Second, no systemic bias arising from the choice of perforation location was discerned. The deviation from the known fracture dimension does not arise from the choice of perforation location. Finally, the deviation from the true dimension of each fracture as a percentage of the fracture dimension is relatively similar. The method is estimating the fracture geometries with nominally similar uncertainties.

Further, a similar process for a small set of fully three-dimensional Model Problems, ranging from simple situations such as that described earlier, to complex multi-well pad scenarios with multiple monitors and stages that are both treatment and monitor fractures during their lifetime were executed. The results of these initial studies are shown in the table in FIG. 24. For reference, the case given in the detailed example here appears in row two of this table. This collection of preliminary results reflects potentially common fracturing designs.

As described, the present disclosure illustrates example implementations of processes and systems for estimating fracture geometries from offset pressure signals scalable to large, complex, pad acquisitions. The example implementations may enable a rapid and consistent estimation of fracture geometries from offset pressure monitoring. Example implementations, as described, may utilize a representation for offset pressure monitoring called an observation graph.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A structured data processing system for determining geometries of hydraulic fractures, the system comprising:
   one or more hardware processors;
   a memory in communication with the one or more hardware processors, the memory storing a data structure and an execution environment, the data structure storing data that comprises a plurality of hydraulic fracture identifiers and a plurality of observed fluid pressures, at least one of the plurality of hydraulic fracture identifiers associated with a first hydraulic fracture formed from a monitor wellbore that extends from a terranean surface into a subsurface rock formation and at least another of the plurality of hydraulic fracture identifiers associated with a second hydraulic fracture formed from a treatment wellbore that extends from the terranean surface into the subsurface rock formation, at least one of the plurality of observed fluid pressures comprising a pressure change in a fluid in the first hydraulic fracture that is induced by formation of the second hydraulic fracture, the execution environment comprising:

a hydraulic fracture geometry solver configured to perform operations comprising:
(i) executing a single- or multi-objective, non-linear constrained optimization analysis to minimize at least one objective function associated with the plurality of observed fluid pressures, the at least one objective function comprising a first objective function, and minimizing the first objective function comprises minimizing a difference between the observed pressure and a modeled pressure associated with the first and second hydraulic fractures, the modeled pressure determined with a finite element method that outputs the modeled pressure based on inputs that comprise parameters of a hydraulic fracture operation and the respective sets of hydraulic fracture geometries of the first and second hydraulic fractures,
(ii) applying a constraint to the single- or multi-objective, non-linear constrained optimization analysis associated with at least one of a center of the first hydraulic fracture or a center of the second hydraulic fracture, the operation of applying the constraint comprising at least one of constraining a distance between the center of the first hydraulic fracture and the radial center of the monitor wellbore to be no greater than a fracture half-length dimension of the first hydraulic fracture and no greater than a fracture height dimension of the first hydraulic fracture, or constraining a distance between the center of the second hydraulic fracture and the radial center of the treatment wellbore to be no greater than a fracture half-length dimension of the second hydraulic fracture and no greater than a fracture height dimension of the second hydraulic fracture, and
(iii) based on minimizing the at least one objective function, determining respective sets of hydraulic fracture geometries associated with at least one of the first hydraulic fracture or the second hydraulic fracture;
a user interface module that generates a user interface that renders one or more graphical representations of the determined respective sets of hydraulic fracture geometries; and
a transmission module that transmits, over one or more communication protocols and to a computing device, data that represents the one or more graphical representations.

2. The structured data processing system of claim 1, wherein the hydraulic fracture geometry solver is further configured to perform operations comprising assessing a shift penalty to the first objective function.

3. The structured data processing system of claim 2, wherein the operation of assessing the shift penalty comprises minimizing a standard deviation of the center location of each of a plurality of hydraulic fractures in a stage fracturing treatment initiated from the treatment wellbore that includes the second hydraulic fracture.

4. The structured data processing system of claim 1, wherein the hydraulic fracture geometry solver is further configured to perform operations comprising minimizing a second objective function associated with at least one of an area of the first or second hydraulic fracture.

5. The structured data processing system of claim 4, wherein the operation of minimizing the second objective function comprises at least one of:

minimizing a difference between the area of the first hydraulic fracture and an average area of a group of hydraulic fractures in a hydraulic fracturing stage group that comprises the first hydraulic fracture; or
minimizing a difference between the area of the second hydraulic fracture and an average area of a group of hydraulic fractures in a hydraulic fracturing stage group that comprises the second hydraulic fracture.

6. The structured data processing system of claim 1, wherein the hydraulic fracture geometry solver is further configured to perform operations comprising iterating steps (i), (ii), and (iii) until:
an error for at least one of the first or second objective functions is less than a specified value; and
a change in the determined plurality of fracture geometry data for the first hydraulic fracture from a previous iteration to a current iteration is less than the specified value.

7. The structured data processing system of claim 6, wherein the operation of iterating comprises:
setting the set of hydraulic fracture geometries of the first hydraulic fracture to an initial set of data values;
minimizing at least one of the first or second objective functions using the observed pressure and modeled pressure that is based on the set of hydraulic fracture geometries of the first hydraulic fracture and a set of hydraulic fracture geometries of the second hydraulic fracture;
calculating a new set of hydraulic fracture geometries of the first hydraulic based on the minimization; and
resetting the set of hydraulic fracture geometries of the first hydraulic fracture to the calculated new set of hydraulic fracture geometries.

8. The structured data processing system of claim 7, wherein the operation of determining respective sets of hydraulic fracture geometries associated with at least one of the first hydraulic fracture or the second hydraulic fracture comprises determining respective sets of hydraulic fracture geometries associated with the first hydraulic fracture.

9. The structured data processing system of claim 8, wherein the hydraulic fracture geometry solver is further configured to perform operations comprising:
based on the error for at least one of the first or second objective functions being less than the specified value, fixing the set of hydraulic fracture geometries of the first hydraulic fracture to the calculated new set of hydraulic fracture geometries; and
minimizing the first objective function to minimize the difference between the observed pressure and the modeled pressure associated with the first and second hydraulic fractures.

10. The structured data processing system of claim 9, wherein the hydraulic fracture geometry solver is further configured to perform operations comprising:
optimizing, through an iterative process, the hydraulic fracture geometries of the second hydraulic fracture, the optimizing comprising applying a constraint associated with a fracture height of the second hydraulic fracture or a fracture length-to-fracture height ratio of the second hydraulic fracture.

11. The structured data processing system of claim 10, wherein the iterative process comprises iterating steps (i), (ii), and (iii) until:
an error for at least one of the first or second objective functions is less than a specified value; and a change in the determined plurality of fracture geometry data for the second hydraulic fracture from a previous iteration to a current iteration is less than the specified value.

12. The structured data processing system of claim 11, wherein the operation of iterating comprises:
setting the set of hydraulic fracture geometries of the second hydraulic fracture to an initial set of data values;
minimizing at least one of the first or second objective functions using the observed pressure and modeled pressure that is based on the fixed set of hydraulic fracture geometries of the first hydraulic fracture and the set of hydraulic fracture geometries of the second hydraulic fracture;
calculating a new set of hydraulic fracture geometries of the second hydraulic based on the minimization; and
resetting the set of hydraulic fracture geometries of the second hydraulic fracture to the calculated new set of hydraulic fracture geometries.

13. The structured data processing system of claim 1, wherein the single- or multi-objective, non-linear constrained optimization analysis comprises a sequential quadratic programming method.

14. The structured data processing system of claim 1, wherein the data structure comprises an observation graph that comprises a plurality of nodes and a plurality of edges, each edge connecting two nodes.

15. The structured data processing system of claim 14, wherein each node represents one of the plurality of hydraulic fractures and each edge represents one of the observed pressures.

16. A computer-implemented method for determining geometries of hydraulic fractures, comprising:
(i) searching, with one or more hardware processors, memory in communication with the one or more hardware processors for a data structure stored in the memory;
(ii) extracting, with one or more hardware processors, data from the data structure, the data comprising a plurality of hydraulic fracture identifiers and a plurality of observed fluid pressures, at least one of the plurality of hydraulic fracture identifiers represents a first hydraulic fracture formed from a monitor wellbore that extends from a terranean surface into a subsurface rock formation and at least another of the plurality of hydraulic fracture identifiers represents a second hydraulic fracture formed from a treatment wellbore that extends from the terranean surface into the subsurface rock formation, at least one of the plurality of observed fluid pressures comprising a pressure change in a fluid in the first hydraulic fracture that is induced by formation of the second hydraulic fracture;
(iii) performing, with the one or more hardware processors, a single- or multi-objective, non-linear constrained optimization analysis to minimize at least one objective function associated with the plurality of observed fluid pressures, the at least one objective function comprising a first objective function, and minimizing the first objective function comprises minimizing a difference between the observed pressure and a modeled pressure associated with the first and second hydraulic fractures, the modeled pressure determined with a finite element method that outputs the modeled pressure based on inputs that comprise parameters of a hydraulic fracture operation and the respective sets of hydraulic fracture geometries of the first and second hydraulic fractures, the performing further comprising:
applying, with the one or more hardware processors, a constraint to the single- or multi-objective, non-linear constrained optimization analysis associated with at least one of a center of the first hydraulic fracture or a center of the second hydraulic fracture, the applying the constraint comprising at least one of constraining a distance between the center of the first hydraulic fracture and the radial center of the monitor wellbore to be no greater than a fracture half-length dimension of the first hydraulic fracture and no greater than a fracture height dimension of the first hydraulic fracture, or constraining a distance between the center of the second hydraulic fracture and the radial center of the treatment wellbore to be no greater than a fracture half-length dimension of the second hydraulic fracture and no greater than a fracture height dimension of the second hydraulic fracture; and
(iv) based on minimizing the at least one objective function, determining, with the one or more hardware processors, respective sets of hydraulic fracture geometries associated with at least one of the first hydraulic fracture or the second hydraulic fracture.

17. The computer-implemented method of claim 16, further comprising assessing, with the one or more hardware processors, a shift penalty to the first objective function.

18. The computer-implemented method of claim 16, wherein assessing the shift penalty comprises minimizing a standard deviation of the center location of each of a plurality of hydraulic fractures in a stage fracturing treatment initiated from the treatment wellbore that includes the second hydraulic fracture.

19. The computer-implemented method of claim 16, wherein step (iii) further comprises minimizing a second objective function associated with at least one of an area of the first or second hydraulic fracture.

20. The computer-implemented method of claim 19, wherein minimizing the second objective function comprises at least one of:
minimizing a difference between the area of the first hydraulic fracture and an average area of a group of hydraulic fractures in a hydraulic fracturing stage group that comprises the first hydraulic fracture; or
minimizing a difference between the area of the second hydraulic fracture and an average area of a group of hydraulic fractures in a hydraulic fracturing stage group that comprises the second hydraulic fracture.

21. The computer-implemented method of claim 16, further comprising iterating steps (iii) and (iv) until:
an error for at least one of the first or second objective functions is less than a specified value; and
a change in the determined plurality of fracture geometry data for the first hydraulic fracture from a previous iteration to a current iteration is less than the specified value.

22. The computer-implemented method of claim 21, wherein iterating comprises:
setting the set of hydraulic fracture geometries of the first hydraulic fracture to an initial set of data values;
minimizing at least one of the first or second objective functions using the observed pressure and modeled pressure that is based on the set of hydraulic fracture geometries of the first hydraulic fracture and a set of hydraulic fracture geometries of the second hydraulic fracture;
calculating a new set of hydraulic fracture geometries of the first hydraulic based on the minimization; and resetting the set of hydraulic fracture geometries of the first hydraulic fracture to the calculated new set of hydraulic fracture geometries.

23. The computer-implemented method of claim 22, wherein determining respective sets of hydraulic fracture geometries associated with at least one of the first hydraulic fracture or the second hydraulic fracture comprises determining respective sets of hydraulic fracture geometries associated with the first hydraulic fracture.

24. The computer-implemented method of claim 23, further comprising:
based on the error for at least one of the first or second objective functions being less than the specified value, fixing the set of hydraulic fracture geometries of the first hydraulic fracture to the calculated new set of hydraulic fracture geometries; and
minimizing the first objective function to minimize the difference between the observed pressure and the modeled pressure associated with the first and second hydraulic fractures.

25. The computer-implemented method of claim 24, further comprising optimizing, through an iterative process, the hydraulic fracture geometries of the second hydraulic fracture, the optimizing comprising applying a constraint associated with a fracture height of the second hydraulic fracture or a fracture length-to-fracture height ratio of the second hydraulic fracture.

26. The computer-implemented method of claim 25, wherein the iterative process comprises iterating steps (iii) and (iv) until:
an error for at least one of the first or second objective functions is less than a specified value; and
a change in the determined plurality of fracture geometry data for the second hydraulic fracture from a previous iteration to a current iteration is less than the specified value.

27. The computer-implemented method of claim 26, wherein iterating comprises:
setting the set of hydraulic fracture geometries of the second hydraulic fracture to an initial set of data values;
minimizing at least one of the first or second objective functions using the observed pressure and modeled pressure that is based on the fixed set of hydraulic fracture geometries of the first hydraulic fracture and the set of hydraulic fracture geometries of the second hydraulic fracture;
calculating a new set of hydraulic fracture geometries of the second hydraulic based on the minimization; and
resetting the set of hydraulic fracture geometries of the second hydraulic fracture to the calculated new set of hydraulic fracture geometries.

28. The computer-implemented method of claim 16, wherein the single- or multi-objective, non-linear constrained optimization analysis comprises a sequential quadratic programming method.

29. The computer-implemented method of claim 16, wherein the data structure comprises an observation graph that comprises a plurality of nodes and a plurality of edges, each edge connecting two nodes.

30. The computer-implemented method of claim 29, wherein each node represents one of the plurality of hydraulic fractures and each edge represents one of the observed pressures.

31. The computer-implemented method of claim 16, further comprising preparing, with the one or more hardware processors, the determined plurality of fracture geometry data for presentation through a graphical user interface.

* * * * *